United States Patent
Itoi

(10) Patent No.: US 6,219,319 B1
(45) Date of Patent: Apr. 17, 2001

(54) METHOD AND APPARATUS FOR WRITING INFORMATION INTO OPTICAL DISK AND READING IT THEREFROM, AND OPTICAL DISK MEDIUM THEREFOR

(75) Inventor: Satoshi Itoi, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/198,364

(22) Filed: Nov. 24, 1998

(30) Foreign Application Priority Data

Nov. 25, 1997 (JP) .................................................... 9-323374

(51) Int. Cl.[7] ........................................................ G11B 7/00
(52) U.S. Cl. .............................. 369/50; 369/59; 369/58; 369/47
(58) Field of Search .................................. 369/47, 48, 49, 369/50, 54, 58, 59, 60.1

(56) References Cited

U.S. PATENT DOCUMENTS 5,425,014 * 6/1995 Tsuyuguchi et al. ................... 369/48

FOREIGN PATENT DOCUMENTS

| 5-217185 | 8/1993 | (JP) . |
| 7-130103 | 5/1995 | (JP) . |
| 7-168672 | 7/1995 | (JP) . |
| 8-36833 | 2/1996 | (JP) . |
| 8-96518 | 4/1996 | (JP) . |
| 8-255358 | 10/1996 | (JP) . |
| 9-161403 | 6/1997 | (JP) . |
| 10-4996 | 1/1998 | (JP) . |

* cited by examiner

Primary Examiner—Muhammad Edun
(74) Attorney, Agent, or Firm—McGuireWoods, LLP

(57) ABSTRACT

An optical disk for writing data transmitted from a higher rank device is rotated at a constant rate (S1). When the rotational speed of the optical disk reaches a constant rate, data is written or read (S5). At that time, since the data write rate in the innermost circumference side is different from that in the outermost circumference side, whether or not an initial buffer is necessary is judged. When the initial buffer is necessary, data in a capacity corresponding to the data writing/reading rate in the storing region is stored in the buffer (S3). A clock is varied and produced according to the storing region (clock block) into which data is written or from which data is read (S4). Subsequently, data is written or read based on the clock. In the writing or reading, data to be written or read is temporarily stored in a buffer depending upon whether the storing region is on the inner circumference side or outer circumference side of the disk (S5). By virtue of this constitution, realization of writing at a low and constant number of revolutions of the disk simultaneously with writing at a constant writing wavelength can increase the storage capacity per disk.

26 Claims, 76 Drawing Sheets

FIG. 3 PRIOR ART

| TRACK NUMBER 351 | FRAME NUMBER 352 | | CLOCK BLOCK NUMBER 353 |
|---|---|---|---|
| 48 | 58 | 58 | |
| 49 | 59 | | |
| 50 | 60 | 61 | |
| 51 | 62 | 63 | CBLK6 |
| 52 | 64 | | |
| 53 | 65 | 66 | |
| 54 | 67 | | |
| 55 | 68 | 69 | |
| 56 | 70 | 71 | |
| 57 | 72 | | |
| 58 | 73 | 74 | |
| 59 | 75 | 76 | CBLK7 |
| 60 | 77 | 78 | |
| 61 | 79 | 80 | |
| 62 | 81 | | |
| 63 | 82 | 83 | |
| 64 | 84 | 85 | |
| 65 | 86 | 87 | |
| 66 | 88 | 89 | |
| 67 | 90 | 91 | CBLK8 |
| 68 | 92 | | |
| 69 | 93 | 94 | |
| 70 | 95 | 96 | |
| 71 | 97 | 98 | |
| 72 | 99 | 100 | |
| 73 | 101 | 102 | |
| 74 | 103 | 104 | |
| 75 | 105 | 106 | CBLK9 |
| 76 | 107 | 108 | |
| 77 | 109 | 110 | |
| 78 | 111 | 112 | |
| 79 | 113 | 114 | |

FIG. 10

| TRACK NUMBER 11 | FRAME NUMBER 12 | | | CLOCK BLOCK NUMBER 13 |
|---|---|---|---|---|
| 48 | 79 | | 80 | |
| 49 | | 81 | | |
| 50 | 82 | | 83 | |
| 51 | | 84 | 85 | CBLK6 |
| 52 | | 86 | | |
| 53 | 87 | | 88 | |
| 54 | | 89 | | |
| 55 | 90 | | 91 | |
| 56 | 55 | | 56 | |
| 57 | | 57 | | |
| 58 | 58 | | 59 | |
| 59 | 60 | | 61 | CBLK7 |
| 60 | 62 | | 63 | |
| 61 | | 64 | 65 | |
| 62 | | 66 | | |
| 63 | 67 | | 68 | |
| 64 | 31 | | 32 | |
| 65 | | 33 | 34 | |
| 66 | | 35 | 36 | |
| 67 | | 37 | 38 | CBLK8 |
| 68 | | 39 | | |
| 69 | 40 | | 41 | |
| 70 | 42 | | 43 | |
| 71 | 44 | | 45 | |
| 72 | 7 | | 8 | |
| 73 | 9 | | 10 | |
| 74 | 11 | | 12 | |
| 75 | 13 | | 14 | CBLK9 |
| 76 | 15 | | 16 | |
| 77 | 17 | | 18 | |
| 78 | 19 | | 20 | |
| 79 | 21 | | 22 | |

FIG. 15

| TRACK NUMBER 21 | FRAME NUMBER 22 | | CLOCK BLOCK NUMBER 23 |
|---|---|---|---|
| 42 | 19 | 20 | |
| 49 | 21 | | |
| 50 | 22 | 23 | |
| 51 | 24 | 25 | CBLK6 |
| 52 | 26 | | |
| 53 | 27 | 28 | |
| 54 | 29 | | |
| 55 | 30 | 31 | |
| 56 | 32 | 33 | |
| 57 | 34 | | |
| 52 | 35 | 36 | |
| 59 | 37 | 38 | |
| 60 | 39 | 40 | CBLK7 |
| 61 | 41 | 42 | |
| 62 | 43 | | |
| 63 | 44 | 45 | |
| 64 | 54 | 55 | |
| 65 | 56 | 57 | |
| 66 | 58 | 59 | |
| 67 | 60 | 61 | CBLK2 |
| 62 | 62 | | |
| 69 | 63 | 64 | |
| 70 | 65 | 66 | |
| 71 | 67 | 68 | |
| 72 | 78 | 79 | |
| 73 | 80 | 81 | |
| 74 | 82 | 83 | |
| 75 | 84 | 85 | CBLK9 |
| 76 | 86 | 87 | |
| 77 | 88 | 89 | |
| 72 | 90 | 91 | |
| 79 | 92 | 93 | |

FIG. 19

| TRACK NUMBER 31 | FRAME NUMBER 32 | | CLOCK BLOCK NUMBER 33 |
|---|---|---|---|
| 42 | 90 | 91 | |
| 49 | 89 | | |
| 50 | 87 | 88 | |
| 51 | 86 | | CBLK6 |
| 52 | 84 | 85 | |
| 53 | 82 | 83 | |
| 54 | 81 | | |
| 55 | 79 | 80 | |
| 56 | 67 | 68 | |
| 57 | 66 | | |
| 52 | 64 | 65 | |
| 59 | 62 | 63 | |
| 60 | 60 | 61 | CBLK7 |
| 61 | 58 | 59 | |
| 62 | 57 | | |
| 63 | 55 | 56 | |
| 64 | 44 | 46 | |
| 65 | 42 | 43 | |
| 66 | 40 | 41 | |
| 67 | 39 | | |
| 62 | 37 | 38 | CBLK2 |
| 69 | 35 | 36 | |
| 70 | 33 | 34 | |
| 71 | 31 | 32 | |
| 72 | 21 | 22 | |
| 73 | 19 | 20 | |
| 74 | 17 | 18 | |
| 75 | 15 | 16 | |
| 76 | 13 | 14 | CBLK9 |
| 77 | 11 | 12 | |
| 72 | 9 | 10 | |
| 79 | 7 | 8 | |

FIG. 24

| Track Number 41 | Frame Number 42 | | Clock Block Number 43 |
|---|---|---|---|
| 48 | 91 | 90 | |
| 49 | 89 | | |
| 50 | 88 | 87 | |
| 51 | 88 | 85 | CBLK6 |
| 52 | | 84 | |
| 53 | 83 | 82 | |
| 54 | 81 | | |
| 55 | 80 | 79 | |
| 56 | 68 | 67 | |
| 57 | 66 | 65 | |
| 58 | | 64 | |
| 59 | 63 | 62 | CBLK7 |
| 60 | 61 | 60 | |
| 61 | 59 | 58 | |
| 62 | | 57 | |
| 63 | 55 | 55 | |
| 64 | 45 | 44 | |
| 65 | 43 | 42 | |
| 66 | 41 | 40 | |
| 67 | 39 | 38 | CBLK2 |
| 68 | | 37 | |
| 69 | 36 | 35 | |
| 70 | 34 | 33 | |
| 71 | 32 | 31 | |
| 72 | 22 | 21 | |
| 73 | 20 | 19 | |
| 74 | 18 | 17 | |
| 75 | 16 | 15 | CBLK9 |
| 76 | 14 | 13 | |
| 77 | 12 | 11 | |
| 78 | 10 | 9 | |
| 79 | 8 | 7 | |

FIG. 29

| TRACK NUMBER 51 | FRAME NUMBER 52 | | CLOCK BLOCK NUMBER 53 |
|---|---|---|---|
| 48 | 33 | 34 | |
| 49 | 35 | | |
| 50 | 36 | 37 | |
| 51 | 38 | 39 | CBLK6 |
| 52 | 40 | | |
| 53 | 41 | 42 | |
| 54 | 43 | | |
| 55 | 44 | 45 | |
| 56 | 55 | 56 | |
| 57 | 57 | | |
| 58 | 58 | 59 | |
| 59 | 60 | 61 | |
| 60 | 62 | 63 | CBLK7 |
| 61 | 64 | 65 | |
| 62 | 66 | | |
| 63 | 67 | 68 | |
| 64 | 77 | 78 | |
| 65 | 79 | 80 | |
| 66 | 81 | 82 | |
| 67 | 83 | 84 | CBLK8 |
| 68 | 85 | | |
| 69 | 86 | 87 | |
| 70 | 88 | 89 | |
| 71 | 90 | 91 | |
| 72 | 99 | 100 | |
| 73 | 101 | 102 | |
| 74 | 103 | 104 | |
| 75 | 105 | 106 | |
| 76 | 107 | 108 | CBLK9 |
| 77 | 109 | 110 | |
| 78 | 111 | 112 | |
| 79 | 113 | 114 | |

FIG. 33

| TRACK NUMBER 61 | FRAME NUMBER 62 | | CLOCK BLOCK NUMBER 63 |
|---|---|---|---|
| 48 | 91 | 90 | |
| 49 | 89 | | |
| 50 | 88 | 87 | |
| 51 | 86 | | |
| 52 | 85 | 84 | CBLK6 |
| 53 | 83 | 82 | |
| 54 | 81 | | |
| 55 | 80 | 79 | |
| 56 | 68 | 67 | |
| 57 | 66 | | |
| 58 | 65 | 64 | |
| 59 | 63 | 62 | |
| 60 | 61 | 60 | CBLK7 |
| 61 | 59 | 58 | |
| 62 | 57 | | |
| 63 | 56 | 55 | |
| 64 | 45 | 44 | |
| 65 | 43 | 42 | |
| 66 | 41 | 40 | |
| 67 | 39 | | |
| 68 | 38 | 37 | CBLK2 |
| 69 | 36 | 35 | |
| 70 | 34 | 33 | |
| 71 | 32 | 31 | |
| 72 | 22 | 21 | |
| 73 | 20 | 19 | |
| 74 | 18 | 17 | |
| 75 | 16 | 15 | |
| 76 | 14 | 13 | CBLK9 |
| 77 | 12 | 11 | |
| 78 | 10 | 9 | |
| 79 | 8 | 7 | |

FIG. 35

| TRACK NUMBER 71 | FRAME NUMBER 72 | | 76 LAND/GROOVE |
|---|---|---|---|
| 0  | 0  |    | L |
| 1  | 60 |    | G |
| 2  | 1  |    | L |
| 3  | 61 |    | G |
| 4  | 2  |    | L |
| 5  | 62 |    | G |
| 6  | 3  |    | L |
| 7  | 63 |    | G |
| 8  | 4  |    | L |
| 9  | 64 |    | G |
| 10 | 5  |    | L |
| 11 | 65 |    | G |
| 12 | 6  |    | L |
| 13 | 66 |    | G |
| 14 | 7  |    | L |
| 15 | 67 |    | G |

CBLK0 — 73 CLOCK BLOCK NUMBER

| 16 | 24 |    | L |
| 17 | 84 |    | G |
| 18 | 25 | 26 | L |
| 19 | 85 | 86 | G |
| 20 |    | 27 | L |
| 21 |    | 87 | G |
| 22 | 28 |    | L |
| 23 | 88 |    | G |
| 24 | 29 |    | L |
| 25 | 89 |    | G |
| 26 | 30 | 31 | L |
| 27 | 90 | 91 | G |
| 28 |    | 32 | L |
| 29 |    | 92 | G |
| 30 | 33 |    | L |
| 31 | 93 |    | G |

CBLK1

FIG. 36

| TRACK NUMBER 71 | FRAME NUMBER 72 | | 76 LAND/GROOVE |
|---|---|---|---|
| 32 | 48 | 49 | L |
| 33 | 108 | 109 | G |
| 34 | 50 | | L |
| 35 | 110 | | G |
| 36 | 51 | 52 | L |
| 37 | 111 | 112 | G |
| 38 | 53 | | L |
| 39 | 113 | | G |
| 40 | 54 | 55 | L |
| 41 | 114 | 115 | G |
| 42 | 56 | | L |
| 43 | 116 | | G |
| 44 | 57 | 58 | L |
| 45 | 117 | 118 | G |
| 46 | 59 | | L |
| 47 | 119 | | G |

CBLK2 — 73 CLOCK BLOCK NUMBER

FIG. 37

| TRACK NUMBER 71 | FRAME NUMBER 72 | | 76 LAND/GROOVE |
|---|---|---|---|
| 48 | 34 | 35 | L |
| 49 | 94 | 95 | G |
| 50 | 36 | 37 | L |
| 51 | 96 | 97 | G |
| 52 | 38 | | L |
| 53 | 98 | | G |
| 54 | 39 | 40 | L |
| 55 | 99 | 100 | G |
| 56 | 41 | 42 | L |
| 57 | 101 | 102 | G |
| 58 | 43 | 44 | L |
| 59 | 106 | 104 | G |
| 60 | 45 | | L |
| 61 | 105 | | G |
| 62 | 46 | 47 | L |
| 63 | 106 | 107 | G |

CBLK3 — 73 CLOCK BLOCK NUMBER

| | | | |
|---|---|---|---|
| 64 | 8 | 9 | L |
| 65 | 68 | 69 | G |
| 66 | 10 | 11 | L |
| 67 | 70 | 71 | G |
| 68 | 12 | 13 | L |
| 69 | 72 | 73 | G |
| 70 | 14 | 15 | L |
| 71 | 74 | 75 | G |
| 72 | 16 | 17 | L |
| 73 | 76 | 77 | G |
| 74 | 18 | 19 | L |
| 75 | 78 | 79 | G |
| 76 | 20 | 21 | L |
| 77 | 80 | 81 | G |
| 78 | 22 | 23 | L |
| 79 | 82 | 83 | G |

CBLK4

FIG. 39

| 131 | 132 |  | 136 |
|---|---|---|---|
| 0 | 0 | | L |
| 1 | 119 | | G |
| 2 | 1 | | L |
| 3 | 118 | | G |
| 4 | 2 | | L |
| 5 | 117 | | G |
| 6 | 3 | | L |
| 7 | 116 | | G |
| 8 | 4 | | L |
| 9 | 115 | | G |
| 10 | 5 | | L |
| 11 | 114 | | G |
| 12 | 6 | | L |
| 13 | 113 | | G |
| 14 | 7 | | L |
| 15 | 112 | | G |

CBLK0 — 133

| | | | |
|---|---|---|---|
| 16 | 24 | | L |
| 17 | 86 | | G |
| 18 | 25 | 26 | L |
| 19 | 87 | 88 | G |
| 20 | | 27 | L |
| 21 | | 89 | G |
| 22 | 28 | | L |
| 23 | 90 | | G |
| 24 | 29 | | L |
| 25 | 91 | | G |
| 26 | 30 | 31 | L |
| 27 | 92 | 93 | G |
| 28 | | 32 | L |
| 29 | | 94 | G |
| 30 | 33 | | L |
| 31 | 95 | | G |

CBLK1

FIG. 41

| 131 | 132 | | 136 |
|---|---|---|---|
| 48 | 72 | 73 | L |
| 49 | 34 | 35 | G |
| 50 | 74 | 75 | L |
| 51 | 36 | 37 | G |
| 52 | 76 | | L |
| 53 | 38 | | G |
| 54 | 77 | 78 | L |
| 55 | 39 | 40 | G |
| 56 | 79 | 80 | L |
| 57 | 41 | 42 | G |
| 58 | 81 | 82 | L |
| 59 | 43 | 44 | G |
| 60 | 83 | | L |
| 61 | 45 | | G |
| 62 | 84 | 85 | L |
| 63 | 46 | 47 | G |

CBLK3 — 133

| | | | |
|---|---|---|---|
| 64 | 96 | 97 | L |
| 65 | 8 | 9 | G |
| 66 | 98 | 99 | L |
| 67 | 10 | 11 | G |
| 68 | 100 | 101 | L |
| 69 | 12 | 13 | G |
| 70 | 102 | 103 | L |
| 71 | 14 | 15 | G |
| 72 | 104 | 105 | L |
| 73 | 16 | 17 | G |
| 74 | 106 | 107 | L |
| 75 | 18 | 19 | G |
| 76 | 108 | 109 | L |
| 77 | 20 | 21 | G |
| 78 | 110 | 111 | L |
| 79 | 22 | 23 | G |

CBLK4

FIG. 42

| Track Number 81 | Frame Number 82 | | Land/Groove 86 |
|---|---|---|---|
| 0 | 0 | | L |
| 1 | 60 | | G |
| 2 | 1 | | L |
| 3 | 61 | | G |
| 4 | 2 | | L |
| 5 | 62 | | G |
| 6 | 3 | | L |
| 7 | 63 | | G |
| 8 | 4 | | L |
| 9 | 64 | | G |
| 10 | 5 | | L |
| 11 | 65 | | G |
| 12 | 6 | | L |
| 13 | 66 | | G |
| 14 | 7 | | L |
| 15 | 67 | | G |

CBLK0 — 83 CLOCK BLOCK NUMBER

| | | | |
|---|---|---|---|
| 16 | 38 | | L |
| 17 | 98 | | G |
| 18 | 39 | 40 | L |
| 19 | 99 | 100 | G |
| 20 | | 41 | L |
| 21 | | 101 | G |
| 22 | 42 | | L |
| 23 | 102 | | G |
| 24 | 43 | | L |
| 25 | 103 | | G |
| 26 | 44 | 45 | L |
| 27 | 104 | 105 | G |
| 28 | | 46 | L |
| 29 | | 106 | G |
| 30 | 47 | | L |
| 31 | 107 | | G |

CBLK1

FIG. 43

| TRACK NUMBER 81 | FRAME NUMBER 82 | | 86 LAND/GROOVE |
|---|---|---|---|
| 32 | 48 | 49 | L |
| 33 | 108 | 109 | G |
| 34 | 50 | | L |
| 35 | 110 | | G |
| 36 | 51 | 52 | L |
| 37 | 111 | 112 | G |
| 38 | 53 | | L |
| 39 | 113 | | G |
| 40 | 54 | 55 | L |
| 41 | 114 | 115 | G |
| 42 | 56 | | L |
| 43 | 116 | | G |
| 44 | 57 | 58 | L |
| 45 | 117 | 118 | G |
| 46 | 59 | | L |
| 47 | 119 | | G |

CBLK2 — 83 CLOCK BLOCK NUMBER

FIG. 44

| TRACK NUMBER 81 | FRAME NUMBER 82 | | 86 LAND/GROOVE |
|---|---|---|---|
| 48 | 8 | 9 | L |
| 49 | 68 | 69 | G |
| 50 | 10 | 11 | L |
| 51 | 70 | 71 | G |
| 52 | 12 | | L |
| 53 | 72 | | G |
| 54 | 13 | 14 | L |
| 55 | 73 | 74 | G |
| 56 | 15 | 16 | L |
| 57 | 75 | 76 | G |
| 58 | 17 | 18 | L |
| 59 | 77 | 78 | G |
| 60 | 19 | | L |
| 61 | 79 | | G |
| 62 | 20 | 21 | L |
| 63 | 80 | 81 | G |

CBLK3 — 83 CLOCK BLOCK NUMBER

| | | | |
|---|---|---|---|
| 64 | 22 | 23 | L |
| 65 | 82 | 83 | G |
| 66 | 24 | 25 | L |
| 67 | 84 | 85 | G |
| 68 | 26 | 27 | L |
| 69 | 86 | 87 | G |
| 70 | 28 | 29 | L |
| 71 | 88 | 89 | G |
| 72 | 30 | 31 | L |
| 73 | 90 | 91 | G |
| 74 | 32 | 33 | L |
| 75 | 92 | 93 | G |
| 76 | 34 | 35 | L |
| 77 | 94 | 95 | G |
| 78 | 36 | 37 | L |
| 79 | 96 | 97 | G |

CBLK4

FIG. 46

| 141 | 142 | 146 |
|---|---|---|
| 0 | 0 | L |
| 1 | 74 | G |
| 2 | 1 | L |
| 3 | 75 | G |
| 4 | 2 | L |
| 5 | 76 | G |
| 6 | 3 | L |
| 7 | 77 | G |
| 8 | 4 | L |
| 9 | 78 | G |
| 10 | 5 | L |
| 11 | 79 | G |
| 12 | 6 | L |
| 13 | 80 | G |
| 14 | 7 | L |
| 15 | 81 | G |

CBLK0 — 143

| | | | | |
|---|---|---|---|---|
| 16 | | 38 | | L |
| 17 | | 98 | | G |
| 18 | 39 | | 40 | L |
| 19 | 99 | | 100 | G |
| 20 | | | 41 | L |
| 21 | | | 101 | G |
| 22 | | 42 | | L |
| 23 | | 102 | | G |
| 24 | | 43 | | L |
| 25 | | 103 | | G |
| 26 | 44 | | 45 | L |
| 27 | 104 | | 105 | G |
| 28 | | | 46 | L |
| 29 | | | 106 | G |
| 30 | | 47 | | L |
| 31 | | 107 | | G |

CBLK1

FIG. 47

| 141 | 142 | | 146 |
|---|---|---|---|
| 32 | 48 | 49 | L |
| 33 | 108 | 109 | G |
| 34 | 50 | | L |
| 35 | 110 | | G |
| 36 | 51 | 52 | L |
| 37 | 111 | 112 | G |
| 38 | 53 | | L |
| 39 | 113 | | G |
| 40 | 54 | 55 | L |
| 41 | 114 | 115 | G |
| 42 | 56 | | L |
| 43 | 116 | | G |
| 44 | 57 | 58 | L |
| 45 | 117 | 118 | G |
| 46 | 59 | | L |
| 47 | 119 | | G |

CBLK2 — 143

FIG. 48

| 141 | 142 | | 146 |
|---|---|---|---|
| 48 | 60 | 61 | L |
| 49 | 8 | 9 | G |
| 50 | 62 | 63 | L |
| 51 | 10 | 11 | G |
| 52 | 64 | | L |
| 53 | 12 | | G |
| 54 | 65 | 66 | L |
| 55 | 13 | 14 | G |
| 56 | 67 | 68 | L |
| 57 | 15 | 16 | G |
| 58 | 69 | 70 | L |
| 59 | 17 | 18 | G |
| 60 | 71 | | L |
| 61 | 19 | | G |
| 62 | 72 | 73 | L |
| 63 | 20 | 21 | G |

CBLK3 — 143

| 64 | 82 | 83 | L |
|---|---|---|---|
| 65 | 22 | 23 | G |
| 66 | 84 | 85 | L |
| 67 | 24 | 25 | G |
| 68 | 86 | 87 | L |
| 69 | 26 | 27 | G |
| 70 | 88 | 89 | L |
| 71 | 28 | 29 | G |
| 72 | 90 | 91 | L |
| 73 | 30 | 31 | G |
| 74 | 92 | 93 | L |
| 75 | 32 | 33 | G |
| 76 | 94 | 95 | L |
| 77 | 34 | 35 | G |
| 78 | 96 | 97 | L |
| 79 | 36 | 37 | G |

CBLK4

FIG. 49

| TRACK NUMBER 91 | FRAME NUMBER 92 | | 96 LAND/GROOVE |
|---|---|---|---|
| 0 | 0 | | L |
| 1 | 60 | | G |
| 2 | 1 | | L |
| 3 | 61 | | G |
| 4 | 2 | | L |
| 5 | 62 | | G |
| 6 | 3 | | L |
| 7 | 63 | | G |
| 8 | 4 | | L |
| 9 | 64 | | G |
| 10 | 5 | | L |
| 11 | 65 | | G |
| 12 | 6 | | L |
| 13 | 66 | | G |
| 14 | 7 | | L |
| 15 | 67 | | G |

CBLK0 — 93 CLOCK BLOCK NUMBER

| | | | |
|---|---|---|---|
| 16 | 24 | | L |
| 17 | 84 | | G |
| 18 | 25 | 26 | L |
| 19 | 85 | 86 | G |
| 20 | | 27 | L |
| 21 | | 87 | G |
| 22 | 28 | | L |
| 23 | 88 | | G |
| 24 | 29 | | L |
| 25 | 89 | | G |
| 26 | 30 | 31 | L |
| 27 | 90 | 91 | G |
| 28 | | 32 | L |
| 29 | | 92 | G |
| 30 | 33 | | L |
| 31 | 93 | | G |

CBLK1

FIG. 50

| TRACK NUMBER 91 | FRAME NUMBER 92 | | 96 LAND/GROOVE |
|---|---|---|---|
| 32 | 48 | 49 | L |
| 33 | 108 | 109 | G |
| 34 | 50 | | L |
| 35 | 110 | | G |
| 36 | 51 | 52 | L |
| 37 | 111 | 112 | G |
| 38 | 53 | | L |
| 39 | 113 | | G |
| 40 | 54 | 55 | L |
| 41 | 114 | 115 | G |
| 42 | 56 | | L |
| 43 | 116 | | G |
| 44 | 57 | 58 | L |
| 45 | 117 | 118 | G |
| 46 | 59 | | L |
| 47 | 119 | | G |

CBLK2 — 93 CLOCK BLOCK NUMBER

FIG. 51

| TRACK NUMBER 91 | FRAME NUMBER 92 | | 96 LAND/GROOVE |
|---|---|---|---|
| 48 | 46 | 47 | L |
| 49 | 106 | 107 | G |
| 50 | 44 | 45 | L |
| 51 | 104 | 105 | G |
| 52 | 43 | | L |
| 53 | 103 | | G |
| 54 | 41 | 42 | L |
| 55 | 101 | 102 | G |
| 56 | 39 | 40 | L |
| 57 | 99 | 100 | G |
| 58 | 37 | 38 | L |
| 59 | 97 | 98 | G |
| 60 | 36 | | L |
| 61 | 96 | | G |
| 62 | 34 | 35 | L |
| 63 | 94 | 95 | G |

CBLK3 — 93 CLOCK BLOCK NUMBER

| 64 | 22 | 23 | L |
|---|---|---|---|
| 65 | 82 | 83 | G |
| 66 | 20 | 21 | L |
| 67 | 80 | 81 | G |
| 68 | 18 | 19 | L |
| 69 | 78 | 79 | G |
| 70 | 16 | 17 | L |
| 71 | 76 | 77 | G |
| 72 | 14 | 15 | L |
| 73 | 74 | 75 | G |
| 74 | 12 | 13 | L |
| 75 | 72 | 73 | G |
| 76 | 10 | 11 | L |
| 77 | 70 | 71 | G |
| 78 | 8 | 9 | L |
| 79 | 68 | 69 | G |

CBLK4

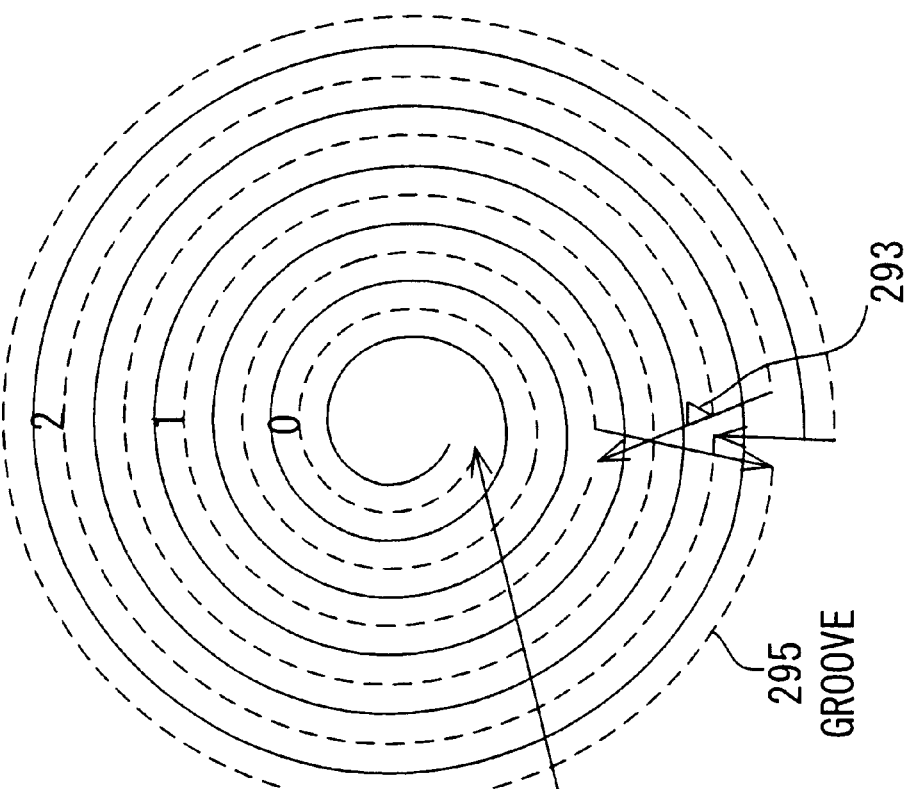
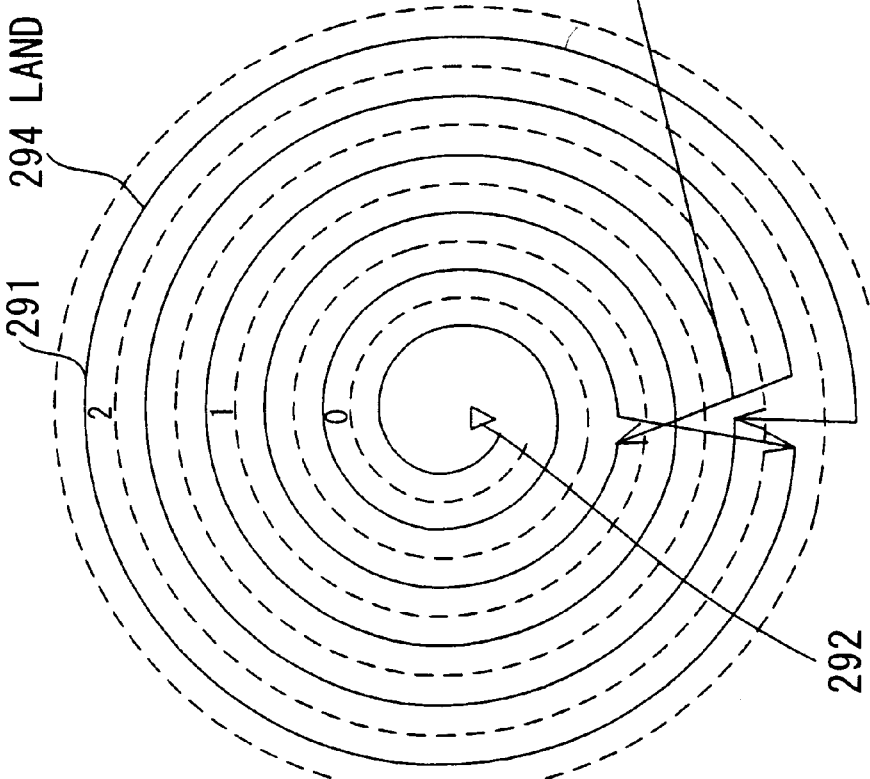

FIG. 53

| 151 | 152 | | | 156 |
|---|---|---|---|---|
| 0 | 0 | | | L |
| 1 | 119 | | | G |
| 2 | 1 | | | L |
| 3 | 118 | | | G |
| 4 | 2 | | | L |
| 5 | 117 | | | G |
| 6 | 3 | | | L |
| 7 | 116 | | | G |
| 8 | 4 | | | L |
| 9 | 115 | | | G |
| 10 | 5 | | | L |
| 11 | 114 | | | G |
| 12 | 6 | | | L |
| 13 | 113 | | | G |
| 14 | 7 | | | L |
| 15 | 112 | | | G |

CBLK0 ~153

| 16 | 24 | | L |
|---|---|---|---|
| 17 | 95 | | G |
| 18 | 25 | 26 | L |
| 19 | | 94 | G |
| 20 | | 27 | L |
| 21 | 92 | 93 | G |
| 22 | 28 | | L |
| 23 | 91 | | G |
| 24 | 29 | | L |
| 25 | 90 | | G |
| 26 | 30 | 31 | L |
| 27 | | 89 | G |
| 28 | | 32 | L |
| 29 | 87 | 88 | G |
| 30 | 33 | | L |
| 31 | 86 | | G |

CBLK1

FIG. 55

| 151 | 152 | | 156 |
|---|---|---|---|
| 48 | 72 | 73 | L |
| 49 | 46 | 47 | G |
| 50 | 74 | 75 | L |
| 51 | 45 | | G |
| 52 | 76 | | L |
| 53 | 43 | 44 | G |
| 54 | 77 | 78 | L |
| 55 | 41 | 42 | G |
| 56 | 79 | 80 | L |
| 57 | 39 | 40 | G |
| 58 | 81 | 82 | L |
| 59 | 38 | | G |
| 60 | 83 | | L |
| 61 | 36 | 37 | G |
| 62 | 84 | 85 | L |
| 63 | 34 | 35 | G |

CBLK3 — 153

| | | | |
|---|---|---|---|
| 64 | 96 | 97 | L |
| 65 | 22 | 23 | G |
| 66 | 98 | 99 | L |
| 67 | 20 | 21 | G |
| 68 | 100 | 101 | L |
| 69 | 18 | 19 | G |
| 70 | 102 | 103 | L |
| 71 | 16 | 17 | G |
| 72 | 104 | 105 | L |
| 73 | 14 | 15 | G |
| 74 | 106 | 107 | L |
| 75 | 12 | 13 | G |
| 76 | 108 | 109 | L |
| 77 | 10 | 11 | G |
| 78 | 110 | 111 | L |
| 79 | 8 | 9 | G |

CBLK4

FIG. 56

| 101 | 102 | 106 |
|---|---|---|
| 0 | 0 | L |
| 1 | 60 | G |
| 2 | 1 | L |
| 3 | 61 | G |
| 4 | 2 | L |
| 5 | 62 | G |
| 6 | 3 | L |
| 7 | 63 | G |
| 8 | 4 | L |
| 9 | 64 | G |
| 10 | 5 | L |
| 11 | 65 | G |
| 12 | 6 | L |
| 13 | 66 | G |
| 14 | 7 | L |
| 15 | 67 | G |

CBLK0 ~ 103

| | | | |
|---|---|---|---|
| 16 | 24 | | L |
| 17 | 84 | | G |
| 18 | 25 | 26 | L |
| 19 | 85 | 86 | G |
| 20 | | 27 | L |
| 21 | | 87 | G |
| 22 | 28 | | L |
| 23 | 88 | | G |
| 24 | 29 | | L |
| 25 | 89 | | G |
| 26 | 30 | 31 | L |
| 27 | 90 | 91 | G |
| 28 | | 32 | L |
| 29 | | 92 | G |
| 30 | 33 | | L |
| 31 | 93 | | G |

CBLK1

FIG. 58

| | | | |
|---|---|---|---|
| 48 | 47 | 46 | L |
| 49 | 107 | 106 | G |
| 50 | 45 | | L |
| 51 | 105 | | G |
| 52 | 44 | 43 | L |
| 53 | 104 | 103 | G |
| 54 | 42 | 41 | L |
| 55 | 102 | 101 | G |
| 56 | 40 | 39 | L |
| 57 | 100 | 99 | G |
| 58 | 38 | | L |
| 59 | 98 | | G |
| 60 | 37 | 36 | L |
| 61 | 97 | 96 | G |
| 62 | 35 | 34 | L |
| 63 | 95 | 94 | G |

CBLK3

| | | | |
|---|---|---|---|
| 64 | 23 | 22 | L |
| 65 | 83 | 82 | G |
| 66 | 21 | 20 | L |
| 67 | 81 | 80 | G |
| 68 | 19 | 18 | L |
| 69 | 79 | 78 | G |
| 70 | 17 | 16 | L |
| 71 | 77 | 76 | G |
| 72 | 15 | 14 | L |
| 73 | 75 | 74 | G |
| 74 | 13 | 12 | L |
| 75 | 73 | 72 | G |
| 76 | 11 | 10 | L |
| 77 | 71 | 70 | G |
| 78 | 9 | 8 | L |
| 79 | 69 | 68 | G |

CBLK4

FIG. 60

| # | 162 | 166 |
|---|---|---|
| 0 | 0 | L |
| 1 | 119 | G |
| 2 | 1 | L |
| 3 | 118 | G |
| 4 | 2 | L |
| 5 | 117 | G |
| 6 | 3 | L |
| 7 | 116 | G |
| 8 | 4 | L |
| 9 | 115 | G |
| 10 | 5 | L |
| 11 | 114 | G |
| 12 | 6 | L |
| 13 | 113 | G |
| 14 | 7 | L |
| 15 | 112 | G |

CBLK0 ~163

| # | | |
|---|---|---|
| 16 | 24 | L |
| 17 | 95 | G |
| 18 | 25, 26 | L |
| 19 | 94 | G |
| 20 | 27 | L |
| 21 | 93, 92 | G |
| 22 | 28 | L |
| 23 | 91 | G |
| 24 | 29 | L |
| 25 | 90 | G |
| 26 | 30, 31 | L |
| 27 | 89 | G |
| 28 | 32 | L |
| 29 | 88, 87 | G |
| 30 | 33 | L |
| 31 | 86 | G |

CBLK1

FIG. 62

| | | | |
|---|---|---|---|
| 48 | 72 | 73 | L |
| 49 | 47 | 46 | G |
| 50 | 74 | 75 | L |
| 51 | 45 | | G |
| 52 | 76 | | L |
| 53 | 44 | 43 | G |
| 54 | 77 | 78 | L |
| 55 | 42 | 41 | G |
| 56 | 79 | 80 | L |
| 57 | 40 | 39 | G |
| 58 | 81 | 82 | L |
| 59 | 38 | | G |
| 60 | 83 | | L |
| 61 | 37 | 36 | G |
| 62 | 84 | 85 | L |
| 63 | 35 | 34 | G |

CBLK3—163

| | | | |
|---|---|---|---|
| 64 | 96 | 97 | L |
| 65 | 23 | 22 | G |
| 66 | 98 | 99 | L |
| 67 | 21 | 20 | G |
| 68 | 100 | 101 | L |
| 69 | 19 | 18 | G |
| 70 | 102 | 103 | L |
| 71 | 17 | 16 | G |
| 72 | 104 | 105 | L |
| 73 | 15 | 14 | G |
| 74 | 106 | 107 | L |
| 75 | 13 | 12 | G |
| 76 | 108 | 109 | L |
| 77 | 11 | 10 | G |
| 78 | 110 | 111 | L |
| 79 | 9 | 8 | G |

CBLK4

FIG. 63

| 111 | 112 | 116 |
|---|---|---|
| 0 | 103 | G |
| 1 | 43 | L |
| 2 | 102 | G |
| 3 | 42 | L |
| 4 | 101 | G |
| 5 | 41 | L |
| 6 | 100 | G |
| 7 | 40 | L |
| 8 | 99 | G |
| 9 | 39 | L |
| 10 | 98 | G |
| 11 | 38 | L |
| 12 | 97 | G |
| 13 | 37 | L |
| 14 | 96 | G |
| 15 | 36 | L |

CBLK0 ~ 113

| | | | |
|---|---|---|---|
| 16 | 81 | | G |
| 17 | 21 | | L |
| 18 | 80 | 79 | G |
| 19 | 20 | 19 | L |
| 20 | | 78 | G |
| 21 | | 18 | L |
| 22 | 77 | | G |
| 23 | 17 | | L |
| 24 | 76 | | G |
| 25 | 16 | | L |
| 26 | 75 | 74 | G |
| 27 | 15 | 14 | L |
| 28 | | 73 | G |
| 29 | | 13 | L |
| 30 | 72 | | G |
| 31 | 12 | | L |

CBLK1

FIG. 65

| 111 | 112 | | 116 |
|---|---|---|---|
| 48 | 22 | 23 | L |
| 49 | 82 | 83 | G |
| 50 | 24 | 25 | L |
| 51 | 84 | 85 | G |
| 52 | 26 | | L |
| 53 | 86 | | G |
| 54 | 27 | 28 | L |
| 55 | 87 | 88 | G |
| 56 | 29 | 30 | L |
| 57 | 89 | 90 | G |
| 58 | 31 | 32 | L |
| 59 | 91 | 92 | G |
| 60 | 33 | | L |
| 61 | 93 | | G |
| 62 | 34 | 35 | L |
| 63 | 94 | 95 | G |

CBLK3 — 113

| 64 | 44 | 45 | L |
|---|---|---|---|
| 65 | 104 | 105 | G |
| 66 | 46 | 47 | L |
| 67 | 106 | 107 | G |
| 68 | 48 | 49 | L |
| 69 | 108 | 109 | G |
| 70 | 50 | 51 | L |
| 71 | 110 | 111 | G |
| 72 | 52 | 53 | L |
| 73 | 112 | 113 | G |
| 74 | 54 | 55 | L |
| 75 | 114 | 115 | G |
| 76 | 56 | 57 | L |
| 77 | 116 | 117 | G |
| 78 | 58 | 59 | L |
| 79 | 118 | 119 | G |

CBLK4

FIG. 67

| | 171 | 172 | | 176 |
|---|---|---|---|---|
| 0 | | 91 | | G |
| 1 | | 31 | | L |
| 2 | | 90 | | G |
| 3 | | 30 | | L |
| 4 | | 89 | | G |
| 5 | | 29 | | L |
| 6 | | 88 | | G |
| 7 | | 28 | | L |
| 8 | | 87 | | G |
| 9 | | 27 | | L |
| 10 | | 86 | | G |
| 11 | | 26 | | L |
| 12 | | 85 | | G |
| 13 | | 25 | | L |
| 14 | | 84 | | G |
| 15 | | 24 | | L |

CBLK0 — 173

| 16 | 69 | | G |
|---|---|---|---|
| 17 | 9 | | L |
| 18 | 68 | 67 | G |
| 19 | 8 | 7 | L |
| 20 | | 66 | G |
| 21 | | 6 | L |
| 22 | 65 | | G |
| 23 | 5 | | L |
| 24 | 64 | | G |
| 25 | 4 | | L |
| 26 | 63 | 62 | G |
| 27 | 3 | 2 | L |
| 28 | | 61 | G |
| 29 | | 1 | L |
| 30 | 60 | | G |
| 31 | 0 | | L |

CBLK1

FIG. 68

| 171 | 172 | | 176 |
|---|---|---|---|
| 32 | 113 | 112 | G |
| 33 | 53 | 52 | L |
| 34 | | 111 | G |
| 35 | | 51 | L |
| 36 | 110 | 109 | G |
| 37 | 50 | 49 | L |
| 38 | | 108 | G |
| 39 | | 48 | L |
| 40 | 54 | 55 | G |
| 41 | 104 | 105 | L |
| 42 | | 56 | G |
| 43 | | 106 | L |
| 44 | 57 | 58 | G |
| 45 | 107 | 108 | L |
| 46 | | 59 | G |
| 47 | | 109 | L |

175

CBLK2 — 173

FIG. 69

| | 171 | 172 | | 176 |
|---|---|---|---|---|
| 48 | | 70 | 71 | L |
| 49 | | 10 | 11 | G |
| 50 | | 72 | 73 | L |
| 51 | | 12 | 13 | G |
| 52 | | 74 | | L |
| 53 | | 14 | | G |
| 54 | | 75 | 76 | L |
| 55 | | 15 | 16 | G |
| 56 | | 77 | 78 | L |
| 57 | | 17 | 18 | G |
| 58 | | 79 | 80 | L |
| 59 | | 19 | 20 | G |
| 60 | | 81 | | L |
| 61 | | 21 | | G |
| 62 | | 82 | 83 | L |
| 63 | | 22 | 23 | G |

CBLK3 ~173

| 64 | 92 | 93 | L |
|---|---|---|---|
| 65 | 32 | 33 | G |
| 66 | 94 | 95 | L |
| 67 | 34 | 35 | G |
| 68 | 96 | 97 | L |
| 69 | 36 | 37 | G |
| 70 | 98 | 99 | L |
| 71 | 38 | 39 | G |
| 72 | 100 | 101 | L |
| 73 | 40 | 41 | G |
| 74 | 102 | 103 | L |
| 75 | 42 | 43 | G |
| 76 | 104 | 105 | L |
| 77 | 44 | 45 | G |
| 78 | 106 | 107 | L |
| 79 | 46 | 47 | G |

CBLK4

FIG. 70

| | 121 | 122 | 126 |
|---|---|---|---|
| 0 | | 60 | G |
| 1 | | 0 | L |
| 2 | | 61 | G |
| 3 | | 1 | L |
| 4 | | 62 | G |
| 5 | | 2 | L |
| 6 | | 63 | G |
| 7 | | 3 | L |
| 8 | | 64 | G |
| 9 | | 4 | L |
| 10 | | 65 | G |
| 11 | | 5 | L |
| 12 | | 66 | G |
| 13 | | 6 | L |
| 14 | | 67 | G |
| 15 | | 7 | L |

CBLK0 — 123

| | | | |
|---|---|---|---|
| 16 | 84 | | G |
| 17 | 24 | | L |
| 18 | 85 | 86 | G |
| 19 | 25 | 26 | L |
| 20 | | 87 | G |
| 21 | | 27 | L |
| 22 | 88 | | G |
| 23 | 28 | | L |
| 24 | 89 | | G |
| 25 | 29 | | L |
| 26 | 90 | 91 | G |
| 27 | 30 | 31 | L |
| 28 | | 92 | G |
| 29 | | 32 | L |
| 30 | 93 | | G |
| 31 | 33 | | L |

CBLK1

FIG. 72

| | | | |
|---|---|---|---|
| 48 | 47 | 46 | L |
| 49 | 107 | 106 | G |
| 50 | 45 | | L |
| 51 | 105 | | G |
| 52 | 44 | 43 | L |
| 53 | 104 | 103 | G |
| 54 | 42 | 41 | L |
| 55 | 102 | 101 | G |
| 56 | 40 | 39 | L |
| 57 | 100 | 99 | G |
| 58 | 38 | | L |
| 59 | 98 | | G |
| 60 | 37 | 36 | L |
| 61 | 97 | 96 | G |
| 62 | 35 | 34 | L |
| 63 | 95 | 94 | G |

CBLK3

| | | | |
|---|---|---|---|
| 64 | 23 | 22 | L |
| 65 | 83 | 82 | G |
| 66 | 21 | 20 | L |
| 67 | 81 | 80 | G |
| 68 | 19 | 18 | L |
| 69 | 79 | 78 | G |
| 70 | 17 | 16 | L |
| 71 | 77 | 76 | G |
| 72 | 15 | 14 | L |
| 73 | 75 | 74 | G |
| 74 | 13 | 12 | L |
| 75 | 73 | 72 | G |
| 76 | 11 | 10 | L |
| 77 | 71 | 70 | G |
| 78 | 9 | 8 | L |
| 79 | 69 | 68 | G |

CBLK4

FIG. 74

| | 181 | 182 | | 186 |
|---|---|---|---|---|
| 0 | | 60 | | G |
| 1 | | 0 | | L |
| 2 | | 61 | | G |
| 3 | | 1 | | L |
| 4 | | 62 | | G |
| 5 | | 2 | | L |
| 6 | | 63 | | G |
| 7 | | 3 | | L |
| 8 | | 64 | | G |
| 9 | | 4 | | L |
| 10 | | 65 | | G |
| 11 | | 5 | | L |
| 12 | | 66 | | G |
| 13 | | 6 | | L |
| 14 | | 67 | | G |
| 15 | | 7 | | L |

CBLK0 — 183

| | | | | |
|---|---|---|---|---|
| 16 | | 84 | | G |
| 17 | | 24 | | L |
| 18 | 85 | | 86 | G |
| 19 | 25 | | 26 | L |
| 20 | | | 87 | G |
| 21 | | | 27 | L |
| 22 | | 88 | | G |
| 23 | | 28 | | L |
| 24 | | 89 | | G |
| 25 | | 29 | | L |
| 26 | 90 | | 91 | G |
| 27 | 30 | | 31 | L |
| 28 | | | 92 | G |
| 29 | | | 32 | L |
| 30 | | 93 | | G |
| 31 | | 33 | | L |

CBLK1

FIG. 76

| | 182 | | 186 |
|---|---|---|---|
| 181 | | | |
| 48 | 107 | 106 | L |
| 49 | 47 | 46 | G |
| 50 | 105 | | L |
| 51 | 45 | | G |
| 52 | 104 | 103 | L |
| 53 | 44 | 43 | G |
| 54 | 102 | 101 | L |
| 55 | 42 | 41 | G |
| 56 | 100 | 99 | L |
| 57 | 40 | 39 | G |
| 58 | 98 | | L |
| 59 | 38 | | G |
| 60 | 97 | 96 | L |
| 61 | 37 | 36 | G |
| 62 | 95 | 94 | L |
| 63 | 35 | 34 | G |

CBLK3 ~183

| 64 | 83 | 82 | L |
|---|---|---|---|
| 65 | 23 | 22 | G |
| 66 | 81 | 80 | L |
| 67 | 21 | 20 | G |
| 68 | 79 | 78 | L |
| 69 | 19 | 18 | G |
| 70 | 77 | 76 | L |
| 71 | 17 | 16 | G |
| 72 | 75 | 74 | L |
| 73 | 15 | 14 | G |
| 74 | 73 | 72 | L |
| 75 | 13 | 12 | G |
| 76 | 71 | 70 | L |
| 77 | 11 | 10 | G |
| 78 | 69 | 68 | L |
| 79 | 9 | 8 | G |

CBLK4

METHOD AND APPARATUS FOR WRITING INFORMATION INTO OPTICAL DISK AND READING IT THEREFROM, AND OPTICAL DISK MEDIUM THEREFOR

FIELD OF THE INVENTION

The present invention relates to an apparatus capable of writing digital data or data such as digital image, audio, system, etc. into an optical disk (including optical magnetic disk, and phase change disk) medium and reading the data therefrom wherein a side of an inner radius of the disk is efficiently utilized, and the number of revolutions in the disk is reduced as much as possible for elevating capacity for writing, whereby high density writing, non-linear editing, high-speed search and the like are realized at the same time.

BACKGROUND OF THE INVENTION

In a disk (optical disk, optical magnetic disk, phase change disk) unit into which digital data or image-audio data is written, a CAV or CLV system, and a combined system thereof, have been proposed heretofore.

CAV system is a writing system wherein the number of revolutions is constant. According to this system, since the number of revolutions is constant irrespective of a position of head, there are such advantages that high-speed search can be realized, simultaneous reading of data at a different position from that at which another data is written is possible, and the spindle servomechanism is simplified. Disadvantages are that the shortest writing wavelength is determined by the innermost radius, so that it is not suitable for high-density writing of data.

CLV system is a writing system wherein linear velocity is constant. According to this system, there are such advantages that since relative velocity is constant throughout a disk, writing wavelength is constant, so that it is suitable for high-density writing of data. Disadvantages are since the number of revolutions varies dependent upon a position of head, it is unsuitable for high-speed search, simultaneous reading of data at a different position from that at which another data is written is impossible, and spindle servomechanism is complicated.

A writing system of information obtained by combining a CAV system with a CLV system has been also proposed. In this system, the number of revolutions in a disk is made constant, and an amount of information to be written into one track is allowed to increase in proportion to its radius. In other words, since the number of revolutions is constant, this system results in a variable clock writing system wherein the writing bit rate is increased in proportion to radius and variable clock reading system. According to this combined system, writing wavelength is constant throughout a disk and the number of revolutions of the disk is constant, resulting in advantages. Such as the ability to perform high-speed search simultaneous reading of data at a different position from that at which another data is written and simplification of the spindle servomechanism.

FIGS. 1 to 3 are diagrams each showing a constitution of tracks. In this case, data to be written is, for example, image data which has been subjected to fixed length coding in frame, and 1 frame is composed of 8 blocks (hereinafter referred to as "single block SB"). Further, the total track number is made to be 80 tracks. The storing area is divided equally into 10 sections in the track direction to be 8 tracks per 1 storing region (hereinafter referred to as "clock block CBLK").

Data of ⅞ frame per 1 track, total 7 frames is written in CBLK0 which is the innermost radius, data of 1 frame per 1 track, total 8 frames is written in CBLK1, data of ⁹⁄₈ frames per 1 track, total 9 frames is written in CBLK2, in the following, the number of storing frames per 1 track is increased by each ⅛ frame in every CBLKs, and finally data of 2 frames per 1 track, total 16 frames is written in CBLK9 being the outermost radius. A track number is designated by reference numeral 351, a frame number is designated by reference numeral 352, and a clock block number is designated by reference numeral 353 in the figures. As indicated in these figures, data can be written into total 115 frames extending from frame 0 to frame 114 and reading such data therefrom at the constant number of revolutions, besides, the shortest writing wavelength becomes substantially constant.

Moreover, although a manner for writing data differs from that described above, there is a manner for writing information called by the name of land/groove writing information wherein information is written by utilizing both sides of land and groove of disk track. When information is written in accordance with this manner, two times higher writing density than that of a conventional land writing or groove writing manner can be obtained, whereby extension of a writing period of time can be realized. An example of spiral track for land/groove writing information is shown in FIG. 4, and as a constitutional diagram of tracks thereof is shown in FIG. 5 wherein reference numeral 361 designates land track, and reference numeral 362 denotes groove track.

As shown in FIG. 4, when the optical head jumps once backwardly from land to groove per 1 track or from groove to land by 1 track, the same processing as a usual one occurs wherein only grooves exist becomes possible.

When actually writing information shown in FIGS. 1 to 3, the number of revolutions of a disk must be adapted to be capable of writing information of ⅞ frame in 1 track in order to match the number of revolutions to that of the innermost radius which must be fastest. More specifically, when it is assumed that frame frequency is 29.97 Hz, the number of revolutions must be 34.3 rps which is induced from 29.97× 8/7. According to the manner for writing information as described above, there is no problem in such a case as illustrated above wherein information of ⅞ frame is written into 1 track at the innermost radius. However, when information of ⅔ to ⅜ frame is intended to write into 1 track, the number of revolutions becomes 80 to 120 rps, so that the value becomes difficult to realize. Moreover, since the number of revolutions is determined by the innermost radius, the innermost radius is not so extensively utilized towards inner radius.

Namely, when such a definition that CBLK-1, CBLK-2, . . . , is positioned on more inner radius than CBLK0 in FIG. 1 is continued, ⅝ frame, ⅝ frame, . . . must be adapted to be capable of writing information in 1 track. Thus, there has been such disadvantage that the number of revolutions of a disk increases in such fashion of 40 rps, 48 rps, . . . , so that a storing region is restricted at a certain position in the disk due to the number of revolutions.

SUMMARY OF THE INVENTION

Accordingly, an object of the present invention is to provide a method and an apparatus for writing information into an optical disk and reading it therefrom in which a writing capacity of the disk can be increased by realizing simultaneously writing of information at a constant number of revolutions with writing of information at a constant wavelength in the disk at a low rate.

According to a first feature of the invention, a method is provided for writing information into an optical disk and reading it therefrom, which comprises the steps of:

rotating an optical disk for writing data transmitted from a higher rank device at a constant rate (disk driving step);

producing a variable clock which varies a write or read clock for each of a plurality of storing regions defined from the inner circumference side toward the outer circumference side of the disk driven at a constant rate (variable clock production step); and writing or reading data according to the clock produced for each storing region in the variable clock production step (write/read step), wherein the write/read step comprises temporarily storing data, to be written or read, according to a difference between the rate of data input into or output from the higher rank device and the data write/read rate determined for each of the plurality of storing regions (buffer step).

According to a second feature of the invention, an apparatus is provided for writing information into an optical disk and reading it therefrom, which apparatus comprises:

variable clock production means which varies a write or read clock for each of a plurality of storing regions defined from the inner circumference side toward the outer circumference side of an optical disk;

disk control means for rotating the optical disk at a predetermined constant rate; and buffer means for absorbing a difference between the data write/read rate determined for each of the plurality of storing regions and the rate of data input into or output from the higher rank device.

According to a third feature of the invention, an optical disk medium is provided with is adapted for information to be written therein or information to be read therefrom by means of an apparatus for writing information into an optical disk or reading it therefrom, the optical disk having a plurality of storing regions divided for each predetermined writing/reading clock from the innermost circumference side to the outermost circumference side, the head portion in the plurality of storing regions having a storing region number associated with the data-write or data-read rate of each of the storing regions.

BRIEF DESCRIPTION OF THE DRAWINGS

The present invention will be explained in more detail in conjunction with appended drawings, wherein:

FIG. 3 is a constitutional diagram showing a track configuration following to the tracks shown in FIG. 2;

FIG. 10 is a constitutional diagram showing a track configuration following to the tracks shown in FIG. 9;

FIG. 15 is a constitutional diagram showing a track configuration following to the tracks shown in FIG. 14;

FIG. 19 is a constitutional diagram showing a track configuration following to the tracks shown in FIG. 18;

FIG. 24 is a constitutional diagram showing a track configuration following to the tracks shown in FIG. 23;

FIG. 29 is a constitutional diagram showing a track configuration following to the tracks shown in FIG. 28;

FIG. 33 is a constitutional diagram showing a track configuration following to the tracks shown in FIG. 32;

FIG. 35 is a constitutional diagram showing a track configuration (L/G writing), on the side of inner radius, based on which writing of information is started from the innermost and the outermost radii according to a seventh embodiment of the invention;

FIG. 36 is a constitutional diagram showing a track configuration following to the tracks shown in FIG. 35;

FIG. 37 is a constitutional diagram showing a track configuration following to the tracks shown in FIG. 36;

FIGS. 38A and 38B are explanatory diagrams each showing an outline of spiral tracks corresponding to that of FIGS. 35 to 37, respectively, wherein FIG. 38A is a diagram showing a writing order on the land side, and FIG. 38B is a diagram showing a writing order on the groove side;

FIG. 39 is a constitutional diagram showing a track configuration (L/G writing, L/G random), on the side of inner radius, based on which writing of information is started from the innermost and the outermost radii according to another example of the seventh embodiment of the invention;

FIG. 41 is a constitutional diagram showing a track configuration following to the tracks shown in FIG. 40;

FIG. 42 is a constitutional diagram showing a track configuration (L/G writing), on the side of inner radius, based on which writing of information from the innermost and intermediate radii dependent upon a remaining buffer according to a eighth embodiment of the invention;

FIG. 43 is a constitutional diagram showing a track configuration following to the tracks shown in FIG. 42;

FIG. 44 is a constitutional diagram showing a track configuration following to the tracks shown in FIG. 43;

FIGS. 45A and 45B are explanatory diagrams each showing an outline of spiral tracks corresponding to that of FIGS. 42 to 44, respectively, wherein FIG. 45A is a diagram showing a writing order on the land side, and FIG. 45B is a diagram showing writing order on the groove side;

FIG. 46 is a constitutional diagram showing a track configuration (L/G writing, L/G random), on the side of inner radius, based on which writing of information is started from the innermost and intermediate radii dependent upon a remaining buffer according to another example of the eighth embodiment of the invention;

FIG. 47 is a constitutional diagram showing a track configuration following to the tracks shown in FIG. 46;

FIG. 48 is a constitutional diagram showing a track configuration following to the tracks shown in FIG. 47;

FIG. 49 is a constitutional diagram showing a track configuration (L/G writing), on the side of inner radius, based of which two track backward jumping is performed in group 1 according to a ninth embodiment of the invention;

FIG. 50 is a constitutional diagram showing a track configuration following to the tracks shown in FIG. 49;

FIG. 51 is a constitutional diagram showing a track configuration following to the tracks shown in FIG. 50;

FIGS. 52A and 52B are explanatory diagrams each showing an outline of spiral tracks corresponding to that of FIGS. 49 to 51, respectively, wherein FIG. 52A is a diagram showing a writing order on the land side, and FIG. 52B is a diagram showing a writing order on the groove side;

FIG. 53 is a constitutional diagram showing a track configuration (L/G writing), on the side of inner radius, based on which two track backward jumping is performed in group 1 according to another example of the ninth embodiment of the invention;

FIG. 55 is a constitutional diagram showing a track configuration following to the tracks shown in FIG. 54;

FIG. 56 is a constitutional diagram showing a track configuration (L/G writing), on the side of inner radius, based on which one track backward jumping is performed in group 1 according to a tenth embodiment of the invention;

FIG. 58 is a constitutional diagram showing a track configuration following to the tracks shown in FIG. 57;

FIGS. 59A and 59B are explanatory diagrams each showing an outline of spiral tracks corresponding to that of FIGS. 56 to 58, respectively, wherein FIG. 59A is a diagram showing a writing order on the land side, and FIG. 59B is a diagram showing a writing order on the groove side;

FIG. 60 is a constitutional diagram showing a track configuration (L/G writing, L/G random), on the side of inner radius, based on which one track backward jumping is performed in group 1 according to another example of the tenth embodiment of the invention;

FIG. 62 is a constitutional diagram showing a track configuration following to the tracks shown in FIG. 61;

FIG. 63 is a constitutional diagram showing a track configuration (L/G writing), on the side of inner radius, based of which writing of information is started from intermediate radius in a disk which reverses a spiral direction at the disk center according to a eleventh embodiment of the invention;

FIG. 65 is a constitutional diagram showing a track configuration following to the tracks shown in FIG. 64;

FIGS. 66A and 66B are explanatory diagrams each showing an outline of spiral tracks corresponding to that of FIGS. 63 to 65, respectively, wherein FIG. 66A is a diagram showing a writing order on the land side, and FIG. 66B is a diagram showing a writing order on the groove side;

FIG. 67 is a constitutional diagram showing a track configuration (L/G writing, L/G random), on the side of inner radius, based of which writing of information is started from intermediate radius in a disk which reverses a spiral direction at the disk center according to another example of the eleventh embodiment of the invention;

FIG. 68 is a constitutional diagram showing a track configuration following to the tracks shown in FIG. 67;

FIG. 69 is a constitutional diagram showing a track configuration following to the tracks shown in FIG. 68;

FIG. 70 is a constitutional diagram showing a track configuration (L/G writing), on the side of inner radius, based on which writing of information is started from the innermost radius in a disk which reverses a spiral direction at the disk center according to a twelfth embodiment of the invention;

FIG. 72 is a constitutional diagram showing a track configuration following to the tracks shown in FIG. 71;

FIGS. 73A and 73B are explanatory diagrams each showing an outline of spiral tracks corresponding to that of FIGS. 70 to 72, respectively, wherein FIG. 73A is a diagram showing a writing order on the land side, and FIG. 73B is a diagram showing a writing order on the groove side;

FIG. 74 is a constitutional diagram showing a track configuration (L/G writing, L/G random) based of which writing of information is started from the innermost radius in a disk which reverses a spiral direction at the disk center according to another example of the twelfth embodiment of the invention;

FIG. 76 is a constitutional diagram showing a track configuration following to the tracks shown in FIG. 75.

DESCRIPTION OF THE PREFERRED EMBODIMENTS

Figure 1:
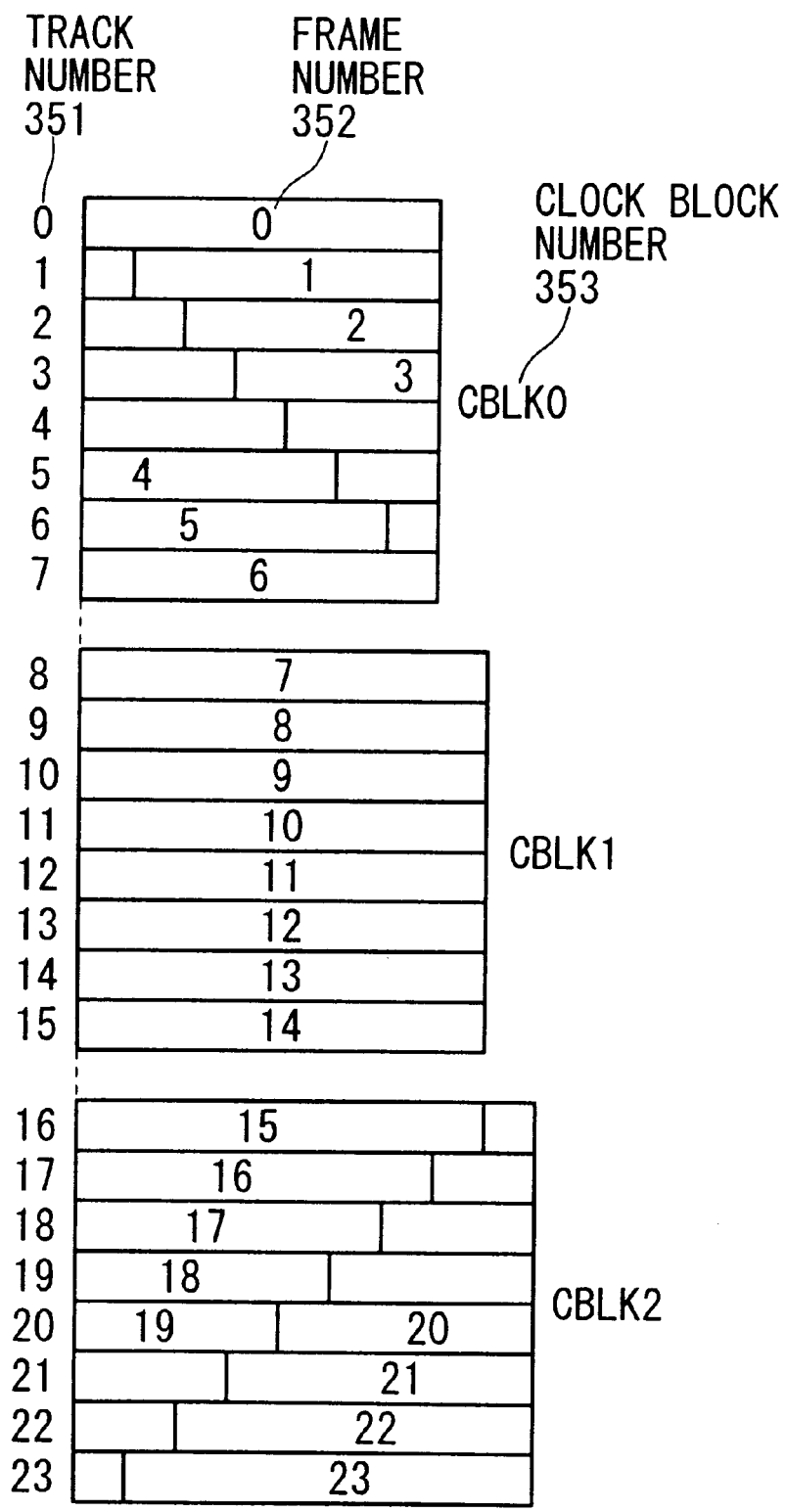
FIG. 1 is a constitutional diagram showing a conventional track configuration on the side of inner radius.
Figure 2:
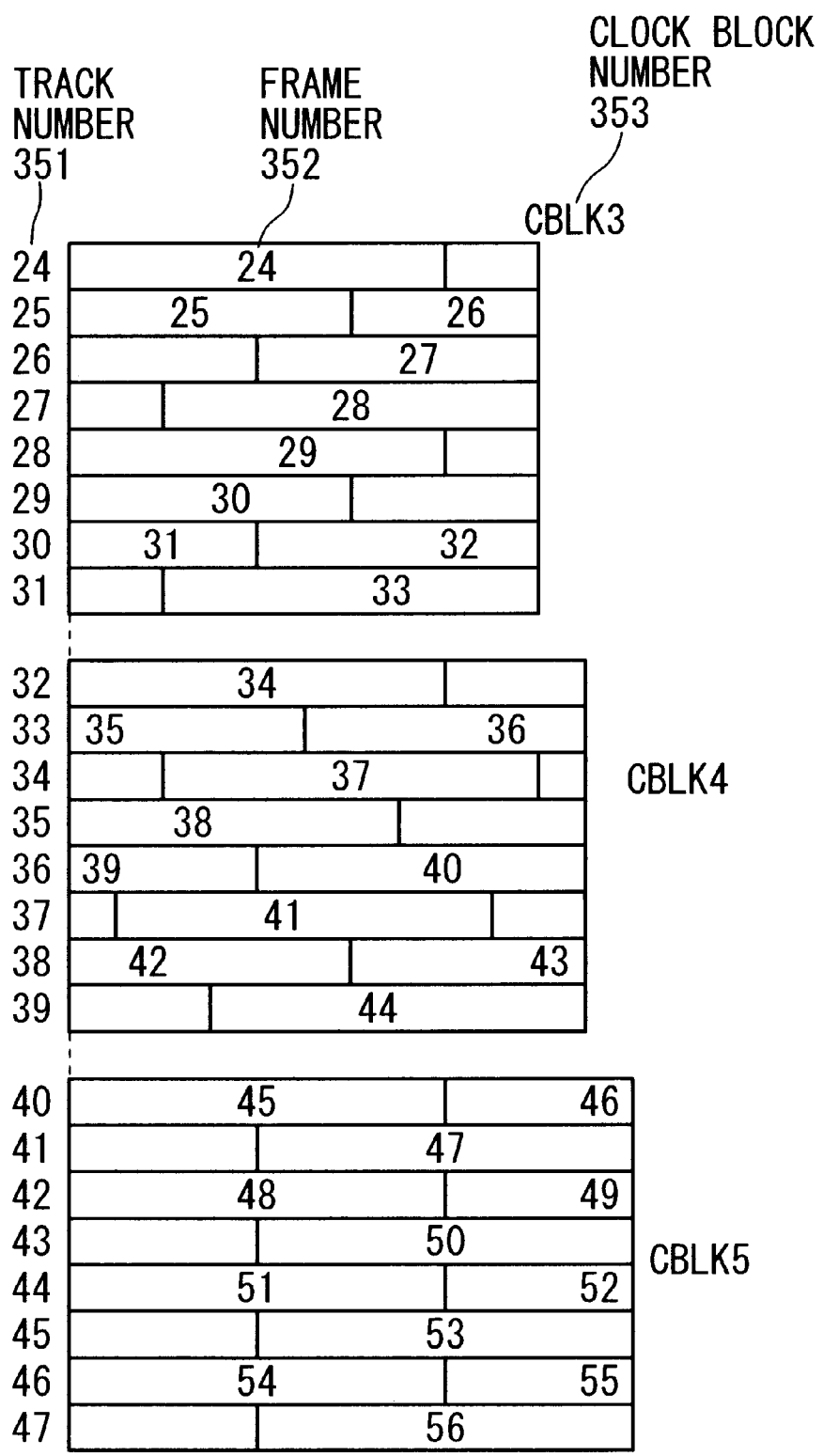
FIG. 2 is a constitutional diagram showing a track configuration following to the tracks shown in FIG. 1.
Figure 4:
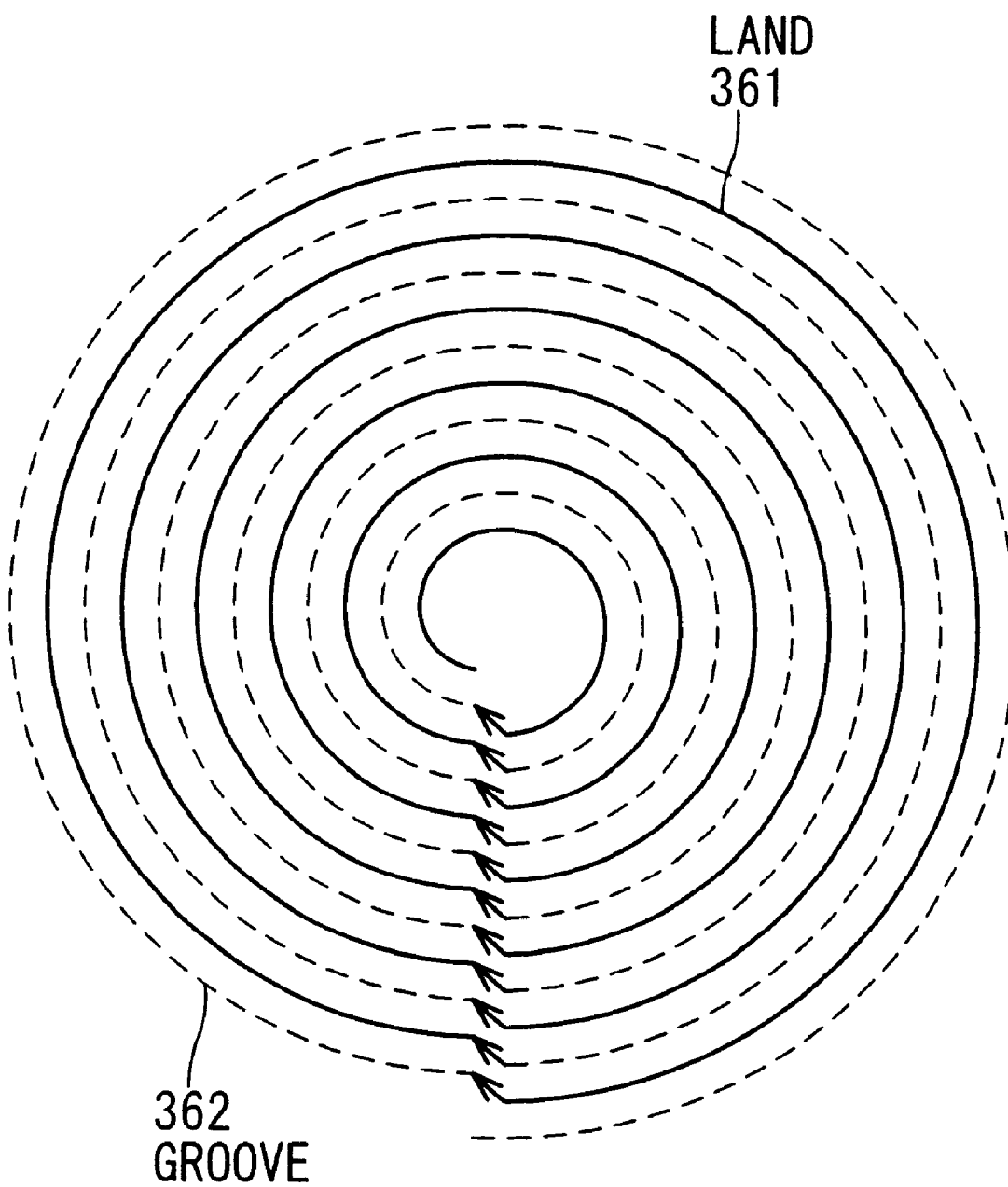
FIG. 4 is an explanatory diagram showing conventional spiral tracks.
Figure 5:
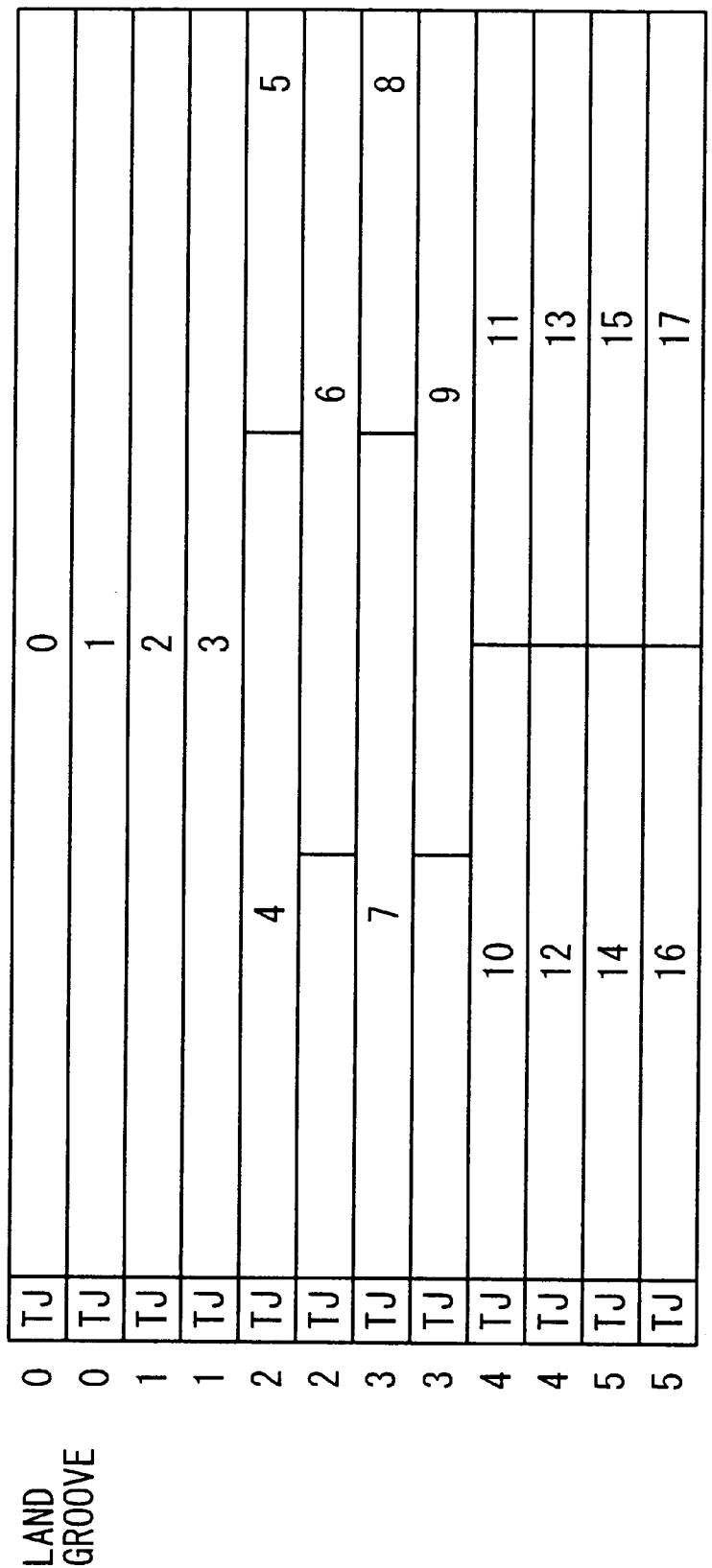
FIG. 5 is a constitutional diagram showing a track configuration corresponding to that of FIG. 4.
Figure 6:
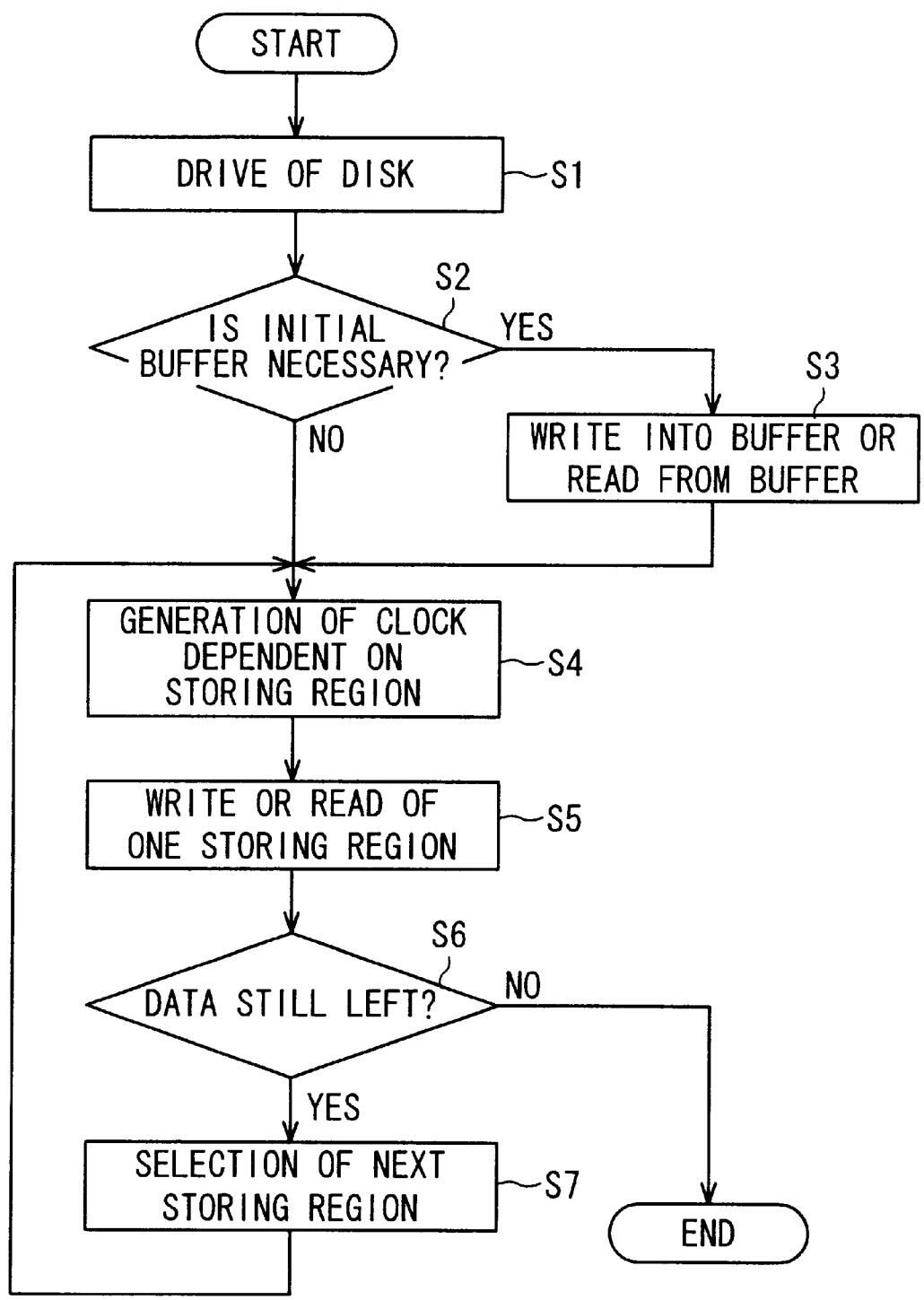
FIG. 6 is a flowchart illustrating the constitution of a manner of practice according to the present invention.

FIG. 6 is a flowchart showing the constitution of a manner of practice according to the present invention. In the method for writing information into an optical disk according to the present invention, an optical disk for writing data transmitted from an upstream device is rotated at a constant rate (disk driving process, step S1). When the optical disk reaches the constant rate, data is written thereinto or read therefrom. In this case, since writing speed of data differs dependent on sites, i.e., the sides of inner radius and outer radius in the disk, it is judged whether or not initial buffer is necessary. In necessary case, data having a capacity in response to a data writing and reading rate in a storing region is stored in buffer.

Then, a clock is varied in response to a storing region (clock block) where data is written into or read therefrom to generate the resulting clock. Thereafter, data is to be written or to be read on the basis of the resulting clock. In this writing or reading of data, a data to be written or read is stored tentatively in a buffer in response to the fact to the effect that whether a storing region is on the side of inner radius or not, but the side of outer radius of a disk. On the side of inner radius, since writing of data into an optical disk is slower than a data transfer rate of an upstream device, the data from the upstream device is not completely written into the optical disk, but stored in the buffer. On the other hand, since writing of data can be effected at a faster rate than that of data transfer from the upstream device on the side of outer radius, the data stored in buffer and the data transferred from the upstream device can be written continuously. A difference of such storage capacity produced on both sides of inner and outer radii is solved by the use of buffer in step S5 shown in FIG. 6.

Furthermore, an example shown in FIG. 6 involves a storing region selecting process step S7 for selecting succeedingly a storing region to write or read data in accordance with a writing and reading rate of the data which is determined in every plural storage regions in the case when it is instructed to write a data exceeding the above described one storage region into or read from the aforesaid upstream device. To select successively the storage region, particularly to select successively sides of inner and outer radii, it becomes possible to reduce a capacity of buffer.

Figure 7:
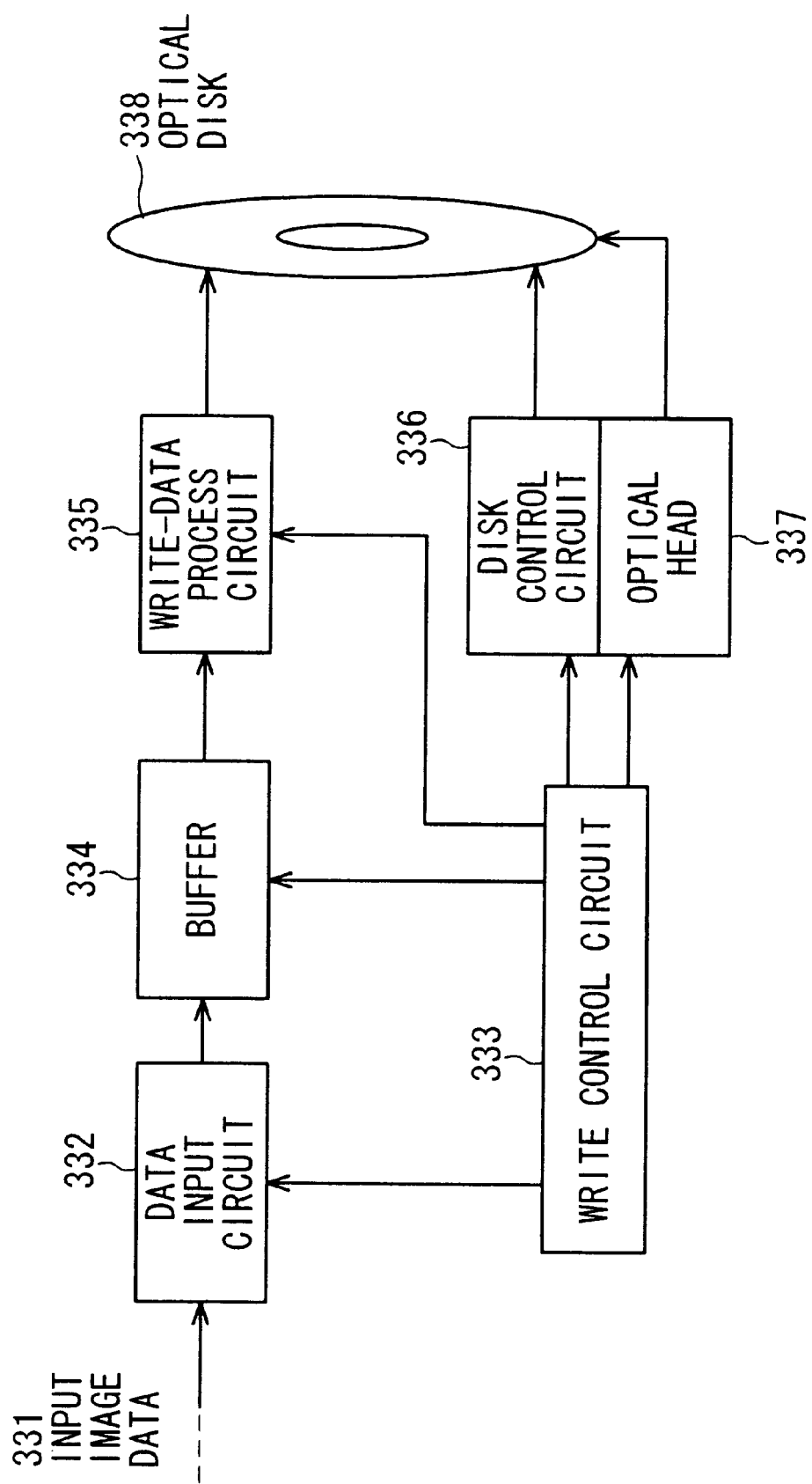
FIG. 7 is a block diagram showing a constitution of the apparatus for writing information into an optical disk according to the present manner of practice.

FIG. 7 is a block diagram showing a constitution of the apparatus for writing information into an optical disk according to the present invention. The apparatus for writing information into an optical disk is composed of a data input circuit 332 for processing input image data 331 from the outside (upstream device); a write control circuit 333 for controlling each block; a buffer circuit 334 for canceling a difference between an input data rate and a write data rate; a write-data process circuit 335 for selecting the number of a writing region to be written so as not to cause overflow and underflow of the above described buffer, thereby to deliver a write-data to the disk; a disk control circuit 336 for rotating the disk at 20.8 rps or the other constant number of revolutions; and an optical head 337 for writing data into an optical disk 338.

The write control circuit 333 is provided with a variable clock generating means and a storing region selecting means for selecting succeedingly a storing region for writing or reading data in accordance with a writing and reading rate of the data which is determined in every plural storage regions in the case when it is instructed to write a data exceeding the above described one storage region into or read from an upstream device.

First Embodiment

FIGS. 8 to 11 are explanatory diagrams each showing the first embodiment wherein a data to be written is, for example, a fixed length coded image data in frame in which 1 frame contains 8 blocks (hereinafter referred to as "single block SB"). In these Figures, a case where the number of tracks is 80 tracks is indicated. The expression to the effect that "the number of tracks is 80 tracks" includes a case where 1 track backward jumping of L (land)_G (groove) as well as of G_L is conducted throughout the tracks wherein the land is 40 tracks and the groove is 40 tracks, whereby it may be handled equally to such track composed of only grooves (FIGS. 1 to 5) other than the case shown in FIGS. 8 to 11. In this example, the storing area is divided equally into 10 segments along the track direction, and each segment contains 8 tracks per 1 storing region (hereinafter referred to as "clockblockCBLK").

In the example shown successively in FIGS. 8 to 11, data of ⅞ frame per 1 track, i.e., data of the total 7 frames is written into CBLK (clock block) 0 being the innermost radius; data of 1 frame per 1 track, i.e., data of the total 8 frames is written into CBLK1; data of 9/8 frames per 1 track, i.e., data of the total 9 frames is written into CBLK2; this is to be repeated in the following, more specifically, the number of write frame per 1 track is allowed to increase in every CBLKs by each ⅛; and finally, data of 2 frames per 1 track, i.e., data of the total 16 frames is written into CBLK9 being the outermost radius, respectively.

The number of revolutions in a disk utilizes herein an average value in the whole tracks. Namely, the number of revolutions in disk means a value based on which data of 11.⅝ per 1 track can be written into the disk. When a frame frequency is made to be 29.97 rps, the number of revolutions in disk is 29.97×8/11.5=20.8 rps. This number of revolutions exhibits 40% decrease in speed with respect to 34.3 rps in a conventional example, so that data can be written on the side more inner radius than that of the conventional example.

Figure 11:
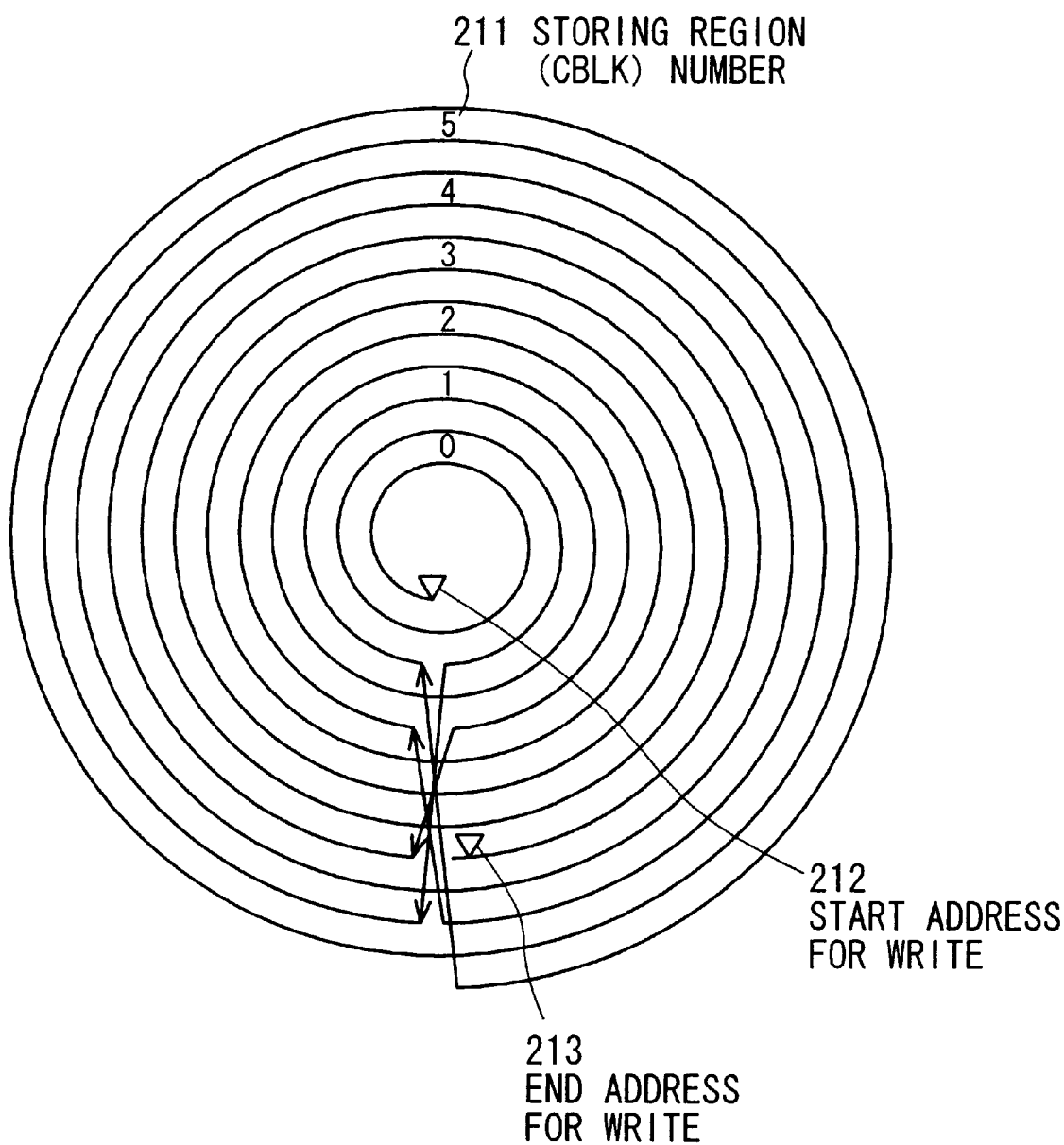
FIG. 11 is an explanatory diagram showing an outline of spiral tracks corresponding to that of FIGS. 8 to 10, respectively.

FIG. 11 is a spiral track diagram showing a case where only CBLK0 to 5 present wherein reference numeral 211 designates CBLK number, 212 a start address for write, and 213 an end address for write, respectively. Writing CBLK takes an order of CBLK0_CBLK5_CBLK1_CBLK4_CBLK2_CBLK3.

In the first embodiment, when an instruction for starting to write information is inputted, the disk control circuit 336 rotates a disk at 20.8 rps. The input circuit 332 adds error correcting code and the like to the input image data 331 and stores the same in the buffer 334. At the same time, the write control circuit 333 starts to read information from the buffer, the write-data process circuit 335 performs processing for write-coding and the like, and the optical head 337 selects the zeroth track in the optical disk 338 to conduct writing of information in CBLK0.

The remaining buffer at the time when writing of information was completed up to the seventh track is 11.5 frames in writing, and 7 frames in reading, so that it results in 4.5 frames. Then, the optical head jumps to the 72nd track, and performs writing of information in CBLK9 up to the 79th track. Since increase and decrease of buffer in CBLK9 is 11.5 frames in writing and 16 frames in reading, it results in decrease of 4.5 frames, so that the remaining buffer becomes zero. Then, the optical head jumps to the 8th track, and writes information into CBLK1 up to the 15th track. Since increase and decrease of buffer in CBLK1 is 11.5 frames in writing and 8 frames in reading, it results in increase of 3.5 frames, so that the remaining buffer becomes 3.5 frames.

Thereafter, the optical head jumps to the 64th track, and carries out writing of information in CBLK8 up to the 71st track. Since increase and decrease in CBLK8 is 11.5 frames in writing and 15 frames in reading, it results in decrease of 3.5 frames, so that the remaining buffer becomes zero.

As described above, information is continuously written into an optical disk in the orders indicated in FIGS. 8 to 11, the optical head jumps finally to the 40th track, and conducts writing of information in CBLK5 up to the 47th track. Since increase and decrease of buffer in CBLK5 is 11.5 frames in writing and 12 frames in reading, resulting in decrease of 0.5 frame, so that the final remaining buffer becomes zero.

In the present first embodiment, writing of information may be started from CBLK9. When an instruction for starting to write information is inputted, the disk control circuit 336 rotates a disk at 20.8 rps. The input circuit 332 adds error correcting code and the like to the input image data 331 and writes the same into the buffer 334. In this case, the write control circuit 333 starts to read information from the buffer 334 after information of 4.5 frames or more was stored.

The write-data process circuit 335 executes write-coding and the like for read-out data, the write control circuit 333 selects the 72nd track in the optical disk 338, and the optical head 337 starts to conduct writing of information in CBLK9. Increase and decrease of buffer in CBLK9 is 11.5 frames in writing, while 16 frames in reading, so that it results in decrease of 4.5 frames. However, since data of 4.5 frames have been stored in buffer, the remaining buffer becomes zero.

Then, the optical head jumps to the zeroth track, and performs writing of information in CBLK0 up to the 7th track. Since increase and decrease of buffer in CBLK0 is 11.5 frames in writing and 7 frames in reading, it results in increase of 4.5 frames, so that the remaining buffer becomes 4.5 frames. Thereafter, the optical head jumps to the 64th track, and carries out writing of information in CBLK8 up to the 71st track. Since increase and decrease of CBLK8 is 11.5 frames in writing and 15 frames in reading, resulting in decrease of 3.5 frames, so that the remaining buffer becomes 1 frame.

Then, the optical head jumps to the 8th track, and since increase and decrease of buffer in CBLK1 of the 15th track is 11.5 frames in writing and 8 frames in reading, resulting in increase of 3.5 frames, so that the remaining buffer becomes 4.5 frames. As described above, writing of information is carried out continuously, finally the optical head jumps to the 32nd track, and conducts writing of information in CBLK4 up to the 39th track. Since increase and decrease of buffer in CBLK4 is 11.5 frames in writing and 11 frames in reading, resulting in increase of 0.5 frame, so that the final remaining buffer becomes 4.5 frames.

If writing procedure is carried out in such that the CBLKs positioned symmetrically with respect to ones with a disk center as the central figure are continuously written, the above-mentioned order is not necessarily required. For instance, it is also possible to write information in accordance with such an order of CBLK3_CBLK6_CBLK9_CBLK0_CBLK5_CBLK4_CBLK7_CBLK2_CBLK1_CBLK8.

Furthermore, for instance, in the example shown in FIGS. 8 to 11, optical head must be jumped to CBLK9, i.e., the leading edge of the 72nd track after completing writing of CBLK0. In even a disk which is served first time for writing information, it is desirable to previously record a CBLK leading edge mark, CBLK number or the like on the disk so as to find easily the CBLK leading edge. Likewise, it may also have recorded previously track number or the like on the disk to find easily the CBLK leading edge in even a disk which is served first time for writing information.

Such optical disk as described above contains a plurality of storing regions divided into every write-read clocks which have been previously determined from the side of the innermost radius to that of the outermost radius. The number of storing region relating to a writing or reading rate of data in each corresponding storing region has been assigned to the leading edge portion of each of the plural storing regions. Since a writing or reading rate of data differs from that in a storing region, when an apparatus for writing information into an optical disk and reading it therefrom refers to the number for identifying a certain storing region, buffer can be effectively utilized. As a result, a constant number of revolutions as well as a constant writing wavelength in a disk can be realized.

Figure 12:
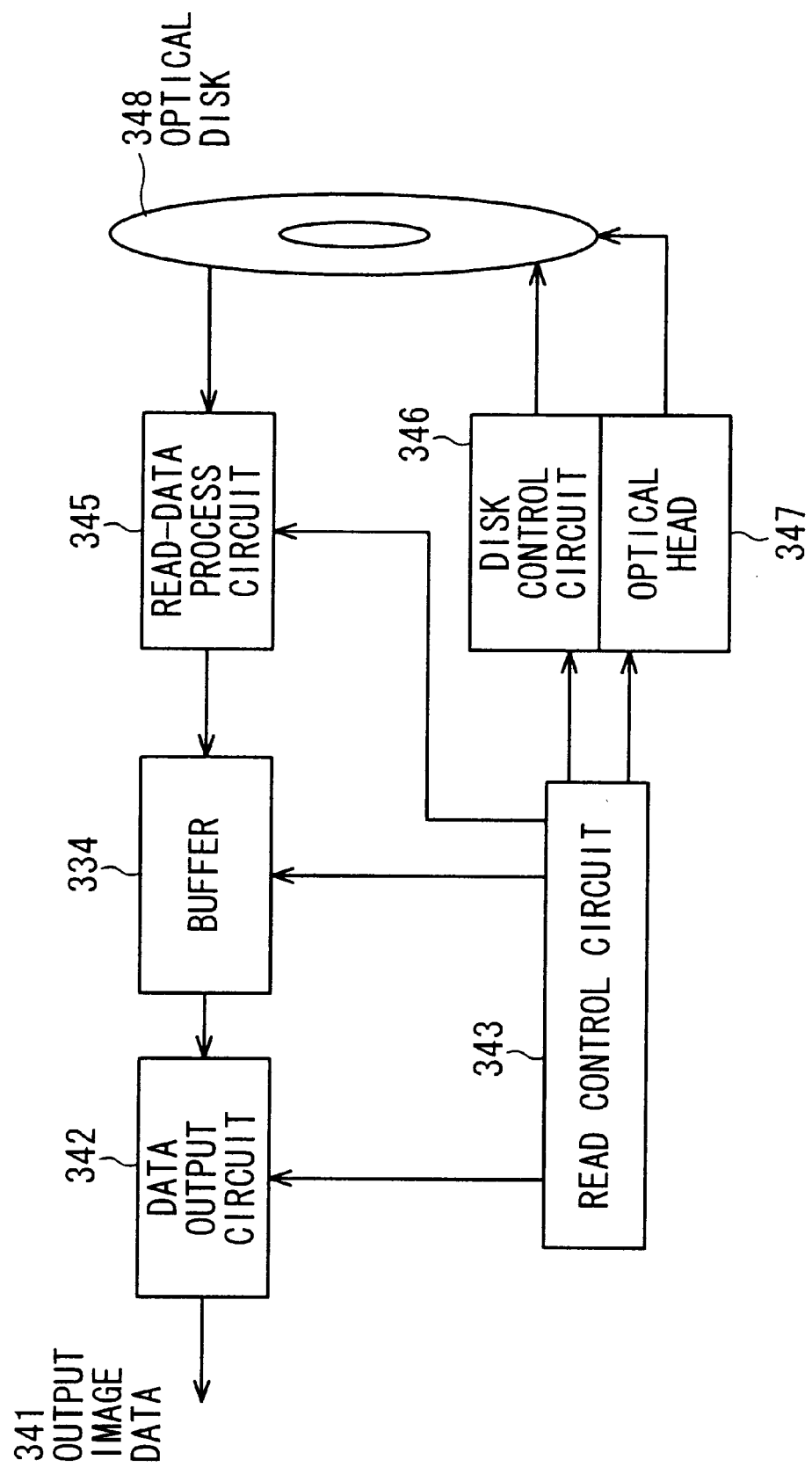
FIG. 12 is a block diagram showing a constitution of the apparatus for reading information from an optical disk according to the present manner of practice.

In the following, an apparatus for reading information from an optical disk will be described. FIG. 12 is a block diagram showing a constitution of the apparatus for reading information from an optical disk according to the present embodiment. In accordance with the example shown in FIG. 12, the apparatus for reading information from an optical disk is composed of a data output circuit 342 for processing an output image data 341 delivered to the outside (an upstream device); a read control circuit 343 for controlling respective blocks; a buffer circuit 344 for canceling a difference between an output data rate and a read-data rate; a read-data process circuit 345 for selecting a writing region number to be read so as not to cause overflow and underflow of the above described buffer, thereby to extract a reading data; a disk control circuit 346 for rotating the disk at 20.8 rps or the other number of revolutions; and an optical head 347 for reading the data which has been written in the optical disk 348.

In the first embodiment, when an instruction for starting to read information is inputted, the disk control circuit 346 rotates a disk at 20.8 rps. At the same time, the read control circuit 343 selects the zeroth track in the case when writing is started from CBLK0 of the optical disk 348, or the 72nd track in the case when writing is started from CBLK9 thereof. Thus, the optical head 347 starts to read information.

The read-data process circuit 345 executes decoding of written code and the like to write the resulting information into the buffer 344. The read control circuit 343 starts to read data from the buffer 344 at the time when data of 4.5 frames or more is stored in the buffer in the case where writing of data is started from CBLK0. On one hand, the read control circuit 343 starts immediately in the case when writing of data is started from CBLK9.

The data output circuit 342 executes error correcting and the like processing of data read out, and outputs the same as the image data 341. Thereafter, read-out of information is continued, and the reading is finished in CBLK5 in case of starting to write information from CBLK0, so that the remaining buffer becomes 4.5 frames, while the reading is finished in CBLK4 in case of starting to write information from CBLK9, so that the remaining buffer becomes zero. As to also the case where writing of information is carried out based on the other order, reading of information is started after data by which overflow or underflow is not caused was stored first in buffer, and information is read in accordance with the same order as that of writing of information.

As described above, when data is controlled by the use of buffer of 4.5 frames, it becomes possible to reduce 40% of the number of revolutions of a disk without accompanying overflow and underflow of buffer.

While the above described embodiment has been described as to the case where the number of CBLK is an even number, the central CBLK exhibits no increase and decrease of buffer in the case where the number of CBLK is an odd number, so that it is possible to write and read information at any given time. More specifically, for instance, CBLK4 exhibits no increase and decrease of buffer in the case where CBLK0 to CBLK8 present, so that it is possible to write and read information at any given time.

Furthermore, an example wherein an optical head has been queued up in the course of a disk, and data is started to read from the position queued up will be described by referring to FIGS. 8 to 11. In this case, a capacity of data which has been to be stored previously in the buffer circuit is made to be the same value as that obtained at the time when data is read from the leading edge of the corresponding CBLK (the maximum value is obtained in this case). More specifically, in the case where data is read from the leading edge of the third frame, when an instruction for starting to read information is inputted, a disk is rotated by the disk control circuit 346 at 20.8 rps. At the same time, the third track of the optical disk 348 is selected by the optical head 347, whereby it is started to read information from the third frame in CBLK0.

The read-data is written into the buffer 344 after completing write-coding of the data by means of the read-data process circuit 345. In this case, reading of data from the buffer 344 by the read control circuit 343 is started at the time when storing for data of 4.5 frames or more in the buffer was completed as in the case where writing for data is started from the leading edge of CBLK0. The data read out is subjected to error correcting and the like processing by means of the output circuit 342, and then, the resulting data is outputted as the image data 341.

Moreover, in the case where data is read from, for instance, the leading edge of the 28th frame, when an instruction for starting to read the data is inputted, a disk is rotated at 20.8 rps by the disk control circuit 346. At the same time, the 13th track of the optical disk 348 is selected by the optical head 347, and it is started to read the data from the 28th frame in the CBLK1 selected. The read data is subjected to write coding by means of the read-data process circuit 345, and then, the resulting data is written into the buffer 344. In this case, reading of the data from the buffer 344 by the read control circuit 343 is started at the time when storing for data of 3.5 frames or more in the buffer was completed as in the case where writing for data is started from the leading edge of CBLK1. The data read out is subjected to error correcting and the like processing by means of the output circuit 342, and then, the resulting data is outputted as the image data 341.

As described above, in the case where reading of data is started from CBLKs 0, 1, 2, 3, 4, 5, 6, 7, 8, and 9, it is started to read out the data from the buffer at the time when each storing for data of 4, 5, 3, 5, 2, 5, 1, 5, 0, 5, 0, 0, 0, 0, and 0 frame(s) or more was completed, respectively. In addition to the example as stated above, it may be arranged in such that a calculation which determines whether or not it is sufficient for starting read-out at the time when storing for data of how much frames in buffer was completed is applied for every frames each of which starts to read data, and read-out is started after storing the data in the buffer by an amount corresponding to the calculated value.

In the present embodiment, when search is conducted, reading is carried out while varying an amount of information to be stored in buffer in every storing regions. Since the present embodiment is not required for controlling other factors at all, for example, it is not necessary for controlling a rotational speed of disk in each storing region, more stable high-speed search can be performed totally as compared with a conventional embodiment.

Second Embodiment

Figure 13:
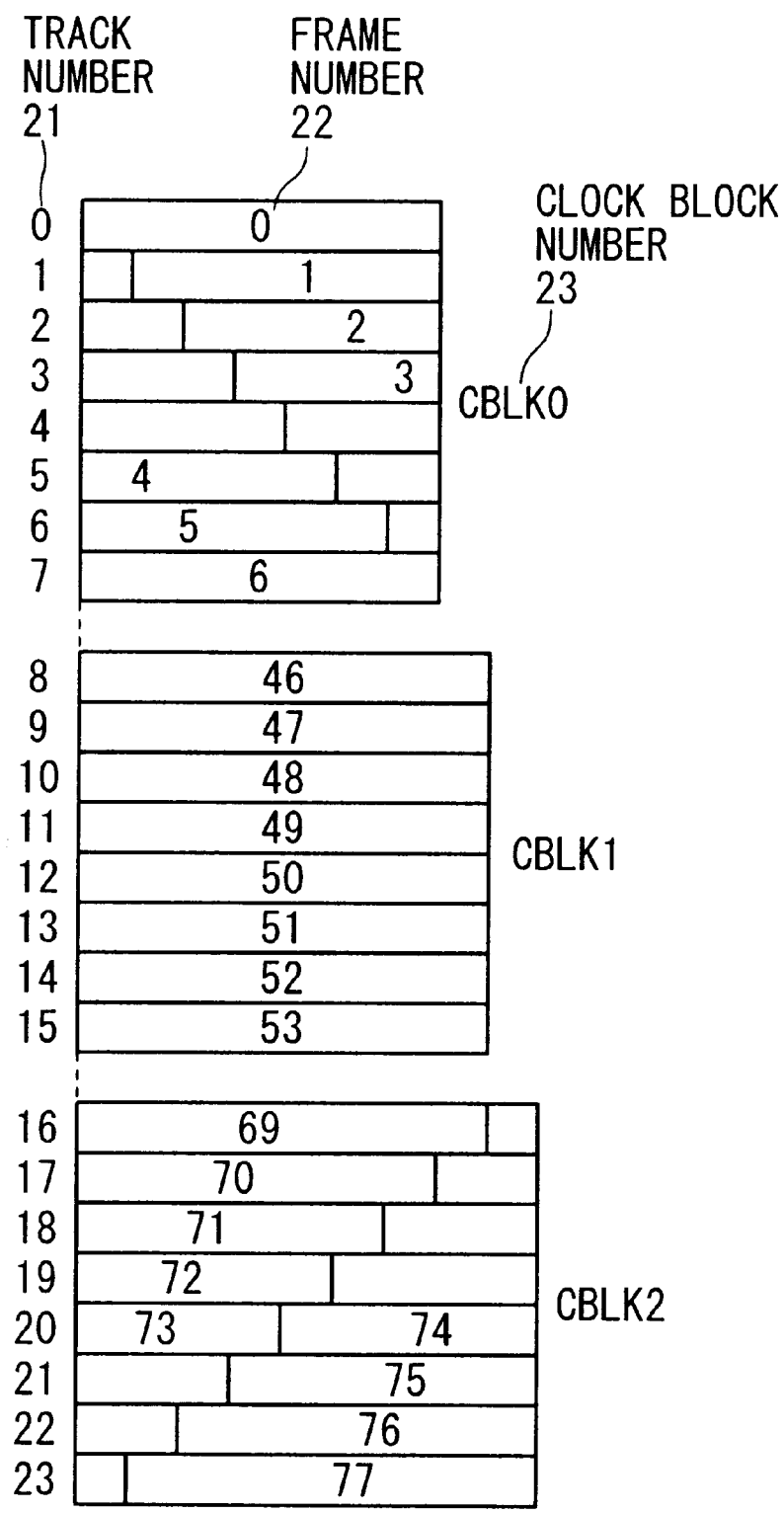
FIG. 13 is a constitutional diagram showing a track configuration, on the side of the innermost radius, based on which writing of information is started from the innermost and intermediate radii dependent upon a remaining buffer according to a second embodiment of the invention.
Figure 14:
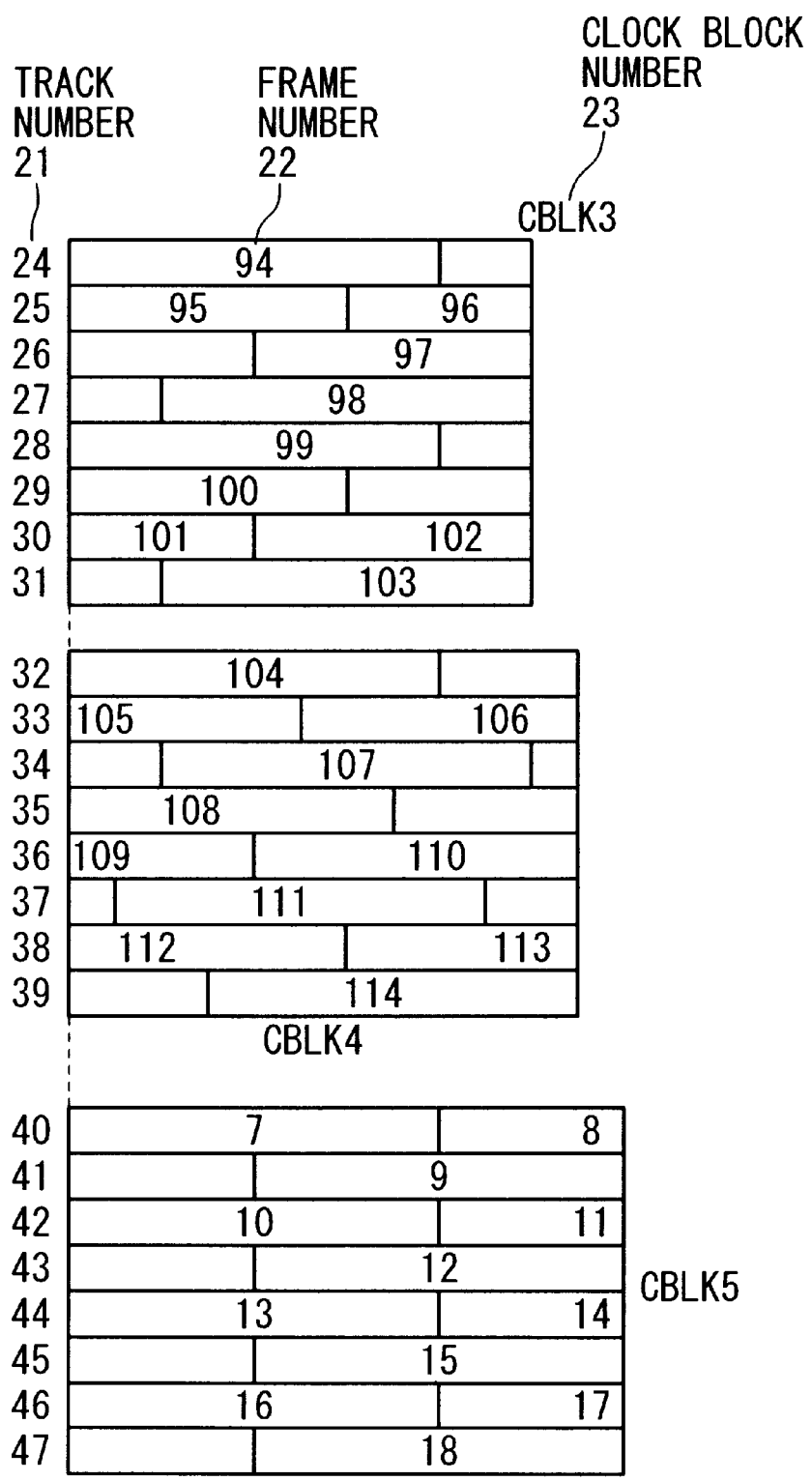
FIG. 14 is a constitutional diagram showing a track configuration following to the tracks shown in FIG. 13.

The second embodiment is shown in FIGS. 13 to 15 wherein the number of revolutions is to be 20.8 rps by which 11.⅝ frames can be written with 1 track as in the case of FIG. 6. In the present embodiment, inner radius group (group 0) of CBLK0 to CBLK4 for which the number of revolutions is insufficient at 20.8 rps, in other words, in which the remaining buffer increases as well as outer radius group (group 1) of CBLK5 to CBLK9 for which the number of revolutions is excessive at 20.8 rps, in other words, in which the remaining buffer decreases, when a CBLK to be written in the following stage is considered in the interior of the CBLK, are selected on the basis of increase and decrease from the initial value of the remaining buffer at the time of finishing writing of information in the respective CBLKs.

Figure 16:
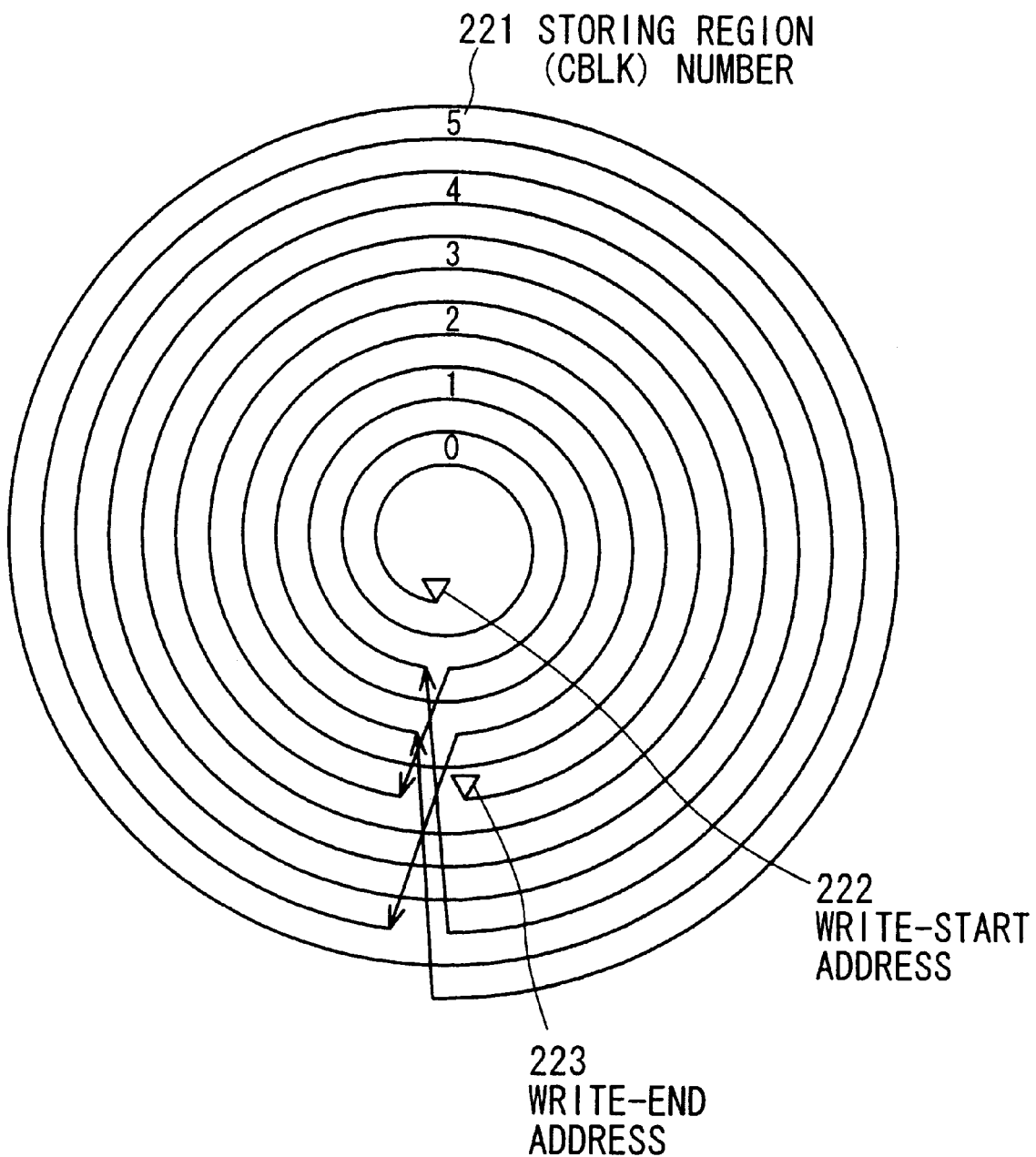
FIG. 16 is an explanatory diagram showing an outline of spiral tracks corresponding to that of FIGS. 13 to 15, respectively.

When a remaining buffer exceeds the initial value, the group 1 is selected, while when it does not exceed the initial value, the group 0 is selected. FIG. 16 is a spiral track diagram showing the case where only CBLK0 to CBLK5 exist wherein reference numeral 221 designates CBLK, 222 a write-start address, and 223 a write-end address, respectively. The write CBLKs take an order of CBLK0_CBLK3_CBLK4_CBLK1_CBLK5_CBLK2.

In the second embodiment shown in FIGS. 13 to 15, when an instruction for starting to write information is inputted, a disk is rotated at 20.8 rps by a disk control circuit 336. An input circuit 332 adds error correcting code and the like to an input image data 331, and the resulting data is written into a buffer 334. A write control circuit 333 starts to read the data from the buffer 334 at the time when storing of data of 2 frames in the buffer was completed.

A write-data process circuit 335 performs write-coding and the like of read-out data, the write control circuit 333 selects the zeroth track of an optical disk 338, and an optical head 337 starts to write the data in CBLK0. A remaining buffer at the time when writing of data was finished up to the 7th track extends 11.5 frames in writing, and 7 frames in reading, so that it results in increase of 4.5 frames, whereby the remaining buffer becomes 6.5 frames. Then, since the remaining buffer is the initial value plus 4.5 frames, the group 1 is selected, the optical head jumps to the 40th track, and writing of data is performed up to the 47th track in CBLK5.

Increase and decrease of buffer in CBLK5 comes to be decrease of 0.5 frame, since writing extends 11.5 frames and reading extends 12 frames, so that the remaining buffer becomes 6.0 frames. Then, since the remaining buffer is the initial value plus 4.0 frames, the groop 1 is selected, the optical head jumps to the 48th track, and writing of information is performed up to the 55th track in CBLK6. Increase and decrease of buffer in CBLK6 comes to be decrease of 1.5 frame, since writing extends 11.5 frames and reading extends 13 frames, so that the remaining buffer becomes 4.5 frames.

Then, since the remaining buffer is the initial value plus 2.5 frames, the group 1 is selected, the optical head jumps to the 56th track, and writing of information is performed up to the 63rd track in CBLK7. Increase and decrease of buffer in CBLK7 comes to be decrease of 2.5 frame, since writing extends 11.5 frames and reading extends 14 frames, so that the remaining buffer becomes 2.0 frames. Then, since the remaining buffer is the initial value plus 0 frame, the groop 0 is selected, the optical head jumps to the 8th track, and writing of information is performed up to the 15th track in CBLK1. Increase and decrease of buffer in CBLK1 comes to be increase of 3.5 frame, since writing extends 11.5 frames and reading extends 8 frames, so that the remaining buffer becomes 5.5 frames. Then, since the remaining buffer is the initial value plus 3.5 frames, the groop 1 is selected, the optical head jumps to the 64th track, and writing of information is performed up to the 71st track in CBLK8. Increase and decrease of buffer in CBLK8 comes to be decrease of 3.5 frame, since writing extends 11.5 frames and reading extends 15 frames, so that the remaining buffer becomes 2.0 frames.

Then, since the remaining buffer is the initial value plus zero frame, the groop 0 is selected, the optical head jumps to the 16th track, and writing of information is performed up to the 23rd track in CBLK2. Increase and decrease of buffer in CBLK2 comes to be increase of 2.5 frames, since writing extends 11.5 frames and reading extends 9 frames, so that the remaining buffer becomes 4.5 frames. Then, since the remaining buffer is the initial value plus 2.5 frames, the groop 1 is selected, the optical head jumps to the 72nd track, and writing of information is performed up to the 79th track in CBLK9. Increase and decrease of buffer in CBLK9 comes to be decrease of 4.5 frames, since writing extends 11.5 frames and reading extends 16 frames, so that the remaining buffer becomes zero.

Then, since the remaining buffer is the initial value minus 2.0 frames, the groop 0 is selected, the optical head jumps to the 24th track, and writing of information is performed up to the 31st track in CBLK3. Increase and decrease of buffer in CBLK3 comes to be increase of 1.5 frames, since writing extends 11.5 frames and reading extends 10 frames, so that the remaining buffer becomes 0.5 frame. Finally, since the remaining buffer is the initial value minus 0.5 frame, the groop 0 is selected, the optical head jumps to the 32nd track, and writing of data is performed up to the 39th track in CBLK4. Increase and decrease of buffer in CBLK4 comes to be increase of 0.5 frame, since writing extends 11.5 frames and reading extends 11 frames, so that the final remaining buffer becomes zero.

Meanwhile, in case of the present embodiment, a buffer capacity is required for an amount corresponding to 6.5 frames. If a buffer capacity required for the following CBLK has been previously known, it is possible to reduce the required buffer capacity. In FIGS. 13 to 15, since increase and decrease of a buffer capacity in CBLK0 and CBLK9 is 4.5 frames, a buffer allowance is made to be 0 to 4.5 frames, so that a required buffer capacity becomes 4.5 frames.

In an example wherein such buffer allowance is utilized, when an instruction for starting to write information is inputted, writing of information is started from remaining buffer zero, if the capacity does not exceed a buffer allowance in the following CBLK, writing of information is continued as it is, and when exceeded the buffer allowance, a writing group is changed. In CBLK0, the buffer capacity increases by 4.5 frames, so that a remaining buffer becomes 4.5 frames. Then, in case of writing information in CBLK1, 3.5 frames of buffer capacity increase, resulting in 8.0 frames of a remaining buffer, so that it exceeds the buffer allowance. Thus, the optical head jumps to CBLK5 in the group 1 to write information, so that the buffer capacity decreases by 0.5 frame, and the remaining buffer becomes 4.0 frames.

Then, since there is no excess over the buffer allowance, writing is executed in CBLK6, so that 1.5 frames of buffer capacity decrease, and the remaining buffer becomes 2.5 frames. Then, since there is no excess over the buffer allowance, writing is executed in CBLK7, so that 2.5 frames of buffer capacity decrease, and the remaining buffer becomes zero. Then, in case of executing writing of information in CBLK8, 3.5 frames of buffer capacity decrease, and the remaining buffer becomes −3.5 frames, so that it exceeds the buffer allowance. Hence, the optical head jumps to CBLK1 in the group 0 to write information, resulting in increase of 3.5 frames in buffer capacity and 3.5 frames of remaining buffer.

Then, in case of executing writing of information in CBLK2, 2.5 frames of buffer capacity increase, and the remaining buffer becomes 6.0 frames, so that it exceeds the buffer allowance. Hence, the optical head jumps to CBLK8 in the group 1 to write information, resulting in decrease of 3.5 frames in buffer capacity and zero remaining buffer. Then, in case of executing writing of information in CBLK9, 4.5 frames of buffer capacity decrease, and the remaining buffer becomes −4.5 frames, so that it exceeds the buffer allowance. Hence, the optical head jumps to CBLK2 in the group 0 to write information, resulting in increase of 2.5 frames in buffer capacity and 2.5 frames of remaining buffer.

Then, since there is no excess over the buffer allowance, writing is executed in CBLK3, so that 1.5 frames of buffer capacity increase, and the remaining buffer becomes 4.0 frames.

Then, since there is no excess over the buffer allowance, writing is executed in CBLK4, so that 0.5 frame of buffer capacity increases, and the remaining buffer becomes 4.5 frames. Finally, the optical head jumps to CBLK9 in group 0 to write information, resulting in decrease of 4.5 frames in buffer capacity and zero remaining buffer.

Third Embodiment

Figure 17:
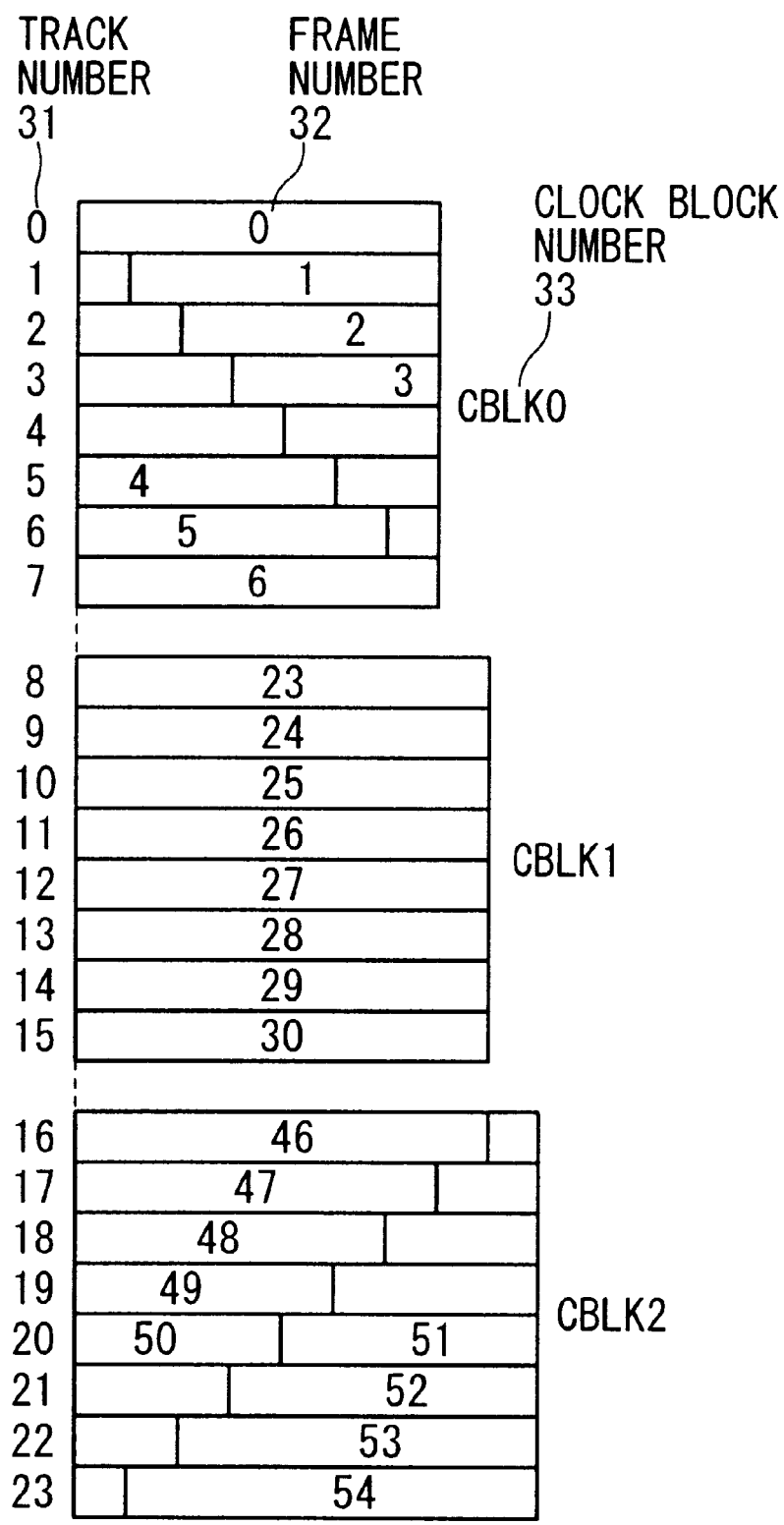
FIG. 17 is a constitutional diagram showing a track configuration, on the side of inner radius, based on which two track backward jumping is performed in group 1 according to a third embodiment of the invention.
Figure 18:
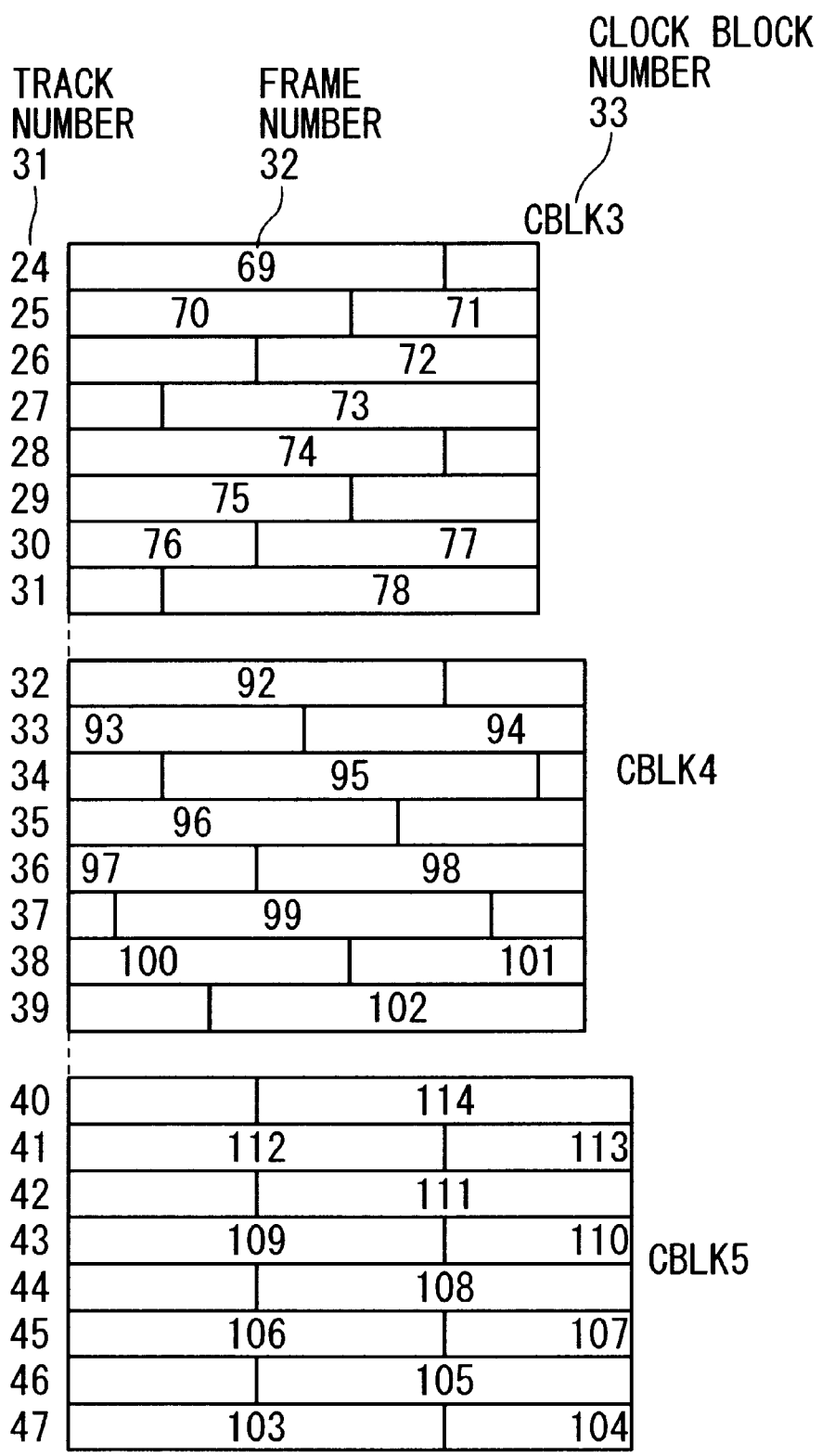
FIG. 18 is a constitutional diagram showing a track configuration following to the tracks shown in FIG. 17.

The third embodiment is shown in FIGS. 17 to 19 wherein scanning is effected from the innermost radius to outer radius in CBLK0 to CBLK4 in the group 0, and then, scanning is effected from the outermost radius to inner radius in CBLK5 to CBLK9 in the group 1.

Figure 20:
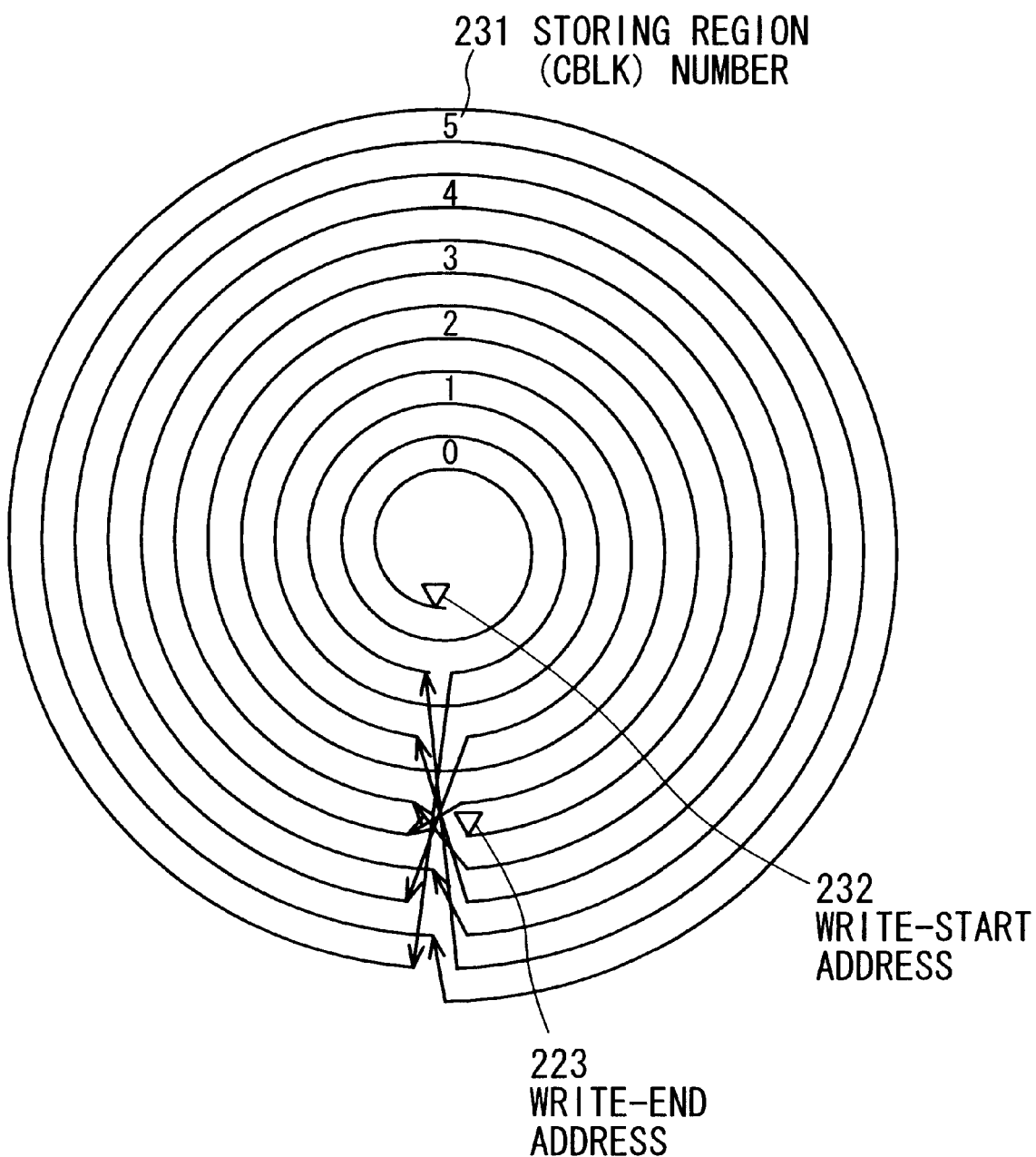
FIG. 20 is an explanatory diagram showing an outline of spiral tracks corresponding to that of FIGS. 17 to 19, respectively.

FIG. 20 is a spiral track diagram showing the case where only CBLK0 to CBLK5 present. An optical disk is provided with CBLKs 231, a write-start address 232, and a write-end address 233. In an example shown in FIG. 20, write CBLKs take an order of CBLK0_CBLK5_CBLK1_CBLK4_ CBLK2_CBLK3.

Figure 21:
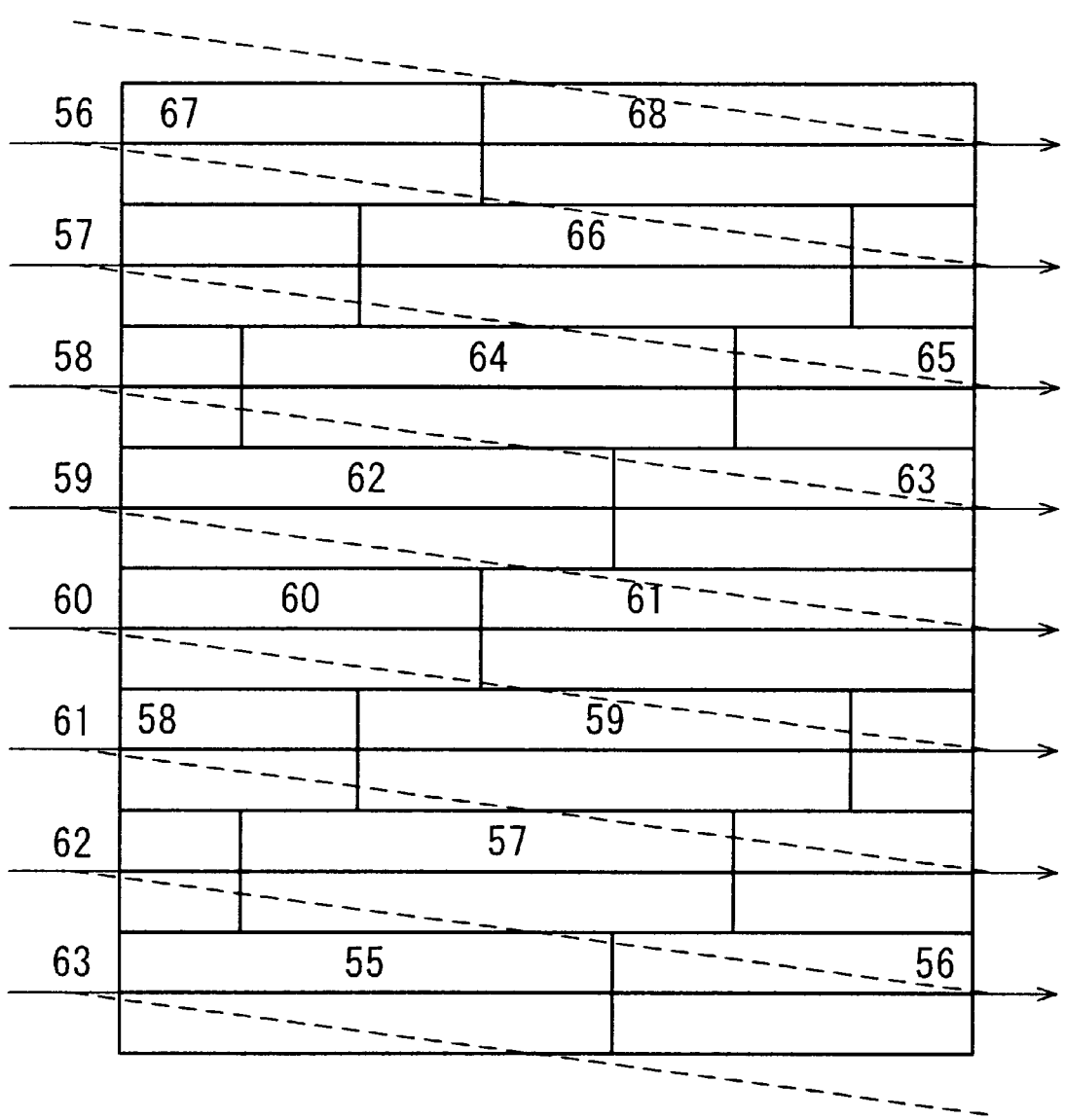
FIG. 21 is an explanatory diagram showing an scanning order of tracks in CBLK7 of FIG. 19.

In the third embodiment shown in FIGS. 17 to 19, when an instruction for starting to write information is inputted, a disk is rotated at 20.8 rps by means of a disk control circuit 336, and writing of information is performed in CBLK0 as in the first embodiment. Then, the optical head jumps to the 79th track, and executes writing of information in CBLK9 up to the 72nd track. In this case, the optical head effects 2-track backward jumping to jump at the 78th track after writing information in the 79th track, then, the optical head effects 2-track backward jumping to jump at the 77th track after writing information in the 78th track, and such action as described above is continued up to the completion of writing of information in the 72nd track. In FIG. 21, behavior of backward jumping in 2 tracks per 1 track in CBLK7 is shown.

Then, writing of information is performed in CBLK1 in accordance with the same manner as that in the first embodiment. Then, the optical head jumps to the 71st track, and conducts writing of information in CBLK8 while effecting backward jumping of 2 tracks per 1 track as in the case of CBLK9. As described above, writing of information is continued in the orders shown in FIGS. 17 to 19, finally, the optical head jumps to the 47th track, and conducts writing of information in CBLK5 while effecting backward jumping of 2 tracks per 1 track as in the case of CBLK9.

Writing may be started from CBLK9. In this case, an order of writing is as follows:

_CBLK9 (backward jumping of 1 track per ½ track)_ CBLK0_CBLK8 (backward jumping of 1 track per ½ track)_CBLK _CBLK7 (backward jumping of 1 track per ½ track)_ CBLK2

_CBLK6 (backward jumping of 1 track per ½ track)_ CBLK3

CBLK5 (backward jumping of 1 track per ½ track)_ CBLK4

In the second embodiment, there is also a manner wherein writing of information is started from CBLK9.

CBLK5 to CBLK9 are made to be group 2, and CBLK0 to CBLK4 are made to be group 3. The group 2 is selected in the case when a remaining buffer is an initial value or higher, while the group 3 is selected in the case when a remaining buffer is less than the initial value. When an instruction for starting to write information is inputted, the disk control circuit 336 rotates a disk at 20.8 rps. The input image data 331 is added to error correcting code and the like by means of the input circuit 332, and the resulting data is written into the buffer 334. Reading of data from the buffer 334 by the write-control circuit 333 is started at the time when storing of data of 4.5 frames in the buffer was completed.

Read-out data is subjected to write-coding and the like by means of the write-data process circuit 335, and the 79th track of the optical disk 338 is selected by the optical head 337 to start writing in CBLK9. A remaining buffer at the time when writing was finished up to the 79th track is zero, since writing extends 11.5 frames and reading extends 16 frames. In the present embodiment, backward jumping of 2 tracks per 1 track is executed throughout the tracks.

In the following, groups and CBLKs to be written are selected in accordance with the same manner as that in the case of the second embodiment. Thus, an order of writing is as follows.

CBLK9 (−4.5/0)_CBLK4 (0.5/0.5)
_CBLK3 (1.5/2.0)_CBLK2 (2.5/4.5)
_CBLK8 (−3.5/1.0)_CBLK1 (3.5/4.5)
_CBLK7 (−2.5/2.0)_CBLK0 (4.5/6.5)
_CBLK6 (−1.5/5.0)_CBLK5 (0.5/4.5)

In the above expression, a numerator in parentheses designates increase and decrease of buffer in the corresponding CBLK, and a denominator in parentheses designates the resulting remaining buffer.

Furthermore, it is possible to start writing of information from CBLK9 in also a method and an apparatus for reducing a necessary buffer capacity. In this case, a buffer allowance is made to be 0 to 4.5 frames, so that the necessary buffer capacity becomes 4.5 frames. When an instruction for starting to write information is inputted, the disk control circuit 336 rotates a disk at 20.8 rps.

An error correcting code and the like are added to the input image data 331 by means of the input circuit 332, and then the resulting data is written into the buffer 334. Reading of data from the buffer 334 is started by the write control circuit 333 at the time when storing of 4.5 frames of data in the buffer was completed. The read-out data is subjected to write-coding and the like by the write-data process circuit 335, and the 79th track of the optical disk 338 is selected by the optical head 337 to start writing of information in CBLK9.

A remaining buffer at the time when writing of information is finished up to the 72nd track is zero, since writing extends 11.5 frames and reading extends 16 frames. In the present embodiment, backward jumping of 2 tracks per 1 track is also executed throughout the tracks.

In the following, groups and CBLKs to be written are selected as in the case of the second embodiment. Thus, an order of writing is as follows.

CBLK9 (−4.5/0)_CBLK4 (0.5/0.5)
_CBLK3 (1.5/2.0)_CBLK2 (2.5/4.5)
_CBLK8 (−3.5/1.0)_CBLK1 (3.5/4.5)
_CBLK7 (−2.5/2.0)_CBLK6 (−1.5/0.5)
_CBLK5 (−0.5/0)_CBLK0 (4.5/4.5)

In the above expression, a numerator in parentheses designates increase and decrease of buffer in the corresponding CBLK, and a denominator in parentheses designates the resulting remaining buffer.

Fourth Embodiment

Figure 22:
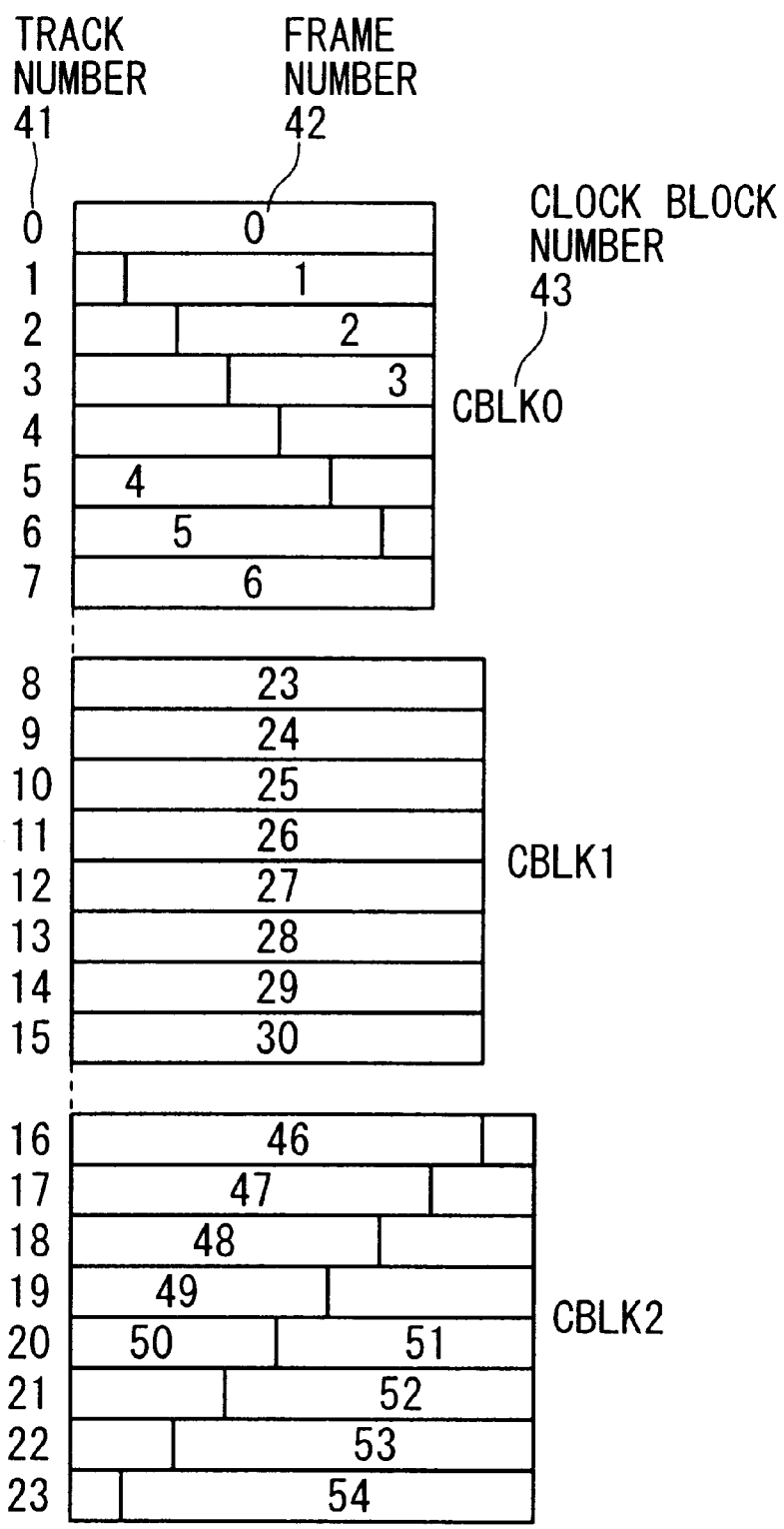
FIG. 22 is a constitutional diagram showing a track configuration, on the side of inner radius, based on which one track backward jumping is performed in group 1 according to a fourth embodiment of the invention.
Figure 23:
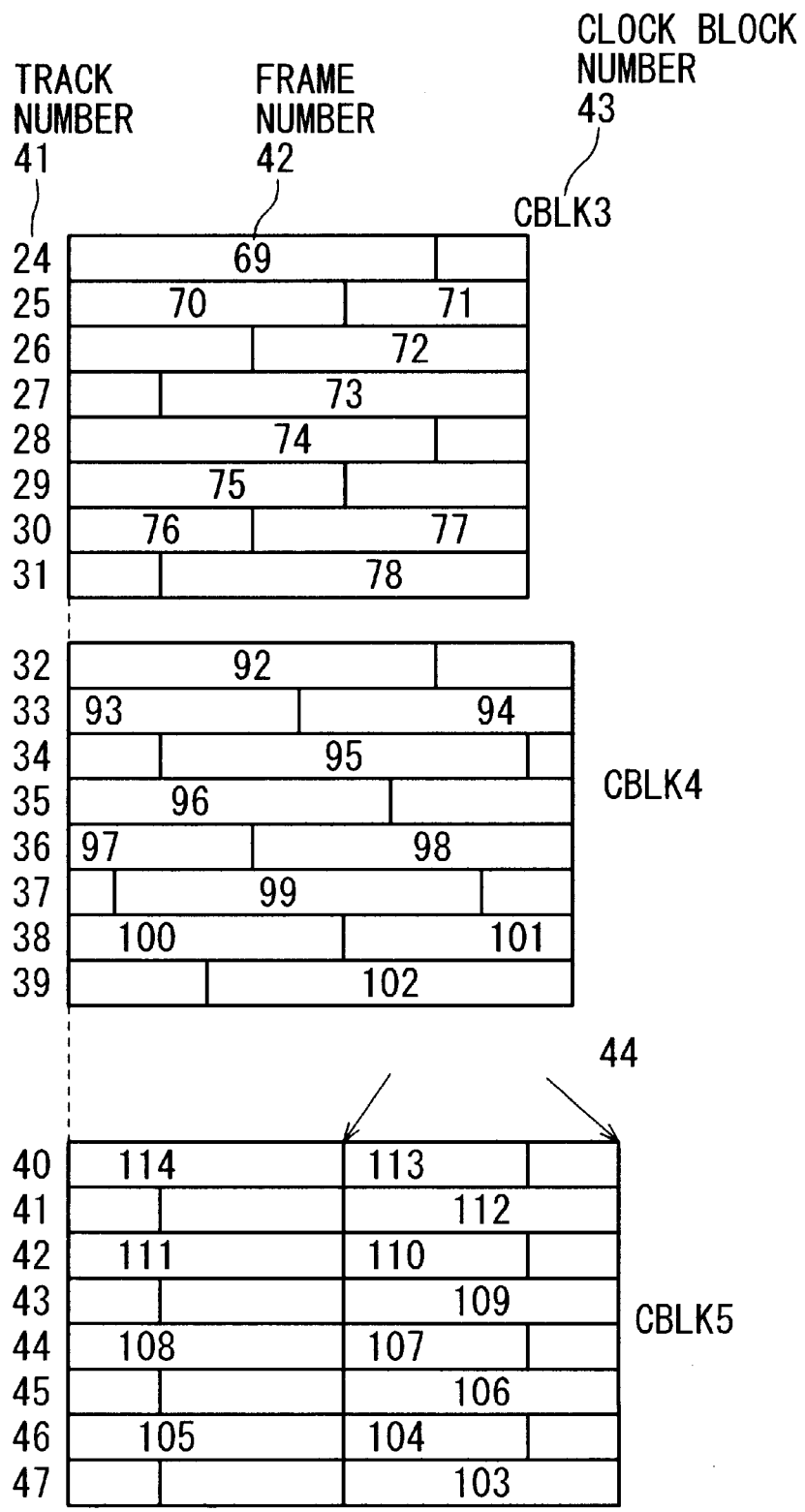
FIG. 23 is a constitutional diagram showing a track configuration following to the tracks shown in FIG. 22.

The fourth embodiment is shown in FIGS. 22 to 24 wherein scanning is effected from the innermost radius to outer radius in CBLK0 to CBLK4 in group 0, and then, scanning is effected from the outermost radius to inner radius in CBLK5 to CBLK9 in group 1.

Figure 25:
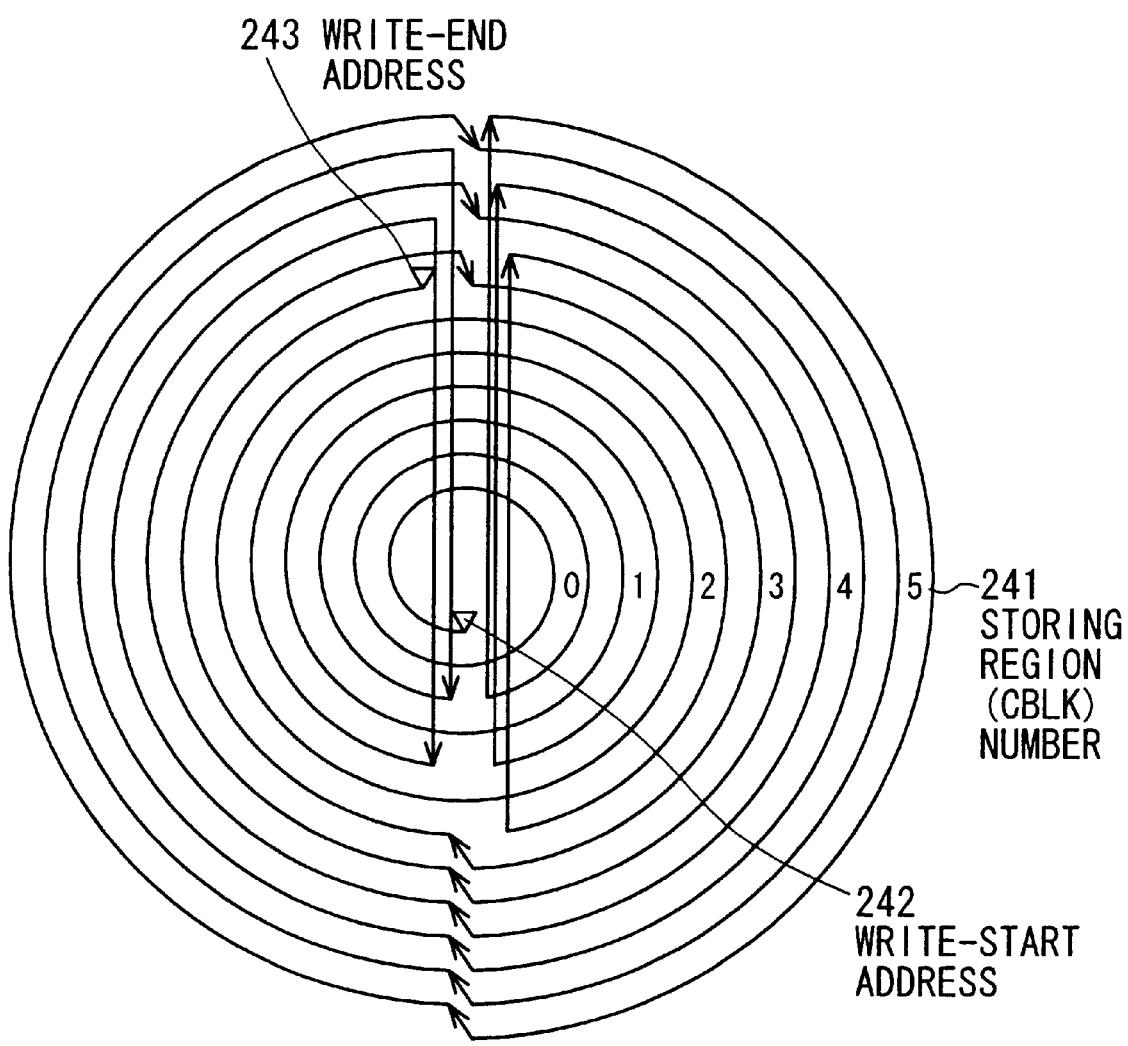
FIG. 25 is an explanatory diagram showing an outline of spiral tracks corresponding to that of FIGS. 22 to 24, respectively.

FIG. 25 is a spiral track jumping diagram showing the case where only CBLK0 to CBLK5 present wherein reference numeral 241 designates CBLKs, 242 a write-start address, and 243 a write-end address, respectively. In this case, write CBLKs take an order of CBLK0_CBLK5_ CBLK1_CBLK4_CBLK2_CBLK3.

Figure 26:
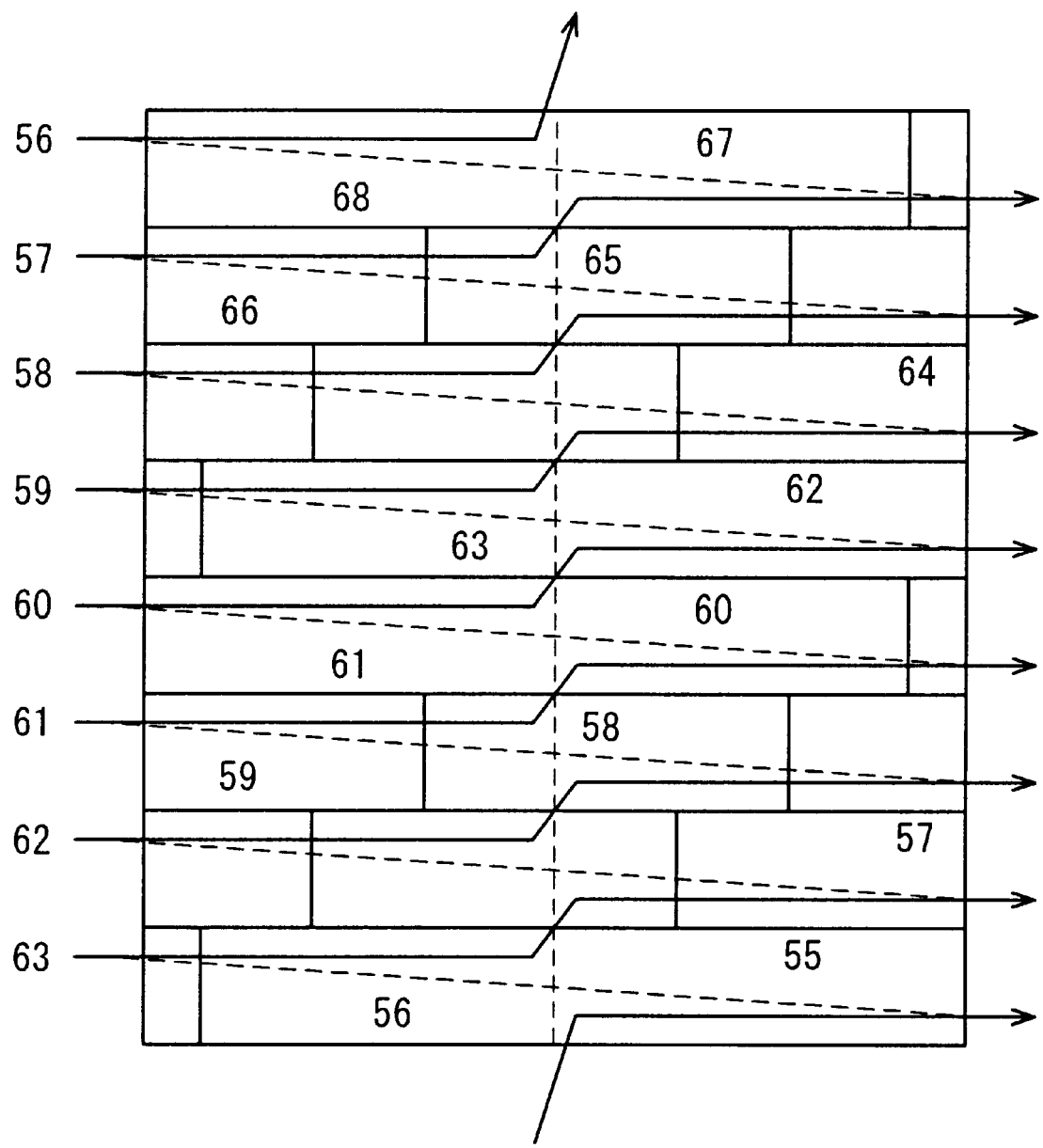
FIG. 26 is an explanatory diagram showing an scanning order of tracks in CBLK7 of FIG. 24.

Furthermore, FIG. 26 shows behavior of backward jumping of 1 track per ½ track in CBLK7 wherein optical head scans from the central portion of the 63rd track to the leading edge of the 64th track, then, jumps backwardly by 1 track to move to the leading edge of the 63rd track, scans towards the central portion of the 63rd track, and then, jumps backwardly by 1 track to move to the central portion of the 62nd track. This action is repeated to scan up to the central portion of the 56th track to finish scanning in CBLK7.

Meanwhile, in this case, when optical head jumps between CBLKs as in the case where it jumps from CBLK0 to CBLK9 or the case where it jumps from CBLK9 to CBLK1, a writing unable period over ½ track arises. Accordingly, it is necessary to rotate a disk at the number of revolutions at which writing of 11.5 frames is possible in 8.5 tracks.

This value corresponds to 29.97×8.5/11.5 frames=22.2 rps.

In FIGS. 22 to 24, when an instruction for starting to write information is inputted, a disk is rotated at 22.2 rps by means of the disk control circuit 336, and writing of information is executed in CBLK0 in accordance with the same manner as that in the third embodiment. Then, optical head jumps to the 79th track to write information in CBLK9 up to the 72nd track. In this case, the optical head scans from the central portion of the 79th track to the leading edge of the 80th track, then, it jumps backwardly by 1 track to move to the leading edge of the 79th track, scans towards the central portion of the 79th track, and then jumps backwardly by 1 track to move to the central portion of the 78th track. This action is repeated to scan tracks up to the central portion of the 72nd track, whereby scanning in CBLK9 is finished. Thereafter, writing in CBLK1 is performed in accordance with the same manner as that in case of the first embodiment.

Then, the optical head jumps to the 71st track to write information in CBLK8 while jumping backwardly by 1 track per ½ track in the same manner as that of CBLK9. As described above, writing is continued in accordance with the orders shown in FIGS. 22 to 24, finally, the optical head jumps to the 47th track to write information in CBLK5 while effecting backward jumping of 1 track per ½ track in the same manner as that of CBLK9.

Writing may be started from CBLK9. In this case, an order of writing is as follows:

CBLK9 (backward jumping of 1 track per ½ track)_CBLK0_CBLK8 (backward jumping of 1 track per ½ track)_CBLK1

_CBLK7 (backward jumping of 1 track per ½ track)_CBLK2

_CBLK6 (backward jumping of 1 track per ½ track)_CBLK3

_CBLK5 (backward jumping of 1 track per ½ track)_CBLK4

In the second embodiment, there is also another manner wherein writing of information is started from CBLK9. Group 1 is selected in the case when a remaining buffer is an initial value or higher, while group 0 is selected in the case when a remaining buffer is less than the initial value. When an instruction for starting to write information is inputted, the disk control circuit 336 rotates a disk at 22.2 rps. The input image data 331 is added to error correcting code and the like by means of the input circuit 332, and the resulting data is written into the buffer 334. Reading of data from the buffer 334 by the write-control circuit 333 is started at the time when storing of data of 4.5 frames in the buffer was completed.

Read-out data is subjected to write-coding and the like by means of the write-data process circuit 335, and the 79th track of the optical disk 338 is selected by the optical head 337 to start writing in CBLK9. A remaining buffer at the time when writing was finished up to the 79th track is zero, since writing extends 11.5 frames and reading extends 16 frames. In the present embodiment, backward jumping of 1 track per ½ track is executed throughout the tracks.

In the following, CBLKs to be written are selected in accordance with the same manner as that in case of the second embodiment. Thus, an order for writing is as follows.

CBLK9 (−4.5/0)_CBLK4 (0.5/0.5)
_CBLK3 (1.5/2.0)_CBLK2 (2.5/4.5)
_CBLK8 (−3.5/1.0)_CBLK1 (3.5/4.5)
_CBLK7 (−2.5/2.0)_CBLK0 (4.5/6.5)
_CBLK6 (−1.5/5.0)_CBLK5 (0.5/4.5)

In the above expression, a numerator in parentheses designates increase and decrease of buffer in the corresponding CBLK, and a denominator in parentheses designates the resulting remaining buffer.

Furthermore, it is possible to start writing of information from CBLK9 in also a method and an apparatus for reducing a necessary buffer capacity. In this case, a buffer allowance is made to be 0 to 4.5 frames, so that the necessary buffer capacity becomes 4.5 frames. When an instruction for starting to write information is inputted, the disk control circuit 336 rotates a disk at 22.2 rps. An error correcting code and the like are added to the input image data 331 by means of the input circuit 332, and then the resulting data is written into the buffer 334. Reading of data from the buffer 334 is started by the write control circuit 333 at the time when storing of 4.5 frames of data in the buffer was completed.

The read-out data is subjected to write-coding and the like by the write-data process circuit 335, and the 79th track of the optical disk 338 is selected by the optical head 337 to start writing of information in CBLK9. A remaining buffer at the time when writing of information is finished up to the 72nd track is zero, since writing extends 11.5 frames and reading extends 16 frames. In the present embodiment, backward jumping of 1 track per ½ track is also executed throughout the tracks.

In the following, CBLKs to be written are selected in accordance with the same manner as that in case of the second embodiment. Thus, an order for writing is as follows.

CBLK9 (−4.5/0)_CBLK4 (0.5/0.5)
_CBLK3 (1.5/2.0)_CBLK2 (2.5/4.5)
_CBLK8 (−3.5/1.0) CBLK1 (3.5/4.5)
_CBLK7 (−2.5/2.0)_CBLK6 (−1.5/0.5)
_CBLK5 (−0.5/0)_CBLK0 (4.5/4.5)

In the above expression, a numerator in parentheses designates increase and decrease of buffer in the corresponding CBLK, and a denominator in parentheses designates the resulting remaining buffer.

Fifth preferred embodiment

Figure 27:
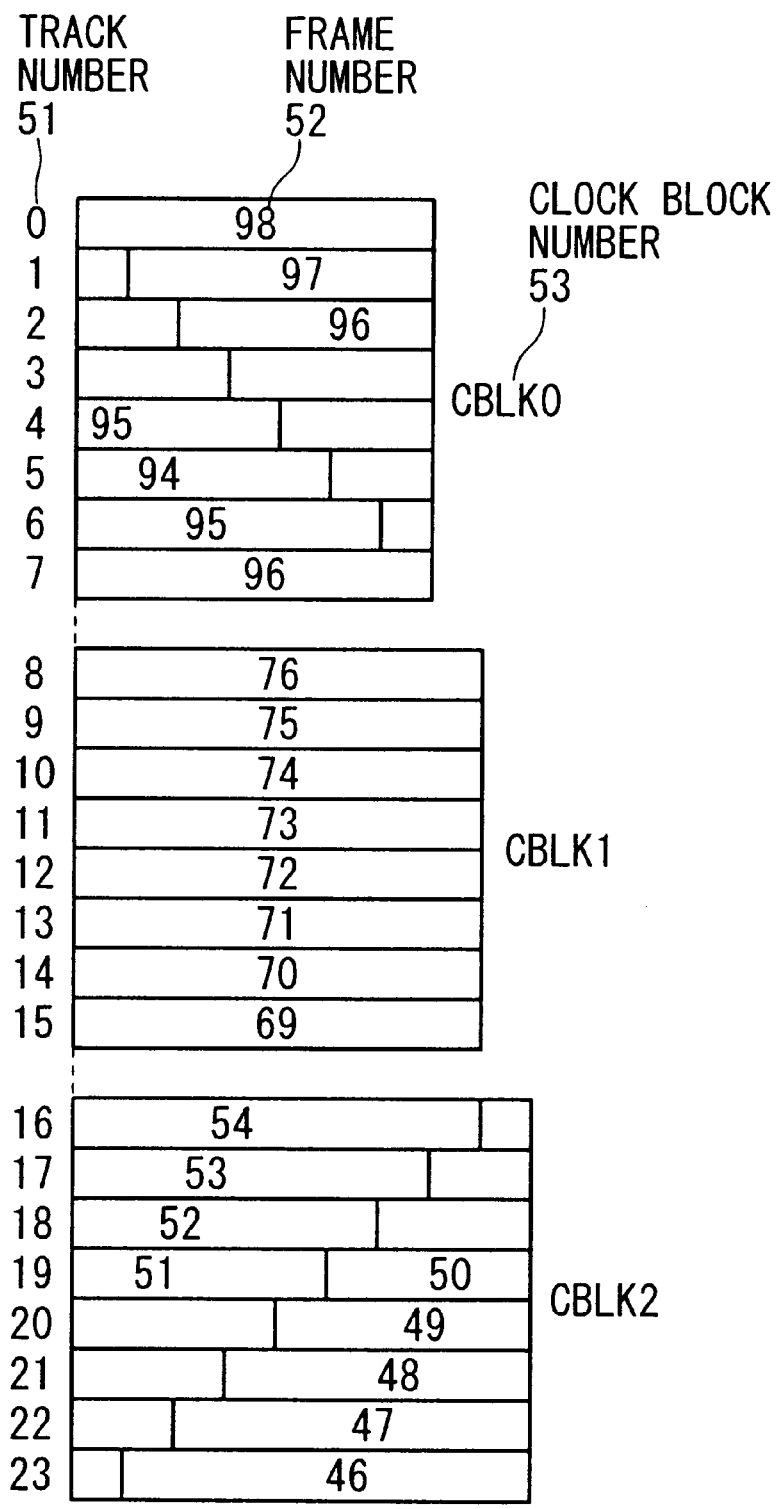
FIG. 27 is a constitutional diagram showing a track configuration, on the side of inner radius, based on which writing of information is started from the intermediate radius in a disk which reverses a spiral direction at the disk center according to a fifth embodiment of the invention.
Figure 28:
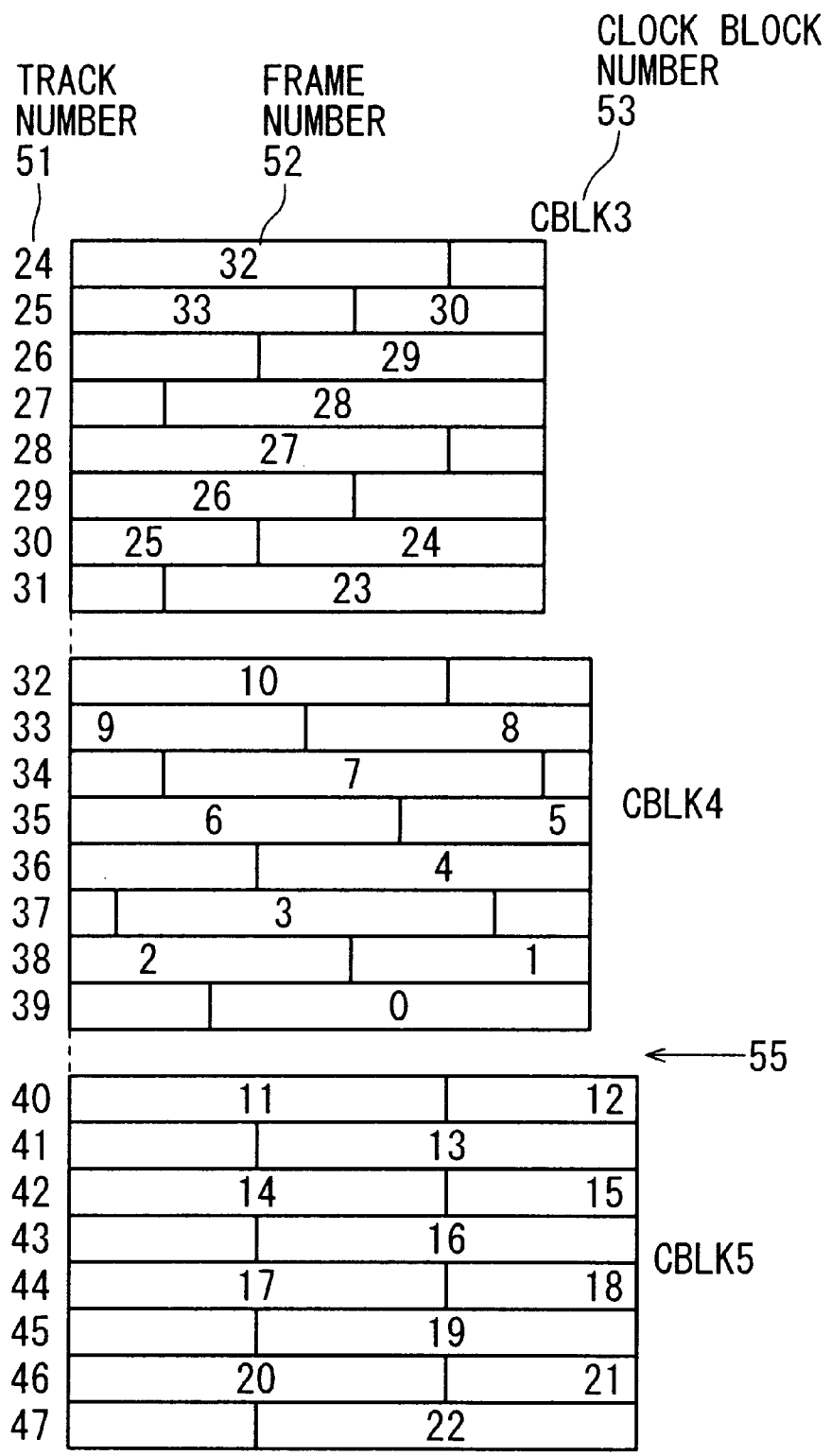
FIG. 28 is a constitutional diagram showing a track configuration following to the tracks shown in FIG. 27.
Figure 30:
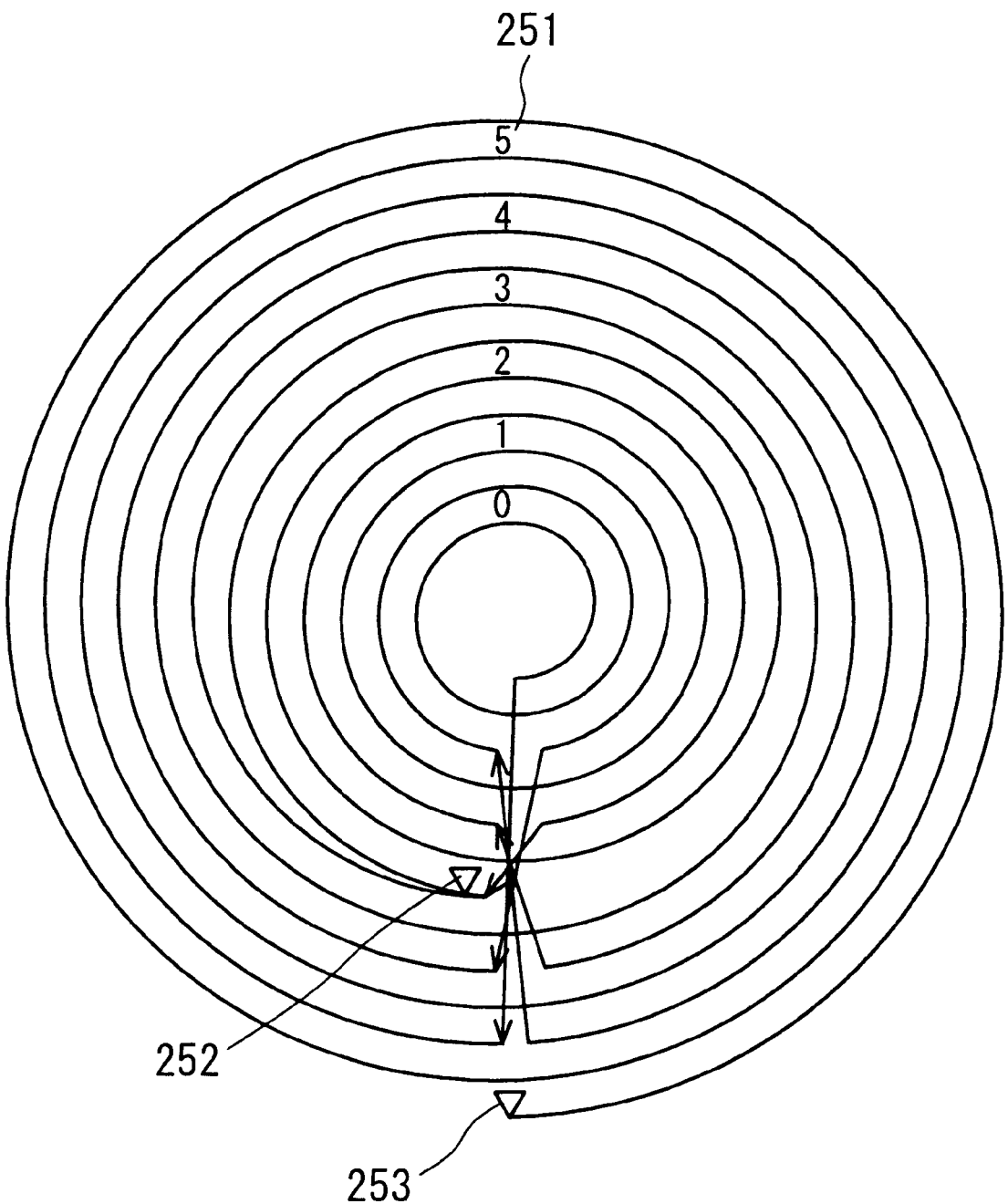
FIG. 30 is an explanatory diagram showing an outline of spiral tracks corresponding to that of FIGS. 27 to 29, respectively.

The fifth preferred embodiment of the invention is shown in FIGS. 27 to 29. In these drawings, numeral 55 designates the position of a disk center. The direction of the spiral on the inner circumference side is opposite to that on the outer circumference side. On the inner circumference side, the spiral advances toward the inner circumference, while on the outer circumference side, the spiral advances toward the outer circumference. The construction of tracks is shown in FIG. 30. Numeral 251 designates CBLKs, numeral 252 a write start track, and numeral 253 a write end track.

The write CBLKs are in the order of CBLK 2→CBLK 3→CBLK 1→CBLK 4→CBLK 0→CBLK 5. As with the first preferred embodiment, the number of revolutions of the disk is 20.8 rps which permits data of 11.5 frames/8 frames per track to be written. In this case, CBLK 0 to CBLK 4 on the inner circumference side constitute group 0, while CBLK 5 to CBLK 9 on the outer circumference side constitute group 1. The group is selected based on whether the residual buffer capacity at the write-end in each CBLK is in an increased or decreased state from the initial value. When the residual buffer capacity exceeds the initial value, the group 1 is selected. On the other hand, when the residual buffer capacity is smaller than the initial value, the group 0 is selected.

According to the fifth preferred embodiments shown in FIGS. 27 to 29, upon input of an instruction for start of writing, the disk control circuit 336 rotates the disk at 20.8 rps. An error correcting code and the like is attached to the input image data 331 by the input circuit 332, and the input image data 331 is written in the buffer 334. Data is immediately read from the buffer 334 by the buffer control 333. The read data is subjected to coding for writing or the like by the write-data process circuit 335, and the optical head 337 selects the 39th track in the optical disk 338 and starts writing in CBLK 4 toward the inner circumference.

At the end of the completion of writing up to the 32nd track, the residual buffer capacity is 0.5 frame because the capacity of writing is 11.5 frames with the capacity of reading being 11 frames. Next, since the residual buffer capacity is the initial value+0.5 frame, the group 1 is selected. The optical head is jumped to the 40th track, and writing in CBLK 5 is performed up to the 47th track. Regarding the change in buffer capacity in CBLK 5, the capacity of writing is 11.5 frames with the capacity of reading being 12 frames, providing a decrease of 0.5 frame. Therefore, the residual buffer capacity is 0.

Next, since the residual buffer capacity is the initial value+0, the group 0 is selected. The optical head is jumped to the 31st track, and writing in CBLK 3 is performed up to the 24th track. Regarding the change in buffer capacity in CBLK 3, the capacity of writing is 11.5 frames with the capacity of reading being 10 frames, providing an increase of 1.5 frames. Therefore, the residual buffer capacity is 1.5 frames.

Next, since the residual buffer capacity is the initial value+1.5 frames, the group 1 is selected. The optical head is jumped to the 48th track, and writing in CBLK 6 is performed up to the 55th track. Regarding the change in buffer capacity in CBLK 6, the capacity of writing is 11.5 frames with the capacity of reading being 13 frames, providing a decrease of 1.5 frames. Therefore, the residual buffer capacity is 0.

Thereafter, writing is performed in the same manner as described above. Finally, since the residual buffer capacity is the initial value+4.5 frames, the group 1 is selected. The optical head is jumped to the 72nd track, and writing in CBLK 9 is performed up to the 79th track. Regarding the change in buffer capacity in CBLK 9, the capacity of writing is 11.5 frames with the capacity of reading being 16 frames, providing a decrease of 4.5 frames. Therefore, the final residual buffer capacity is 0.

In the fifth preferred embodiment, writing maybe started from CBLK 5. In this case, data of 0.5 frame is first written in the buffer, and writing is then started. The order of writing is CBLK 5→CBLK 4→CBLK 6→CBLK 3→CBLK 7→CBLK→2→CBLK 8→CBLK 1→CBLK 9→CBLK 0. This preferred embodiment can be further applied in a method for reducing the necessary buffer capacity. The order of writing is quite the same as that shown in FIGS. 27 to 29.

Sixth preferred embodiment

Figure 31:
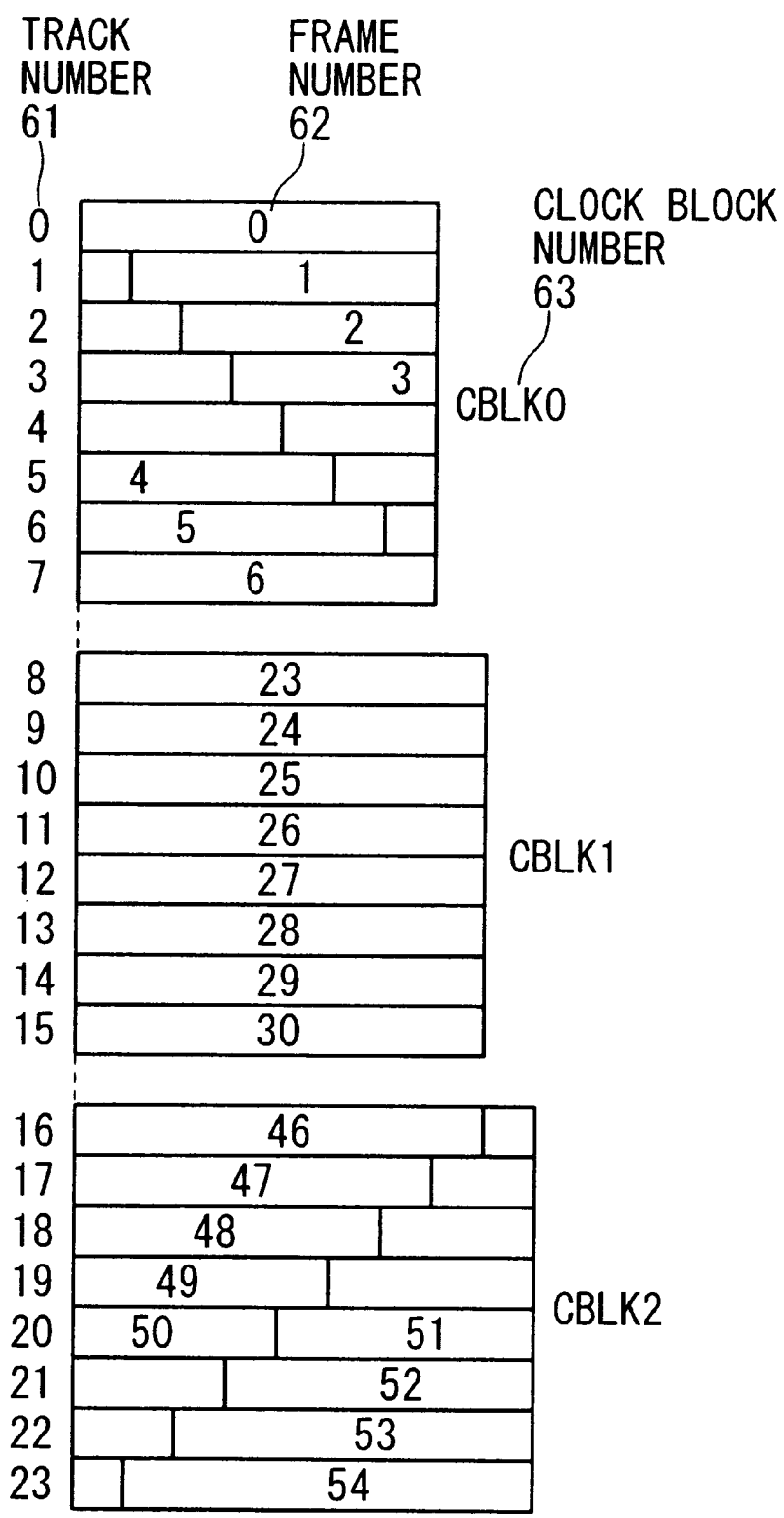
FIG. 31 is a constitutional diagram showing a track configuration, on the side of inner radius, based on which writing of information is started from the innermost radius in a disk which reverses a spiral direction at the disk center according to a sixth embodiment of the invention.
Figure 32:
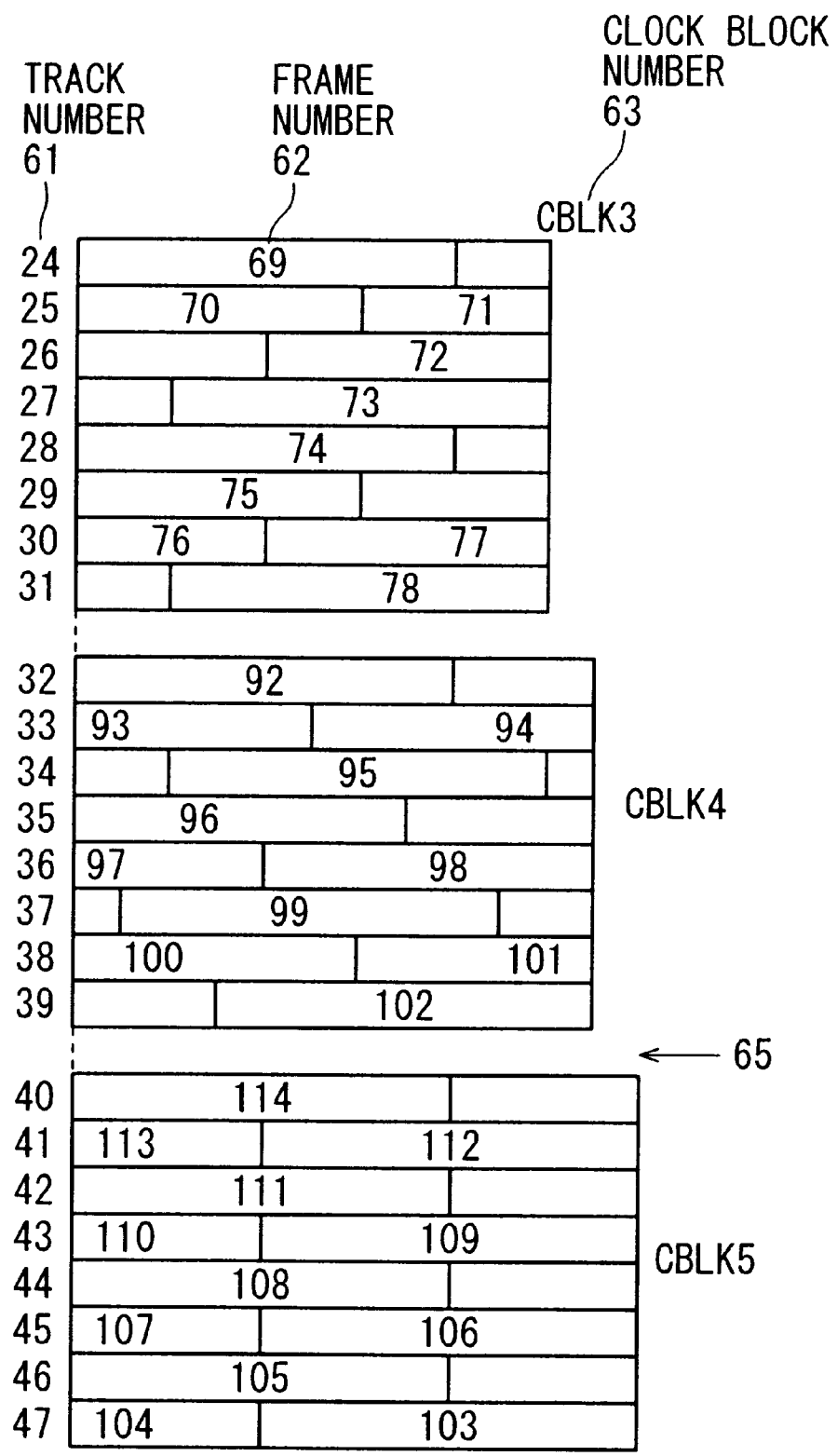
FIG. 32 is a constitutional diagram showing a track configuration following to the tracks shown in FIG. 31.
Figure 34:
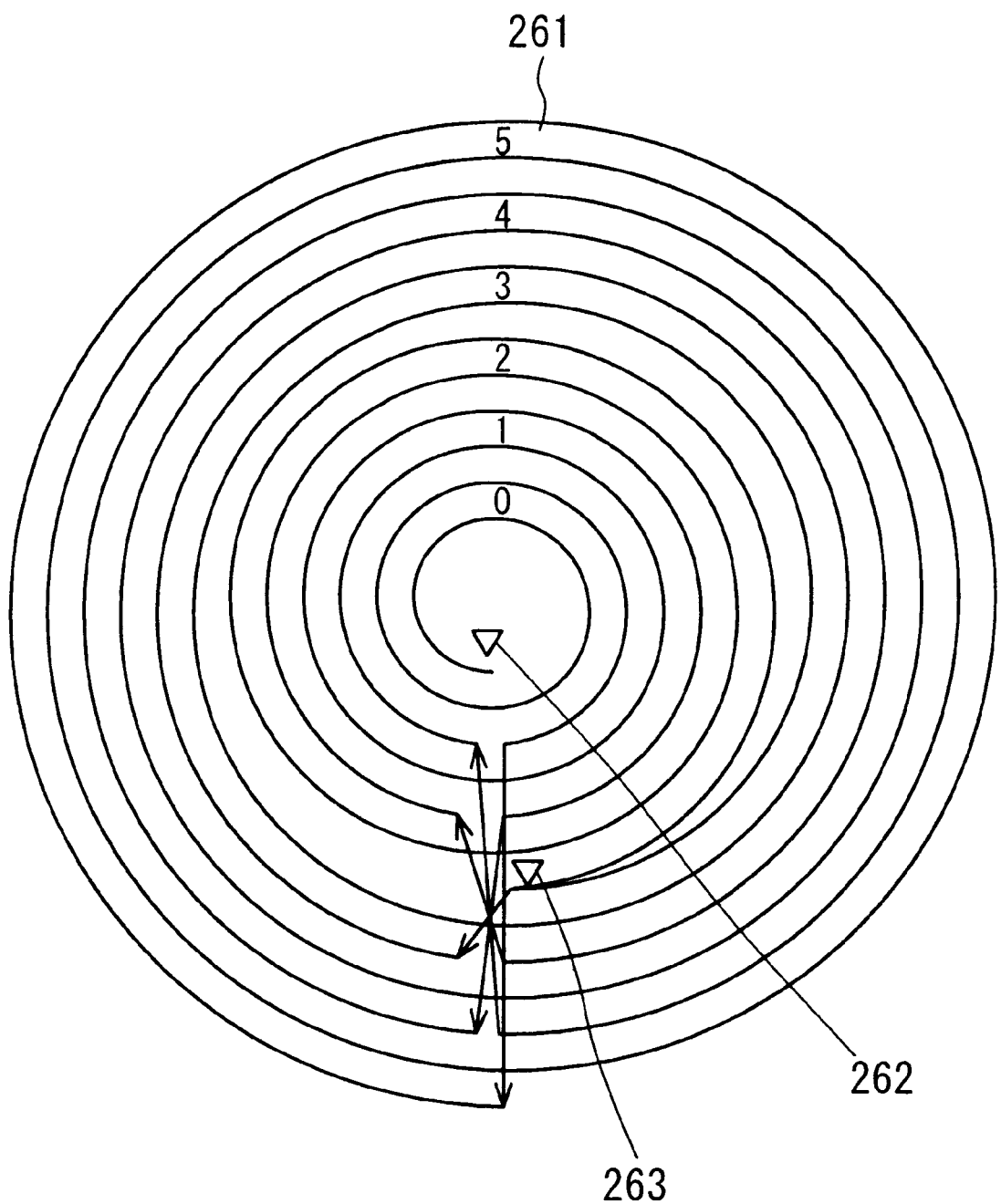
FIG. 34 is an explanatory diagram showing an outline of spiral tracks corresponding to that of FIGS. 31 to 33, respectively.

The sixth preferred embodiment is shown in FIGS. 31 to 33. In the sixth preferred embodiment, the 65th frame is the disk center. The direction of the spiral on the inner circumference side is opposite to that on the outer circumference side. On the inner circumference side, the spiral advances toward the outer circumference, that is, the disk center, while on the outer circumference side, the spiral advances toward the inner circumference, that is, the disk center. The construction of tracks is shown in FIG. 34. Numeral 261 designates CBLKs, numeral 262 a write start track, and numeral 263 a write end track. Data is written in the order of CBLK 0→CBLK 5→CBLK 1→CBLK 4→CBLK 2→CBLK 3. As with FIG. 6, the number of revolutions of the disk is 20.8 rps which permits writing of data of 11.5 frames/8 frames per track. In this case, CBLK 0 to CBLK 4 on the inner circumference side constitute group 0, while CBLK 5 to CBLK 9 on the outer circumference side constitute group 1. The group is selected based on whether the residual buffer capacity at the write-end in each CBLK is in an increased or decreased state from the initial value. When the residual buffer capacity exceeds the initial value, the group 1 is selected. On the other hand, when the residual buffer capacity is smaller than the initial value, the group 0 is selected.

According to the sixth preferred embodiments shown in FIGS. 31 to 33, upon input of an instruction for start of writing, the disk control circuit 336 rotates the disk at 20.8 rps. An error correcting code or the like is attached to the input image data 331 by the input circuit 332, and the input image data 331 is written in the buffer 334. Data is immediately read from the buffer 334 by the buffer control 333. The read data is subjected to coding for writing or the like by the write-data process circuit 335, and the optical head 337 selects the 0th track in the optical disk 338 and starts writing in CBLK 0 toward the outer circumference.

At the end of the completion of writing up to the 7th track, the residual buffer capacity is 4.5 frames because the capacity of writing is 11.5 frames with the capacity of reading being 7 frames. Next, since the residual buffer capacity is the initial value +4.5 frames, the group 1 is selected. The optical head is jumped to the 79th track, and writing in CBLK 9 is performed up to the 72nd track. Regarding the change in buffer capacity in CBLK 9, the capacity of writing is 11.5 frames with the capacity of reading being 16 frames, providing a decrease of 4.5 frames. The residual buffer capacity is 0.

Next, since the residual buffer capacity is the initial value+0, the group 0 is selected. The optical head is jumped to the 8th track, and writing in CBLK 1 is performed up to the 15th track. Regarding the change in buffer capacity in CBLK 1, the capacity of writing is 11.5 frames with the capacity of reading being 8 frames, providing an increase of 3.5 frames. The residual buffer capacity is 3.5 frames.

Next, since the residual buffer capacity is the initial value+3.5 frames, the group 1 is selected. The optical head is jumped to the 71st track, and writing in CBLK 8 is performed up to the 64th track.

Regarding the change in buffer capacity in CBLK 8, the capacity of writing is 11.5 frames with the capacity of reading being 15 frames, providing a decrease of 3.5 frames. The residual buffer capacity is 0. Thereafter, writing is performed in the same manner as described above. Finally, since the residual buffer capacity is the initial value+0.5 frames, the group 1 is selected. The optical head is jumped to the 40th track, and writing in CBLK 5 is performed up to the 79th track. Regarding the change in buffer capacity in CBLK 5, the capacity of writing is 11.5 frames with the capacity of reading being 12 frames, providing a decrease of 0.5 frame. The final residual buffer capacity is 0.

In the sixth preferred embodiment, writing may be started from CBLK 9. In this case, data of 4.5 frames is first written in the buffer, and writing is then started. The order of writing is CBLK 9→CBLK 0→CBLK 8→CBLK 1→CBLK 7→CBLK 2→CBLK 6→CBLK 3→CBLK 5→CBLK 4. This preferred embodiment can be further applied in a method for reducing the necessary buffer capacity. The order of writing is quite the same as that shown in FIGS. 31 to 33.

Seventh preferred embodiment

Next, processing in a land/groove disk will be explained. A land/groove track format is shown as the seventh preferred embodiment in FIGS. 35 to 38. Number 71 designates a track number, numeral 72 a frame number, numeral 73 a CBLK number, and number 76 land/groove (L/G).

In this case, the even number track is indicated as land L, and the odd number track is indicated as groove G. Data to be written may be, for example, in-frame fixed-length coded image data. One frame consists of 8 SB. The total number of tracks is 80 tracks. The number of land tracks is 40, while the number of groove tracks is 40. Next, recording regions are equally divided into 10 parts in a track direction, so that one recording region (hereinafter referred to as "clock block (CBLK)") consists of 16 tracks.

For CBLK 0 as the innermost circumference region, data of 1 frame per track, that is, data of 16 frames in total, is written; for CBLK 1, data of 5/4 frames per track, that is, data of 20 frames in total, is written; for CBLK 2, data of 6/4 frames per track, that is, data of 24 frames in total, is written; for CBLK 3, data of 7/4 frames per track, that is, data of 28 frames in total, is written; and for CBLK 4 as the outermost circumference region, data of 2 frames per track, that is, data of 32 frames in total, is written.

Figure 38A:
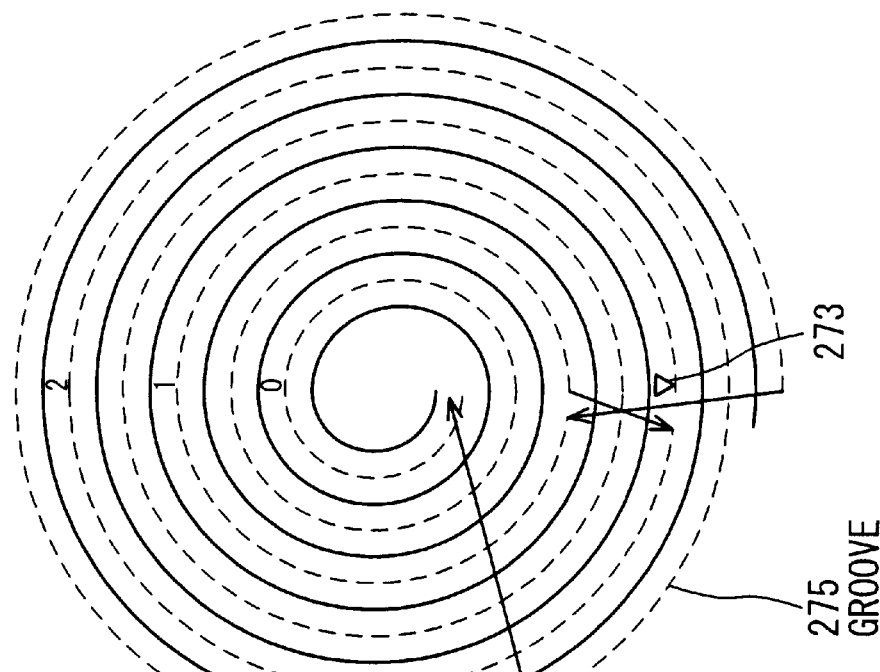
Figure 38B:
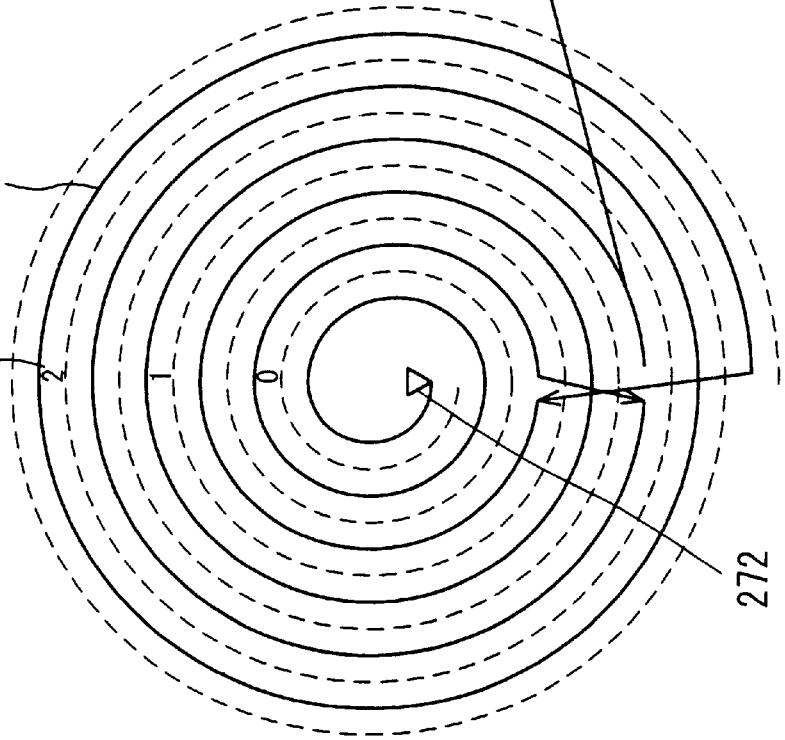

FIGS. 38 (A) and (B) show an embodiment of the construction of tracks wherein CBLK 0 to CBLK 2 exist. Numeral 271 designates CBLK, numeral 272 a write start track, numeral 273 a write-end track, numeral 274 a land, and numeral 275 a groove. Data is written in the order of CBLK 0 (land)→2 (land)→1 (land)→0 (groove)→2 (groove)→1 (groove).

The number of revolutions of the disk is one which, in terms of the number of revolutions of CBLK 2 as the average value for all the tracks, permits data of 12/8 frames per track to be written. That is, when the frame frequency is 29.97 rps, the number of revolutions of the disk is 29.97× 8/12=20.0 rps. This number of revolutions is 33% lower than the conventional number of revolutions 29.97 rps.

According to the seventh preferred embodiments shown in FIGS. 35 to 37, upon input of an instruction for start of writing, the disk control circuit 336 rotates the disk at 20.0 rps, and data is written in the land track. An error correcting code or the like is attached to the input image data 331 by the input circuit 332, and the input image data 331 is written in the buffer 334. At the same time, data is read from the buffer 334 by the buffer control 333. The read data is subjected to coding for writing or the like by the write-data process circuit 335, and the optical head 337 selects the 0th track in the optical disk 338 and starts writing in CBLK 0.

At the end of the completion of writing up to the 14th track, the residual buffer capacity is 4 frames because the capacity of writing is 12 frames with the capacity of reading being 8 frames. Next, the optical head is jumped to the 64th track, and writing in CBLK 4 is performed up to the 78th track. Regarding the change in buffer capacity in CBLK 4, the capacity of writing is 12 frames with the capacity of reading being 16 frames, providing a decrease of 4 frames. The residual buffer capacity is 0.

Thus, when data is written in CBLK 1, CBLK 3, and finally CBLK2, the residual buffer capacity becomes 0. In this case, 5 regarding CBLK 2, writing may be performed at any time, because there is no change in capacity of the buffer. Thus, writing in the land tracks is completed. Subsequently, data is written in the groove tracks. The optical head is jumped to the 1st track, and writing in CBLK 0 is performed up to the 15th track. Regarding the change in buffer capacity in CBLK 0, the capacity of writing is 12 frames with the capacity of reading being 8 frames, providing an increase of 4 frames. The residual buffer capacity is 4 frames.

Next, the optical head is jumped to the 65th track, and writing in CBLK 4 is performed up to the 79th track. Regarding the change in buffer capacity in CBLK 4, the capacity of writing is 12 frames with the capacity of reading being 16 frames, providing a decrease of 4 frames. The residual buffer capacity is 0.

In this way, writing is continued in the order as FIGS. 35 to 38. Finally, the optical head writes the groove tracks in CBLK 2 to complete the entirety of writing. The final residual buffer capacity is 0. For the above land/groove writing, the land and the groove may be switched one CBLK by one CBLK.

Figure 40:
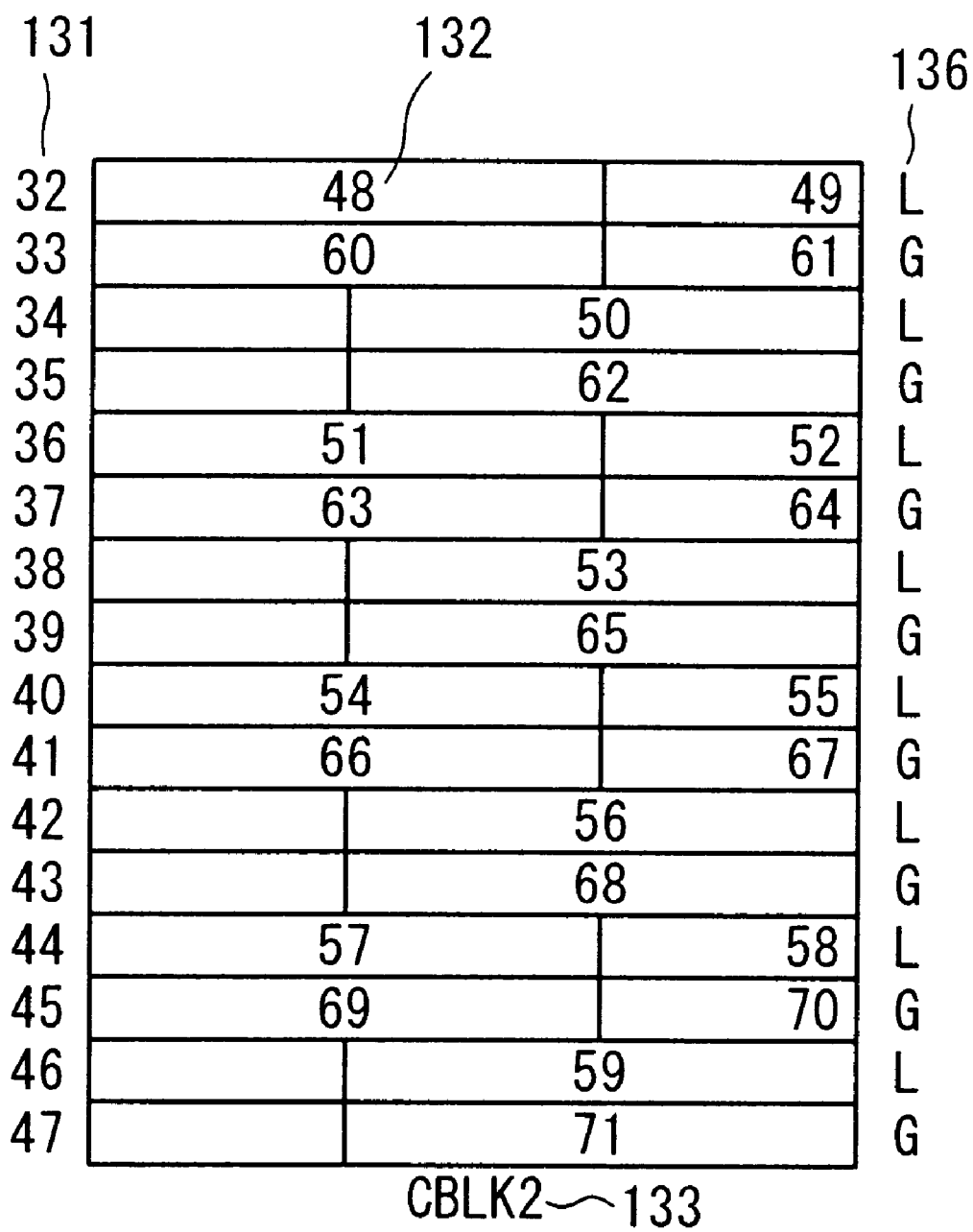
FIG. 40 is a constitutional diagram showing a track configuration following to the tracks shown in FIG. 39.

Another example of the seventh preferred embodiment is shown in FIGS. 39 to 41. In this embodiment, data is written in the order of CBLK0 (land)→CBLK4 (groove)→CBLK 1 (land)→CBLK 3 (groove)→CBLK 2 (land)→CBLK 2 (groove)→CBLK 3 (land)→CBLK 1 (groove)→CBLK 4 (land)→CBLK 0 (groove). The land/groove may be reversed and may be created as desired without limitation to this example.

In this example, writing may be started from CBLK4. Upon input of an instruction for start of writing, the disk control circuit 336 rotates the disk at 20.0 rps. An error correcting code or the like is attached to the input image data 331 by the input circuit 332, and the input image data 331 is written in the buffer 334. In this case, reading of data from the buffer 334 by the buffer control 333 is started when data of 4 frames or more has been stored in the buffer.

The read data is subjected to coding for writing or the like by the write-data process circuit 335, and the optical head 337 selects the 64th track in the optical disk 338 and starts writing in CBLK 4. Regarding the change in buffer capacity in CBLK 4, the capacity of writing is 12 frames with the capacity of reading being 16 frames, providing a decrease of 4 frames. Since data of 4 frames is previously stored in the buffer, the residual buffer capacity is 0.

In this way, data is written in the order of CBLK 4 (land)→CBLK 0 (land)→CBLK 3 (land)→CBLK 1 (land) →CBLK 2 (land)→CBLK 4 (groove)→CBLK 0 (groove) →CBLK 3 (groove)→CBLK 1 (groove)→CBLK 2 (groove). For the above land/groove writing, the land and the groove may be switched one CBLK by one CBLK. In this case, for example, data may be written in the order of CBLK 4 (land)→CBLK 0 (groove)→CBLK 3 (land) →CBLK 1 (groove)→CBLK 2 (land)→CBLK 2 (groove) →CBLK 1 (land)→CBLK 3 (groove)→CBLK 0 (land) →CBLK 4 (groove). The land/groove may be reversed and may be created as desired without limitation to this example.

The order of writing is not limited to the above example, and writing may be performed in any order so far as data is continuously written in symmetrically located CBLKs around the disk center. Also in this case, data may be written in CBLK 2 at any time. For example, data may be written in the order of CBLK 3→CBLK 1→CBLK 2→CBLK 4→CBLK 0.

Reading of data thus recorded will be explained.

Upon input of an instruction for start of reading, the disk control circuit 346 rotates the disk at 20.0 rps. At the same time, when the writing has been started from CBLK 0 in the optical disk 348, the optical head 347 selects the 0th track, while when the writing has been started from CBLK 4, the optical head 347 selects the 64th track, followed by start of reading. The read data is subjected to decoding of code for writing or the like by the read-data process circuit 345 and then written in the buffer 344. Reading of data from the buffer 344 by the buffer control 343 is started after the storage of data of 4 frames or more in the buffer when the writing has been started from CBLK 0. On the other hand, reading of data from the buffer 344 by the buffer control 343 is immediately started when the writing has been started from CBLK 4.

The read data is subjected to error correction treatment or the like by the output circuit 342 and then output as image data 341. Thereafter, reading is continued, and, when the writing has been started from CBLK 0, the residual buffer capacity becomes 4 frames, while when the writing has been started from CBLK 4, the residual buffer capacity becomes 0, completing the reading.

Thus, control of data using a buffer of 4 frames enables a reduction of the number of revolutions of the disk by 33% without an overflow and an underflow of the buffer.

Eighth preferred embodiment

The eighth preferred embodiment is shown in FIGS. 42 and 44. In this eighth preferred embodiment, as with the seventh preferred embodiment, the number of revolutions of the disk is 20.0 rps which permits writing of 12/8 frames per track. In this case, regarding CBLK in which data is to be next written, when the CBLKs per se is considered, a group consisting of CBLK 0 to CBLK 1 wherein the number of revolutions 20.0 rps is insufficient, that is, the residual buffer capacity is increased (group 0), or a group consisting of CBLK 3 to CBLK 4 wherein the number of revolutions 20.0 rps is excessive, that is, the residual buffer capacity is decreased (group 1), is selected according to a change (that is, an increase or a decrease) in the residual buffer capacity from the initial value at the end of writing in each CBLK.

Figure 45A:
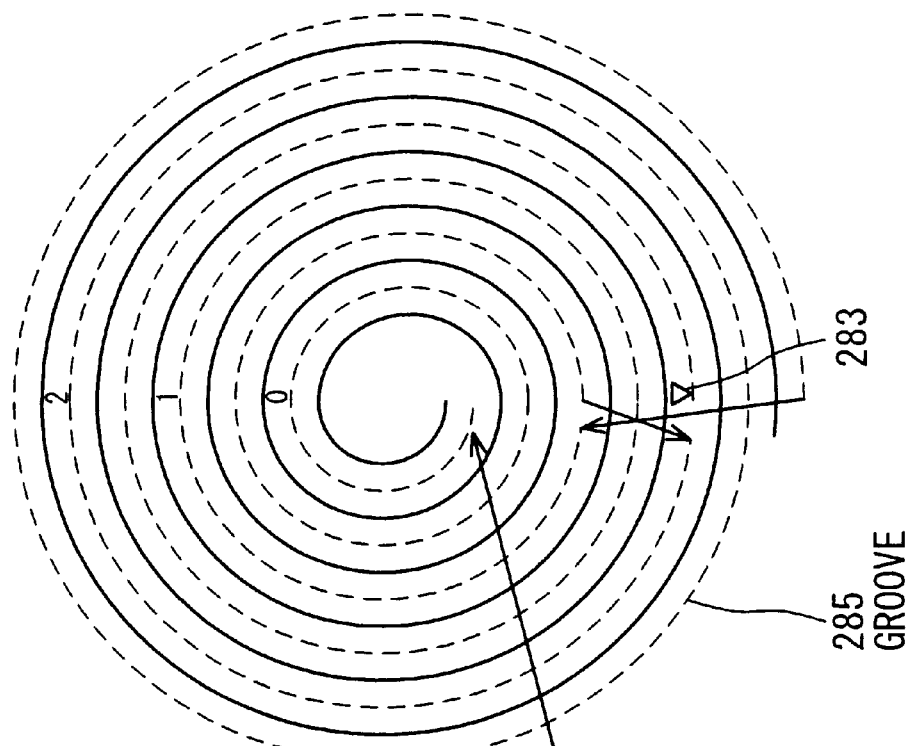
Figure 45B:
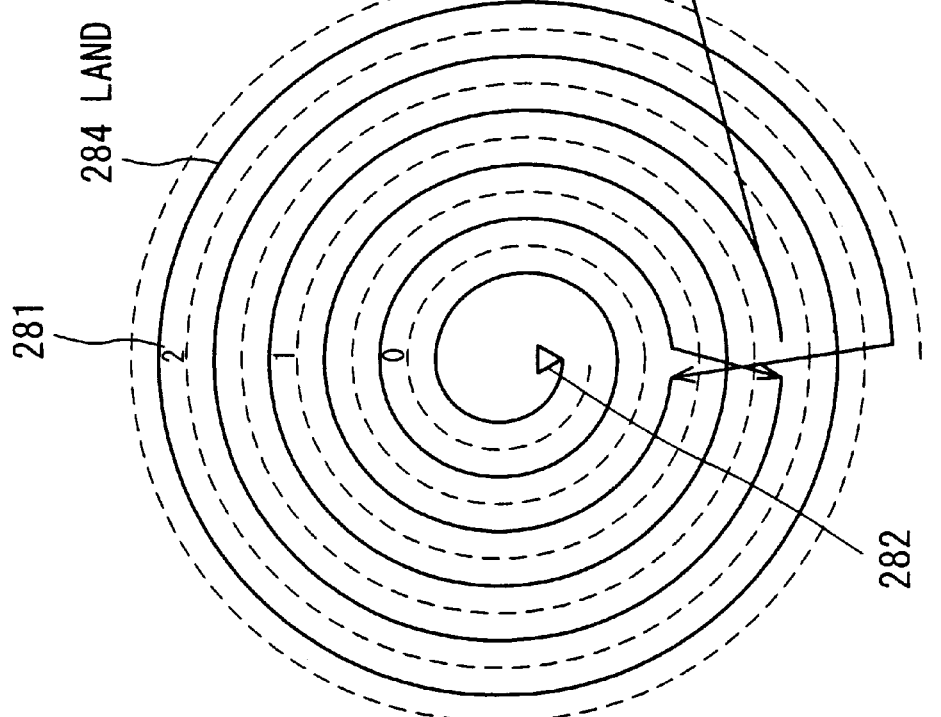

When the residual buffer capacity exceeds the initial value, the group 1 is selected, while when the residual buffer capacity is not more than the initial value, the group 0 is selected. FIG. 45 shows an embodiment of the construction of tracks wherein CBLK 0 to CBLK 2 exist. Numeral 281 designates CBLK, numeral 282 a write start track, numeral 283 a write-end track, numeral 284 a land, and numeral 285 a groove. Data is written in the order of CBLK 0→(land)→2 (land)→1 (land)→0 (groove)→2 (groove)→1 (groove).

According to the eighth preferred embodiments shown in FIGS. 42 to 44, upon input of an instruction for start of writing, the disk control circuit 336 rotates the disk at 20.0 rps, and data is written in the land track. An error correcting code or the like is attached to the input image data 331 by the input circuit 332, and the input image data 331 is written in the buffer 334. Reading of data from the buffer 334 by the buffer control 333 is started when data of 2 frames has been stored in the buffer.

The read data is subjected to coding for writing or the like by the write-data process circuit 335, and the optical head 337 selects the 0th track in the optical disk 338 and starts writing in CBLK 0. When writing up to the 14th track has been completed, the capacity of writing is 12 frames with the capacity of reading being 8 frames, providing an increase of 4 frames. Therefore, the residual buffer capacity of the buffer is 6 frames. Next, since the residual buffer capacity is the initial value+4 frames, the group 1 is selected. The optical head is jumped to the 48th track, and writing in CBLK 3 is performed up to the 62nd track. Regarding the change in buffer capacity in CBLK 3, the capacity of writing is 12 frames with the capacity of reading being 14 frames, providing a decrease of 2 frames. Therefore, the residual buffer capacity is 4 frames.

Next, since the residual buffer capacity is the initial value+2 frames, the group 1 is selected. The optical head is jumped to the 64th track, and writing in CBLK 4 is performed up to the 78th track. Regarding the change in buffer capacity in CBLK4, the capacity of writing is 12 frames with the capacity of reading being 16 frames, providing a decrease of 4 frames. Therefore, the residual buffer capacity is 0. Next, since the residual buffer capacity is the initial value−2 frames, the group 0 is selected. The optical head is jumped to the 16th track, and writing in CBLK 1 is performed up to the 30th track. Regarding the change in buffer capacity in CBLK 1, the capacity of writing is 12 frames with the capacity of reading being 10 frames, providing an increase of 2 frames. Therefore, the residual buffer capacity is 2 frames. Finally, data is written in CBLK 2. In this case, the residual buffer capacity remains unchanged, that is, is 2 frames. In CBLK 2, since there is no change in buffer capacity, data may be written at any time. Thus, writing in the land tracks is completed. Subsequently, in the same manner as described above, writing in groove tracks is performed in the order of CBLK 0→CBLK 3→CBLK 4→CBLK 1→CBLK 2.

As shown in FIGS. 46 to 48, for the above land/groove writing, the land and the groove may be switched one CBLK by one CBLK or may be created as desired. In the embodiment shown in FIGS. 46 to 48, data is written in the order of CBLK 0 (land)→CBLK 3 (groove)→CBLK 4 (groove) →CBLK 1 (land)→CBLK 2 (land)→CBLK 3 (land) →CBLK 0 (groove)→CBLK 4 (land)→CBLK 1 (groove) →CBLK 2 (groove). The land/groove may be reversed.

In this preferred embodiment, a buffer capacity corresponding to 6 frames is necessary. When a buffer capacity required in the next CBLK is previously known, the necessary buffer capacity can be reduced. In the eighth preferred embodiment, for CBLK 0 and CBLK 4, the change in buffer capacity is 4 frames. Therefore, the permissible buffer range is 0 to 4 frames. The necessary buffer capacity is 4 frames. Upon input of an instruction for start of writing, writing is started with the residual buffer capacity being 0. In the next CBLK, when the capacity of data to be written does not exceed the permissible buffer range, writing is continued. On the other hand, when the capacity of data to be written exceeds the permissible buffer range, the writing group is changed writing in land tracks is first performed. In CBLK 0, the buffer capacity is increased by 4 frames, and the residual buffer capacity is 4 frames.

Next, in the case of writing in CBLK 1, the buffer capacity is increased by 2 frames, and the residual buffer capacity is 6 frames which exceeds the permissible buffer range. Therefore, the optical head is jumped to CBLK 3 in the group 1, followed by writing in CBLK 3. In this case, the buffer capacity is decreased by 2 frames, and the residual buffer capacity is 2 frames. Next, in the case of writing in CBLK 4, the buffer capacity is decreased by 4 frames, and the residual buffer capacity is −2 frames which exceeds the permissible buffer range. Therefore, the optical head is jumped to CBLK 1 in the group 0, followed by writing in CBLK 1. In this case, the buffer capacity is increased by 2 frames, and the residual buffer capacity is 4 frames.

Next, data is written in CBLK4. In this case, the buffer capacity is decreased by 4 frames, and the residual buffer capacity is 0. Finally, data is written in CBLK 2. In this case, the residual buffer capacity remains unchanged, that is, is 0. In CBLK 2, since there is no change in buffer capacity, data may be written at any time. Thus, writing in the land tracks is completed. Subsequently, in the same manner as described above, writing in groove tracks is performed in the order of CBLK 0"CBLK 3→CBLK 1→CBLK 4→CBLK 2. For the above land/groove writing, the land and the groove may be switched one CBLK by one CBLK or may be created as desired. The land and the groove may be reversed.

Ninth preferred embodiment

The ninth preferred embodiment is shown in FIGS. 49 to 51. In the ninth preferred embodiment, CBLK 0 to CBLK 1 in the group 0 are scanned from the innermost circumference toward the outermost circumference, and CBLK 3 to CBLK 4 in the group 1 are scanned from the outermost circumference toward the innermost circumference. FIG. 52 is a diagram showing track jumping wherein only CBLK 0 to CBLK 5 are present. Numeral 291 designates CBLK, numeral 292 a write start track, numeral 293 a write-end track, numeral 294 a land track, and numeral 295 a groove track. Data is written in the order of CBLK 0 (land)→CBLK 2 (land, backward)→CBLK 1 (land)→CBLK 0 (groove) →CBLK 2 (groove, backward)→CBLK 1 (groove). According to the ninth preferred embodiments shown in FIGS. 49 to 51, upon input of an instruction for start of writing, the disk control circuit 336 rotates the disk at 20.0 rps, and data is written in the land track. At the outset, as with the seventh preferred embodiment, data is written in CBLK 0. Next, the optical head is jumped to the 78th track, and writing in CBLK 4 is performed up to the 64th track.

In this case, after the writing in the 78th track, the optical head is subjected to land 2 track backward jumping and jumped to 76th track. After writing in the 76th track, the optical head is subjected to land 2 track backward jumping and jumped to 74th track. This operation is continued until writing in the 64th track is completed. Next, as with the seventh preferred embodiment, writing in CBLK 1 is performed.

The optical head is then jumped to the 62nd track, and data is written in CBLK 3 while performing 2 track backward jumping per track in the same manner as described above in connection with CBLK 4. Finally, data is written in CBLK 2. In this case, however, since there is no change in buffer, writing may be performed at any time. Thus, writing in the land tracks is completed. Subsequently, in the same manner as described above, writing in groove tracks is performed in the order of CBLK 0→CBLK 4→CBLK 1→CBLK 3→CBLK 2. For the above land/groove writing, the land and the groove may be switched one CBLK by one CBLK.

Figure 54:
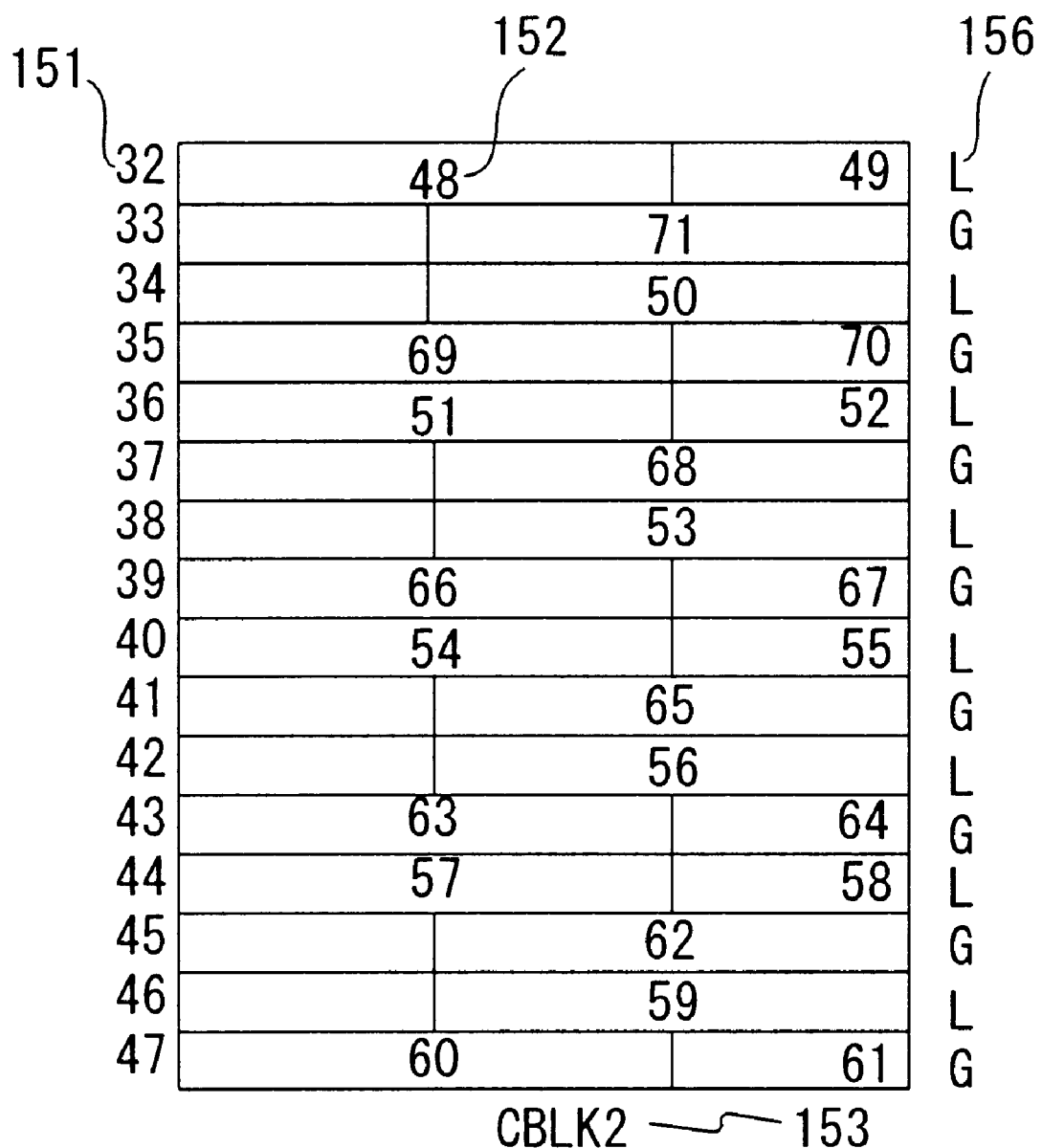
FIG. 54 is a constitutional diagram showing a track configuration following to the tracks shown in FIG. 53.

Another example of the ninth preferred embodiment is shown in FIGS. 53 to 55. In this embodiment, data is written in the order of CBLK 0 (land)→CBLK 4 (groove)→CBLK 1 (land)→CBLK 3 (groove)→CBLK 2 (land)→CBLK 2 (groove)→CBLK 3 (land)→CBLK 1 (groove)→CBLK 4 (land)→CBLK0 (groove). The land/groove may be created as desired or may be reversed. Writing may be started from CBLK 4. In this case, data is written in the order of CBLK 4 (land)→CBLK 0 (land)→CBLK 3 (land)→CBLK 1 (land) →CBLK 2 (land)→CBLK 4 (groove)→CBLK 0 (groove) →CBLK 3 (groove)→CBLK 1 (groove)→CBLK 2 (groove).

Alternatively, data may be written in the order of CBLK 4 (land)→CBLK 0 (groove)→CBLK 3 (land)→CBLK 1 (groove)→CBLK 2 (land)→CBLK 2 (groove)→CBLK 1 (land)→CBLK 3 (groove)→CBLK 0 (land)→CBLK 4 (groove). The land/groove may be reversed.

The eighth preferred embodiment may be combined with the ninth preferred embodiment, and writing may be started from CBLK 4. CBLK 3 to CBLK 4 constitute group 2, and CBLK 0 to CBLK 1 constitute group 3. When the residual buffer capacity is the initial value or more, the group 2 is selected, while when the residual buffer capacity is less than the initial value, the group 3 is selected. Upon input of an instruction for start of writing, the disk control circuit 336 rotates the disk at 20.0 rps. An error correcting code or the like is attached to the input image data 331 by the input circuit 332, and the input image data 331 is written in the buffer 334. Reading of data from the buffer 334 by the buffer control 333 is started when data of 4 frames has been stored in the buffer. The read data is subjected to coding for writing or the like by the write-data process circuit 335, and the optical head 337 selects the 78th track in the optical disk 338 and starts writing in CBLK 9.

When writing up to the 64th track has been completed, the residual buffer capacity is 0 because the capacity of writing is 12 frames with the capacity of reading being 16 frames. In this embodiment, 2 track backward jumping per track is performed over the whole track. Thereafter, as with the eighth preferred embodiment, the group, in which data is to be written, and CBLK are selected. Writing is performed in the following order:

CBLK 4 (land, −4/0) CBLK 1 (land, 2/2)→CBLK 0 (land, 4/6) CBLK3 (land, −2/4) CBLK2 (land, 0/4) CBLK4 (groove, −4/0)→CBLK 1 (groove, 2/2)→CBLK 0 (groove, 4/6)→CBLK 3 (groove, −2/4)→CBLK 2 (groove, 0/4).

In this case, the numerator in parentheses represents a change (an increase or a decrease) in buffer in the CBLK, and the denominator represents the resultant residual buffer capacity. For the above land/groove writing, the land and the groove may be switched one CBLK by one CBLK or may be created as desired. Further, the land and the groove may be reversed.

Further, in the method and apparatus for reducing the necessary buffer capacity, writing may be started from CBLK 4. The permissible buffer range is 0 to 4 frames. The necessary residual buffer capacity is 4 frames. Upon input of an instruction for start of writing, the disk control circuit 336 rotates the disk at 20.0 rps.

An error correcting code or the like is attached to the input image data 331 by the input circuit 332, and the input image data 331 is written in the buffer 334. Reading of data from the buffer 334 by the buffer control 333 is started when data of 4 frames has been stored in the buffer. The read data is subjected to coding for writing or the like by the write-data process circuit 335, and the optical head 337 selects the 78th track in the optical disk 338 and starts writing in CBLK 4. When writing up to the 64th track has been completed, the residual buffer capacity is 0 because the capacity of writing is 12 frames with the capacity of reading being 16 frames. In this embodiment, 2 track backward jumping per track is performed over the whole track. Thereafter, as with the eighth preferred embodiment, the group in which data is to be written and CBLK are selected. Writing is performed in the following order:

CBLK4 (land, −4/0) CBLK1 (land, 2/2) CBLK3 (land, −2/0)→CBLK 0 (land, 4/4)→CBLK 2 (land, 0/4)→CBLK 4 (groove, −4/0) CBLK 1 (groove, 2/2)→CBLK 3 (groove, −2/0)→CBLK 0 (groove, 4/4) CBLK 2 (groove, 0/4).

In this case, the numerator in parentheses represents a change (an increase or a decrease) in buffer in the CBLK, and the denominator represents the resultant residual buffer capacity.

For the above land/groove writing, the land and the groove may be switched one CBLK by one CBLK or may be created as desired. Further, the land and the groove may be reversed.

Tenth preferred embodiment

Figure 57:
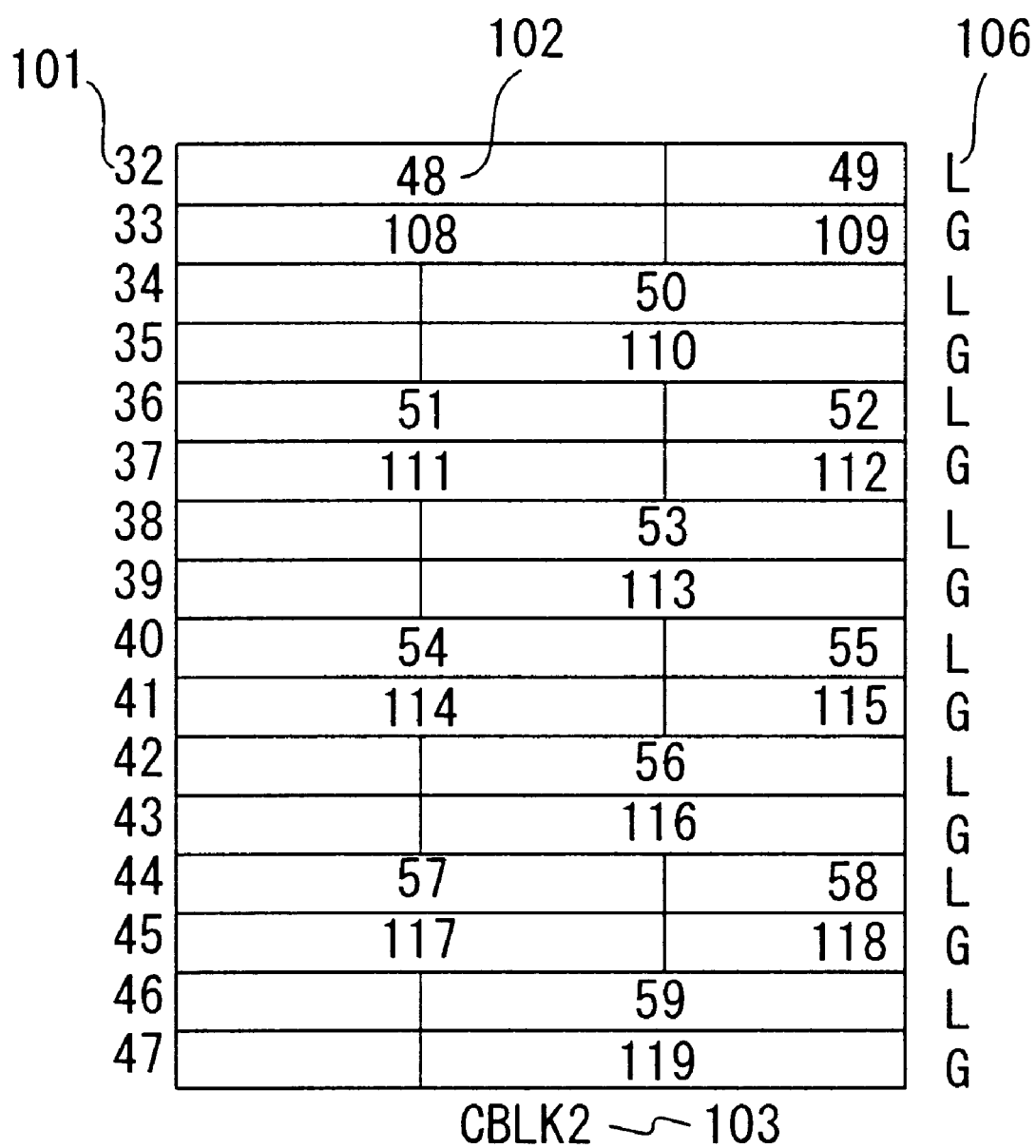
FIG. 57 is a constitutional diagram showing a track configuration following to the tracks shown in FIG. 56.
Figure 59:
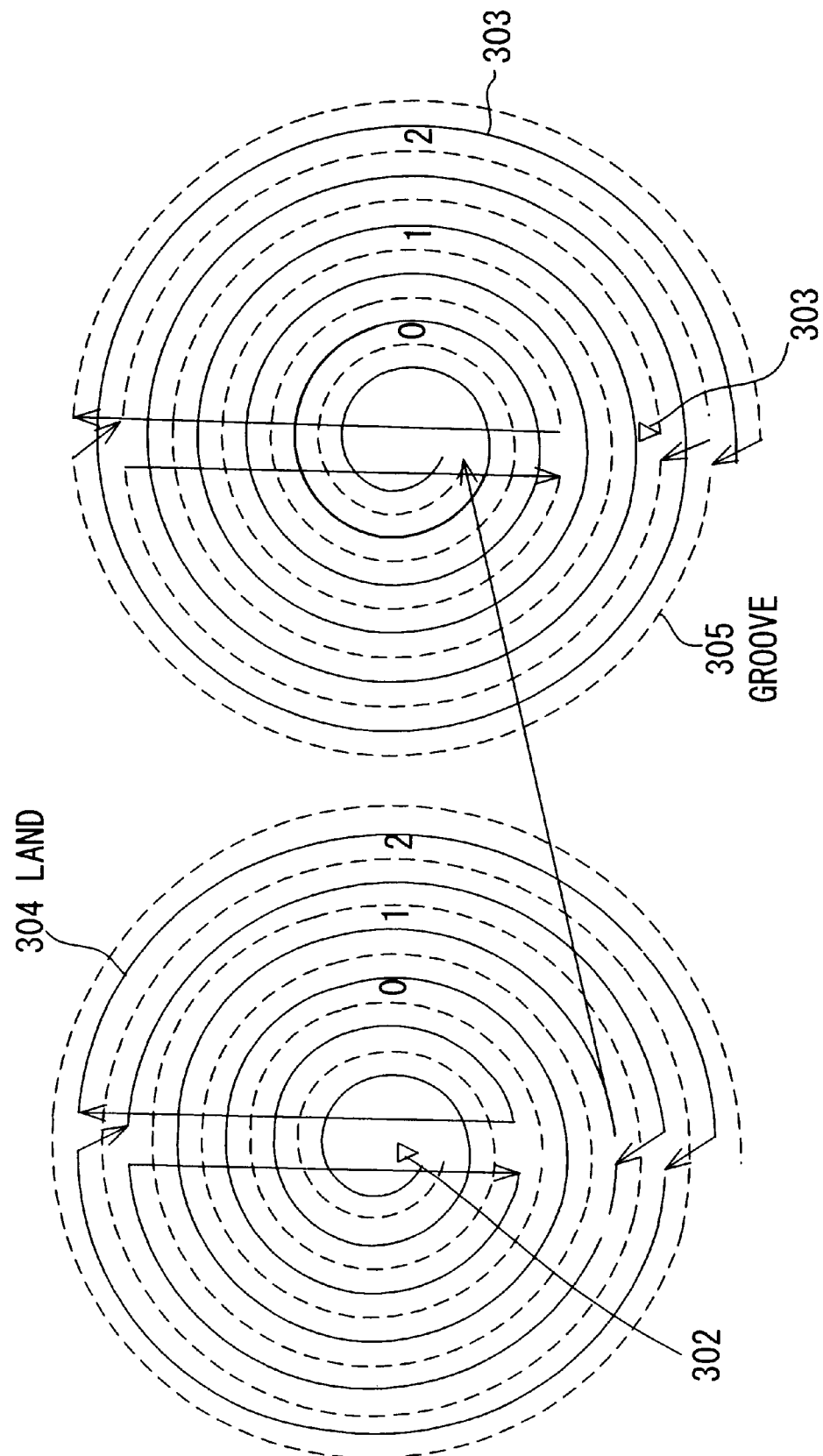

The tenth preferred embodiment is shown in FIGS. 56 to 58. As with the ninth preferred embodiment, CBLK 0 to CBLK 1 in the group 0 are scanned from the innermost circumference toward the outermost circumference, and CBLK 2 to CBLK 3 in the group 1 are scanned from the outermost circumference toward the innermost circumference. FIGS. 59 (A) and (B) show track jumping wherein only CBLK 0 to CBLK 5 are present. Numeral 301 designates CBLK, numeral 302 a write start track, numeral 303 a write-end track, numeral 304 a land track, and numeral 305 a groove track. Data is written in the order of CBLK 0 (land)→CBLK 2 (land, backward)→CBLK 1 (land) →CBLK 0 (groove)→CBLK 2 (groove, backward)→CBLK 1 (groove).

In the tenth preferred embodiment, in jumping between CBLKs, such as jumping from CBLK 0 to CBLK 9 or jumping from CBLK 9 to CBLK 1, an unwritable period of ½ track occurs. Therefore, the disk should be rotated at a number of revolutions which permits data of 12 frames to be written in 8.5 tracks. This corresponds to 29.97×8.5/12=21.2 rps.

In the tenth preferred embodiment shown in FIGS. 56 to 58, upon input of an instruction for start of writing, the disk control circuit 336 rotates the disk at 21.2 rps, and data is written in the land track. At the outset, as with the ninth preferred embodiment, data is written in CBLK 0. Next, the optical head is jumped to the 78th track, and writing in CBLK 4 is performed up to the 64th track. In this case, after scanning from the center portion of the 78th track to the front portion of the 80th track, the optical head is subjected to land 1 track backward jumping and jumped to the front portion of the 78th track. After scanning from the front portion of the 78th track to the center portion of the 78th track, the optical head is subjected to land 1 track backward jumping and jumped to the center portion of the 76th track. The above procedure is repeated until scanning up to the center portion of the 64th track is completed. Thus, scanning of CBLK 4 is completed.

Next, data is written in CBLK 1 in the same manner as in the ninth preferred embodiment. Further, the optical head is jumped to the 62nd track, and data is written in CBLK 3 while performing land 1 track backward jumping per ½ track in the same manner as described above in connection with CBLK 4. Writing in CBLK 2 is then performed to complete the land track writing. In this case, however, since there is no change in buffer, writing may be performed at any time. Thus, writing in the land tracks is completed. Subsequently, in the same manner as described above, writing in groove tracks is performed in the order of CBLK 0→CBLK 4→CBLK 1→CBLK 3→CBLK 2. For the above land/groove writing, the land and the groove may be switched one CBLK by one CBLK.

Figure 61:
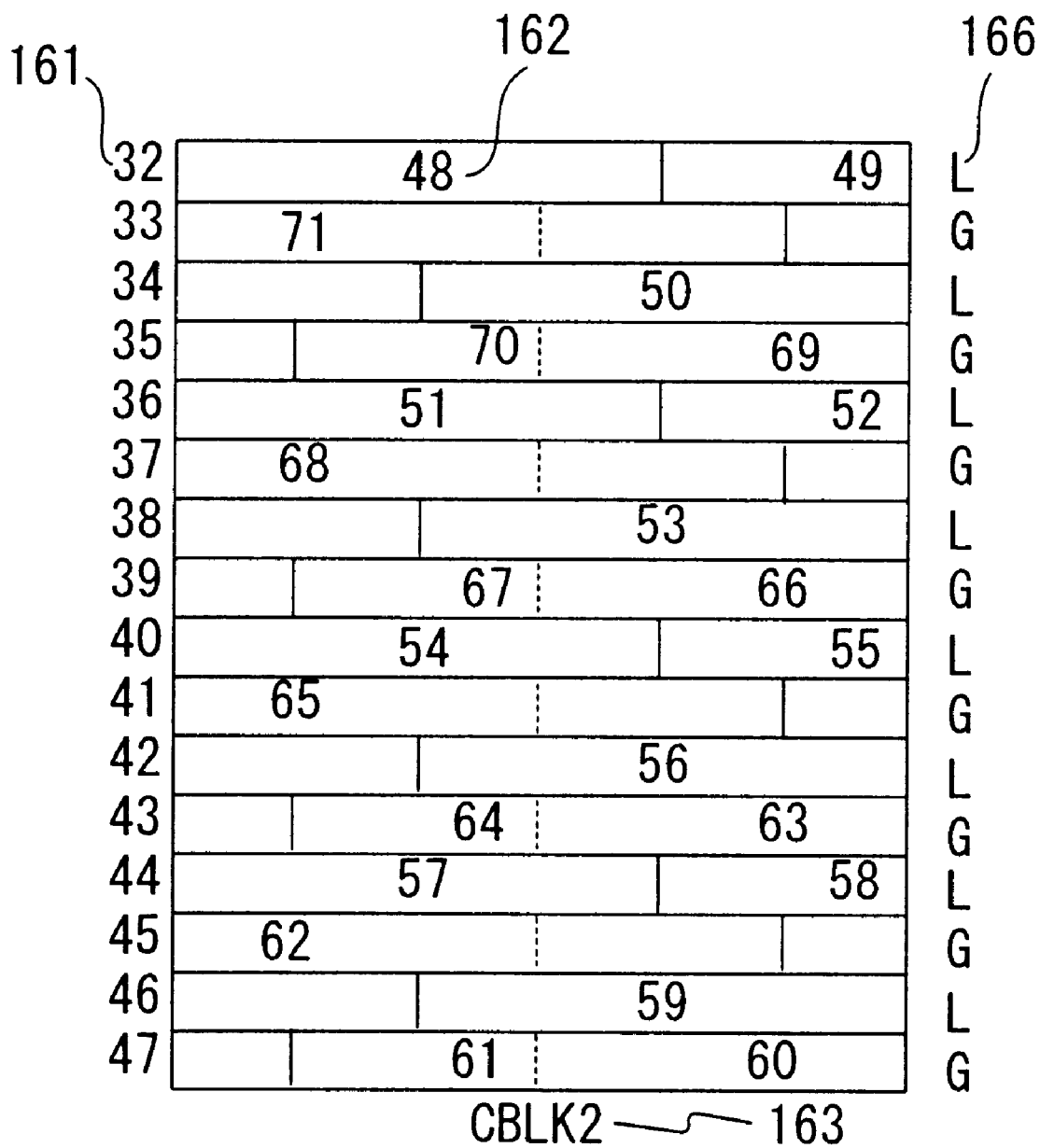
FIG. 61 is a constitutional diagram showing a track configuration following to the tracks shown in FIG. 60.

Another example of the tenth preferred embodiment is shown in FIGS. 60 to 62. In this example, data is written in the order of CBLK 0 (land)→CBLK 4 (groove)→CBLK 1 (land)→CBLK 3 (groove)→CBLK 2 (land)→CBLK 2 (groove)→CBLK 3 (land)→CBLK 1 (groove)→CBLK 4 (land)→CBLK 2 (groove). In this case, groove 1 track backward jumping per ½ track is performed over the whole groove track. The land/groove may be created as desired or may be reversed.

Writing may be started from CBLK 4. In this case, data is written in the order of CBLK 4 (land)→CBLK 0 (land)→CBLK 3 (land)→CBLK 1 (land)→CBLK 2 (land)→CBLK 4 (groove)→CBLK 0 (groove)→CBLK 3 (groove)→CBLK 1 (groove)→CBLK 2 (groove).

Alternatively, data may be written in the order of CBLK 4 (land)→CBLK 0 (groove)→CBLK 3 (land)→CBLK 1 (groove)→CBLK 2 (land)→CBLK 2 (groove)→CBLK 1(land)→CBLK 3 (groove)→CBLK 0 (land)→CBLK 4 (groove). The land/groove may be reversed.

The eighth preferred embodiment may be combined with the tenth preferred embodiment, and writing may be started from CBLK4. When the residual buffer capacity is the initial value or more, the group 1 is selected, while when the residual buffer capacity is less than the initial value, the group 0 is selected. Upon input of an instruction for start of writing, the disk control circuit 336 rotates the disk at 21.2 rps. An error correcting code or the like is attached to the input image data 331 by the input circuit 332, and the input image data 331 is written in the buffer 334. Reading of data from the buffer 334 by the buffer control 333 is started when data of 4 frames has been stored in the buffer.

The read data is subjected to coding for writing or the like by the write-data process circuit 335, and the optical head 337 selects the 78th track in the optical disk 338 and starts writing in CBLK 4. When writing up to the 64th track has been completed, the residual buffer capacity is 0 because the capacity of writing is 12 frames with the capacity of reading being 16 frames. In this embodiment, 1 track backward jumping per ½ track is performed over the whole track. Thereafter, as with the eighth preferred embodiment, CBLK, in which data is to be written, is selected.

Writing is performed in the following order:
CBLK 4 (land, -4/0)→CBLK 1 (land, 2/2)→CBLK 0 (land, 4/6)→CBLK3 (land, -2/4)→CBLK2 (land, 0/4)→CBLK4 (groove, -4/0)→CBLK 1 (groove, 2/2)→CBLK 0 (groove, 4/6)→CBLK 3 (groove, -2/4)→CBLK 2 (groove, 0/4).

In this case, the numerator in parentheses represents a change (an increase or a decrease) in buffer in the CBLK, and the denominator represents the resultant residual buffer capacity. For the above land/groove writing, the land and the groove may be switched one CBLK by one CBLK or may be created as desired. Further, the land and the groove may be reversed.

Further, in the method and apparatus for reducing the necessary buffer capacity, writing may be started from CBLK 4. The permissible buffer range is 0 to 4 frames. The necessary buffer capacity is 4 frames.

Upon input of an instruction for start of writing, the disk control circuit 336 rotates the disk at 21.2 rps. An error correcting code or the like is attached to the input image data 331 by the input circuit 332, and the input image data 331 is written in the buffer 334. Reading of data from the buffer 334 by the buffer control 333 is started when data of 4 frames has been stored in the buffer.

The read data is subjected to coding for writing or the like by the write-data process circuit 335, and the optical head 337 selects the 78th track in the optical disk 338 and starts writing in CBLK 4. When writing up to the 64th track has been completed, the residual buffer capacity is 0 because the capacity of writing is 12 frames with the capacity of reading being 16 frames. In this embodiment, 1 track backward jumping per ½ track is performed over the whole track. Thereafter, as with the eighth preferred embodiment, CBLK, in which data is to be written, is selected. Writing is performed in the following order:
CBLK 4 (land, -4/0)→CBLK 1 (land, 2/2)→CBLK 3 (land, -2/0)→CBLK 0 (land, 4/4)→CBLK 2 (land, 0/4)→CBLK 4 (groove, -4/0)→CBLK 1 (groove, 2/2)→CBLK 3 (groove, -2/6)→CBLK 0 (groove, 4/4)→CBLK 2 (groove, 0/4).

In this case, the numerator in parentheses represents a change (an increase or a decrease) in buffer in the CBLK, and the denominator represents the resultant residual buffer capacity. For the above land/groove writing, the land and the groove may be switched one CBLK by one CBLK or may be created as desired. Further, the land and the groove may be reversed.

Figure 64:
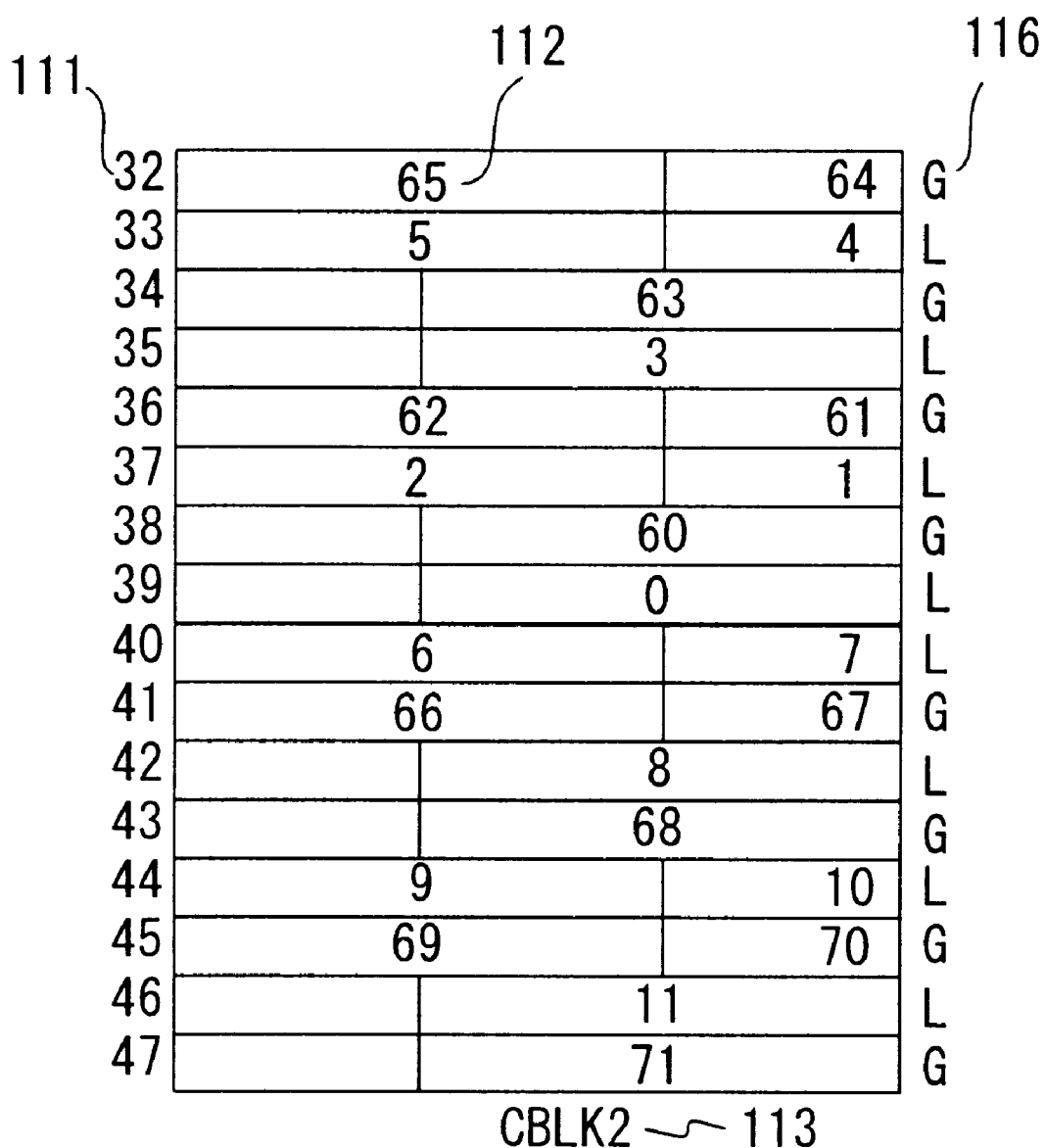
FIG. 64 is a constitutional diagram showing a track configuration following to the tracks shown in FIG. 63.
Figure 66A:
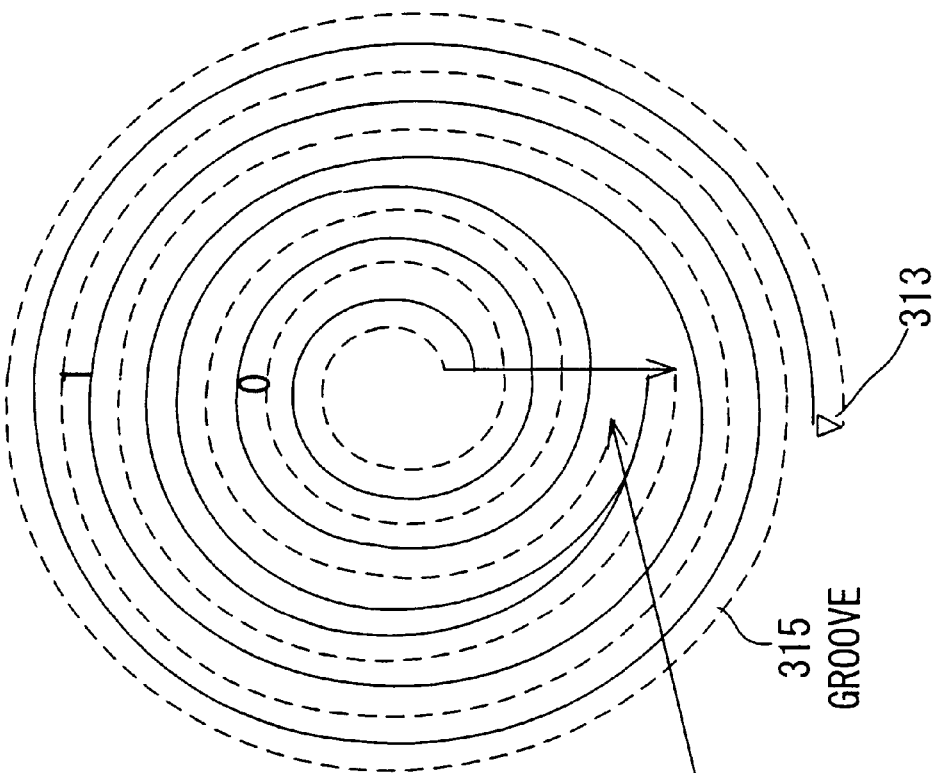
Figure 66B:
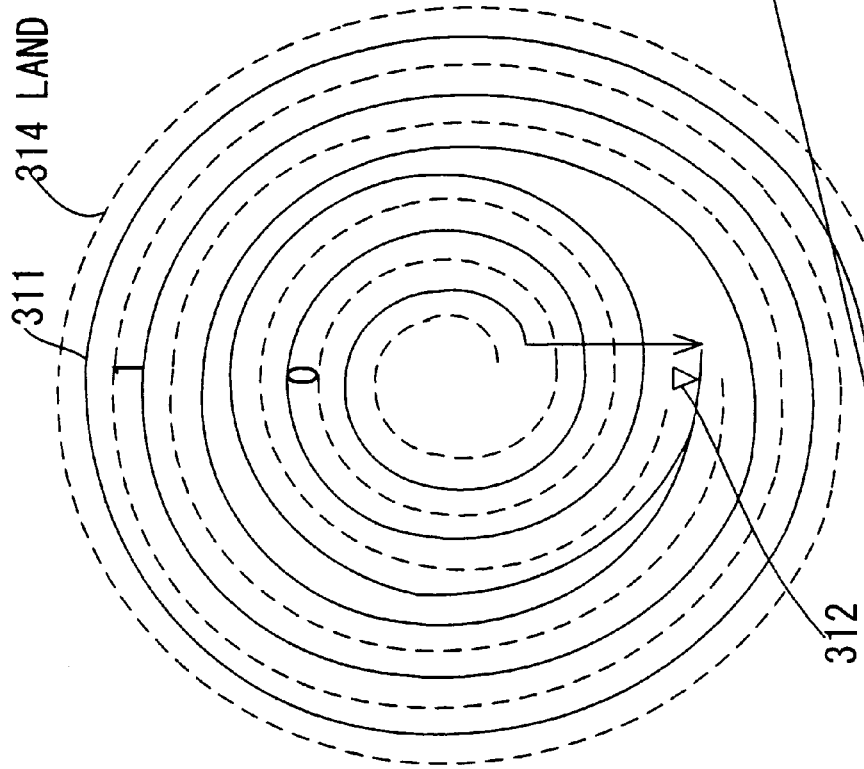

The eleventh preferred embodiment is shown in FIGS. 63 to 65. The front of the 40th track in CBLK 2 is the disk center (115). The construction of tracks is shown in FIG. 66. As shown in FIG. 66, the direction of the land/groove spiral on the inner circumference side from the disk center is opposite to that on the outer circumference side from the disk center. On the inner circumference side, the spiral advances toward the inner circumference, while on the outer circumference side, the spiral advances toward the outer circumference. Numeral 311 designates CBLKs, numeral 312 a write start track, numeral 313 a write end track, numeral 314 a land track, and numeral 315 a groove track. Data is written in the order of CBLK 0 (land, toward inner circumference)→CBLK 1 (land, toward outer circumference)→CBLK 0 (groove, toward inner circumference)→CBLK 1 (groove, toward outer circumference).

In the eleventh preferred embodiment shown in FIGS. 63 to 65, as with the seventh preferred embodiment, the number of revolutions of the disk is 20.0 rps which permits data of 12/8 frames per track to be written. In this case, CBLK 0 to CBLK 1 on the inner circumference side constitute group 0, while CBLK 3 to CBLK 4 on the outer circumference side constitute group 1. The group is selected according to the change (increase or decrease) in residual buffer capacity from the initial value at the end of writing in each CBLK. When the residual buffer capacity exceeds the initial value, the group 1 is selected. On the other hand, when the residual buffer capacity is the initial value or less, the group 0 is selected.

Upon input of an instruction for start of writing, the disk control circuit 336 rotates the disk at 20.0 rps, followed by writing in the land track. An error correcting code or the like is attached to the input image data 331 by the input circuit 332, and the input image data 331 is written in the buffer 334. Reading of data from the buffer 334 by the buffer control 333 is immediately started.

The read data is subjected to coding for writing or the like by the write-data process circuit 335, and the optical head 337 selects the 39th track in the optical disk 338. In CBLK 2, writing up to the 32nd track is performed toward the inner circumference, and, thereafter, writing from the 40th track to the 47th track is performed toward the outer circumference. In this case, as shown in FIGS. 63 to 65, when the number of CBLKs is an odd number, the center of CBLK 2 is the disk center, that is, is the point at which the direction of the spiral is reversed. In CBLK 2, since there is no change in buffer capacity, writing may be performed at any time. Here, however, CBLK 2 is shown as CBLK in which data is first written. At the end of writing up to the 47th track, the residual buffer capacity is 0.

Next, since the residual buffer capacity is the initial value+0, the group 0 is selected. The optical head is jumped to 31st track, and writing up to the 17th track is performed in CBLK 1. Regarding the change in buffer capacity in CBLK 1, the capacity of writing is 12 frames with the capacity of reading being 10 frames, providing an increase of 2 frames. Therefore, the residual buffer capacity is 2 frames. Next, since the residual buffer capacity is the initial value+2 frames, the group 1 is selected. The optical head is jumped to the 48th track, and writing in CBLK 3 is performed up to the 62nd track. Regarding the change in buffer capacity in CBLK 3, the capacity of writing is 12 frames with the capacity of reading being 14 frames, providing a decrease of 2 frames. Therefore, the residual buffer capacity is 0.

Next, since the residual buffer capacity is the initial value+0, the group 0 is selected. The optical head is jumped to the 15th track, and writing in CBLK 0 is performed up to the 1st track. Regarding the change in buffer capacity in CBLK 0, the capacity of writing is 12 frames with the capacity of reading being 8 frames, providing an increase of 4 frames. Therefore, the residual buffer capacity is 4 frames. Finally, since the residual buffer capacity is the initial value+4 frames, the group 1 is selected. The optical head is jumped to the 64th track, and writing in CBLK 4 is performed up to the 78th track. Regarding the change in buffer capacity in CBLK 4, the capacity of writing is 12 frames with the capacity of reading being 16 frames, providing a decrease of 4 frames. Therefore, the residual buffer capacity is 0.

Thus, writing in the land tracks is completed. Subsequently, in the same manner as described above, writing in groove tracks is performed in the order of CBLK 2→CBLK 1→CBLK 3→CBLK 0→CBLK 4.

As shown in FIGS. 67 to 69, for the above land/groove writing, the land and the groove may be switched one CBLK by one CBLK. Here, data is written in the order of CBLK 1 (land)→CBLK 3 (groove)→CBLK 0 (land)→CBLK 4 (groove)→CBLK 2 (land)→CBLK 1 (groove)→CBLK 3 (land)→CBLK 0 (groove)→CBLK 4 (land)→CBLK 2 (groove).

The land and the groove may be created as desired. Further, the land and the groove may be reversed. In this embodiment, writing may be started from CBLK 2→CBLK 3. In this case, data of 2 frames is first written in the buffer, followed by start of writing. In this case, data is written in the order of CBLK 2 (land)→CBLK 3 (land)→CBLK 1 (land)→CBLK 4 (land)→CBLK 0 (land)→CBLK 2 (groove)→CBLK 3 (groove)→CBLK 1 (groove)→CBLK 4 (groove)→CBLK 0 (groove).

Alternatively, data may be written in the order of CBLK 3 (land)→CBLK 1 (groove)→CBLK 4 (land)→CBLK 0 (groove)→CBLK 2 (land)→CBLK 3 (groove)→CBLK 1 (land)→CBLK 4 (groove)→CBLK 0 (land)→CBLK 2 (groove).

The land/groove may be created as desired or may be reversed. The above method can be applied to the method for reducing the necessary buffer capacity. The order of writing is quite the same as that in the eleventh preferred embodiment.

Figure 71:
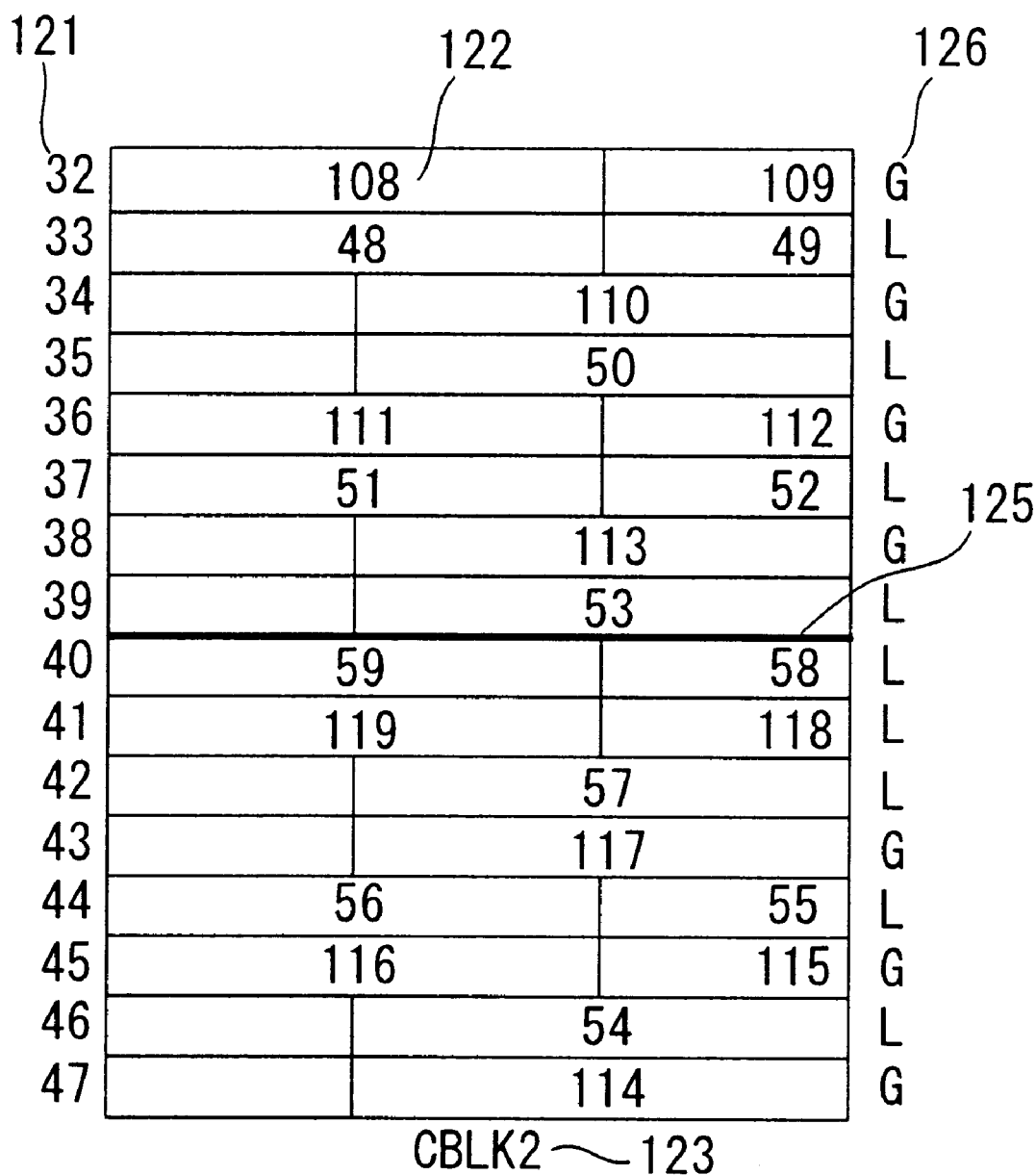
FIG. 71 is a constitutional diagram showing a track configuration following to the tracks shown in FIG. 70.
Figure 73A:
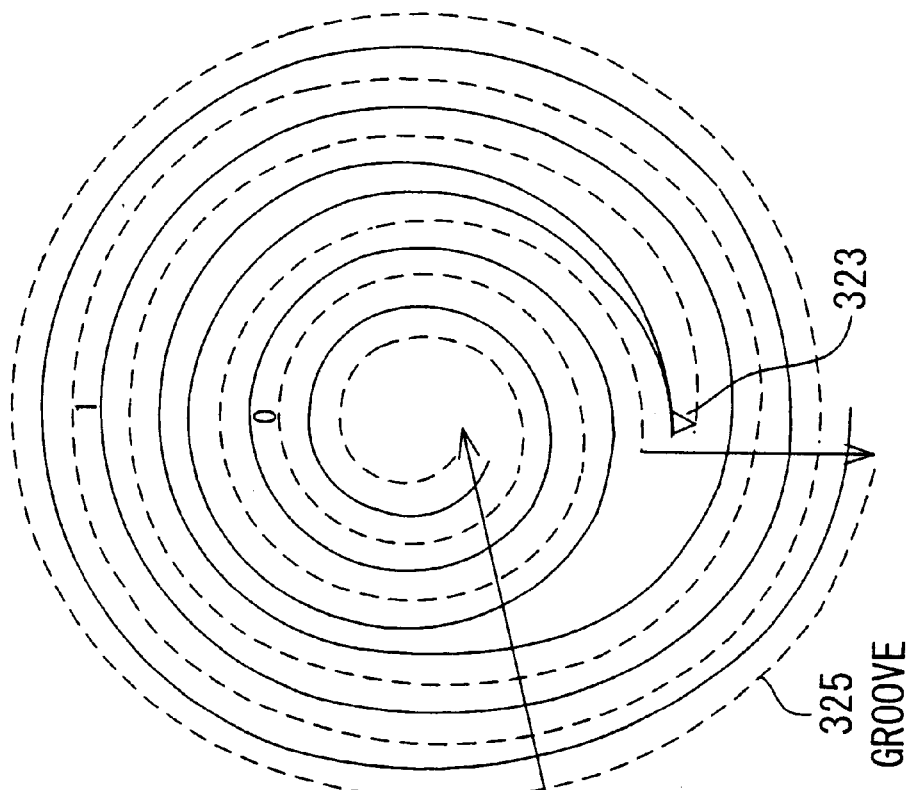
Figure 73B:
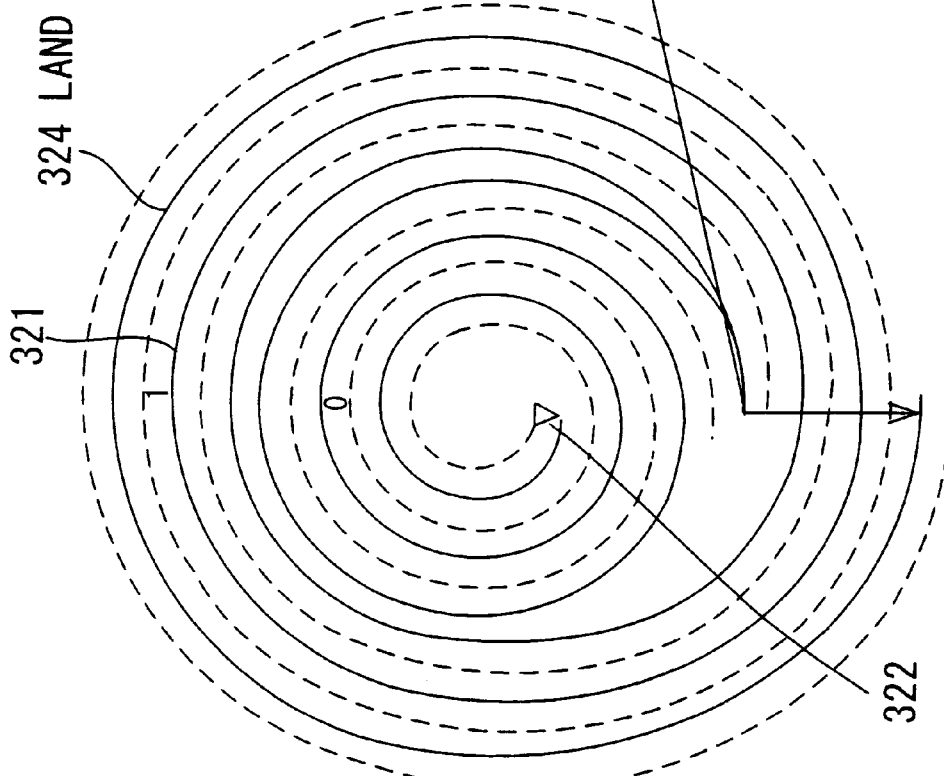

The twelfth preferred embodiment is shown in FIGS. 70 to 72. The front of the 40th track in CBLK 2 is the disk center (125). The construction of tracks is shown in FIG. 73. As shown in FIG. 73, the direction of the spiral on the inner circumference side from the disk center is opposite to that on the outer circumference side from the disk center. On the inner circumference side, the spiral advances toward the outer circumference, that is, the disk center, while on the outer circumference side, the spiral advances toward the inner circumference, that is, the disk center. Numeral 321 designates CBLKs, numeral 322 a write start track, numeral 323 a write end track, numeral 324 a land track, and numeral 325 a groove track.

Data is written in the order of CBLK 0 (land, toward outer circumference)→CBLK 1 (land, toward inner circumference) CBLK 0 (groove, toward outer circumference)→CBLK 1 (groove, toward inner circumference). As with the seventh preferred embodiment, the number of revolutions of the disk is 20.0 rps which permits data of 12/8 frames per track to be written. In this case, CBLK 0 to CBLK 1 on the inner circumference side constitute group 0, while CBLK 3 to CBLK 4 on the outer circumference side constitute group 1. The group is selected according to the change (increase or decrease) in residual buffer capacity from the initial value at the end of writing in each CBLK.

When the residual buffer capacity exceeds the initial value, the group 1 is selected. On the other hand, when the residual buffer capacity is the initial value or less, the group 0 is selected. Upon input of an instruction for start of writing, the disk control circuit 336 rotates the disk at 20.0 rps, followed by writing in the land track. An error correcting code or the like is attached to the input image data 331 by the input circuit 332, and the input image data 331 is written in the buffer 334. Reading of data from the buffer 334 by the buffer control 333 is immediately started. The read data is subjected to coding for writing or the like by the write-data process circuit 335, and the optical head 337 selects the 1st track in the optical disk 338, followed by start of writing in CBLK 0 toward the outer circumference.

At the end of writing up to the 15th track, the residual buffer capacity is 4 frames because the capacity of writing is 12 frames with the capacity of reading being 8 frames. Next, since the residual buffer capacity is the initial value+4 frames, the group 1 is selected. The optical head is jumped to 78th track, and writing up to the 64th track is performed in CBLK 4. Regarding the change in buffer capacity in CBLK 4, the capacity of writing is 12 frames with the capacity of reading being 16 frames, provided a decrease of 4 frames. Therefore, the residual buffer capacity is 0.

Next, since the residual buffer capacity is the initial value+0, the group 0 is selected. The optical head is jumped to the 17th track, and writing in CBLK 1 is performed up to the 31st track. Regarding the change in buffer capacity in CBLK 1, the capacity of writing is 12 frames with the capacity of reading being 10 frames, providing an increase of 2 frames. Therefore, the residual buffer capacity is 2 frames. Next, since the residual buffer capacity is the initial value+2 frames, the group 1 is selected. The optical head is jumped to the 62nd track, and writing in CBLK 3 is performed up to the 48th track.

Regarding the change in buffer capacity in CBLK 3, the capacity of writing is 12 frames with the capacity of reading being 14 frames, providing a decrease of 2 frames. Therefore, the residual buffer capacity is 0. Finally, writing in CBLK 2 is performed. In this case, as with the twelfth preferred embodiment, when the number of CBLKs is an odd number, the center of CBLK 2 is the point at which the direction of the spiral is reversed. Therefore, writing from the 33rd track to the 39th track is performed toward the outer circumference. Thereafter, wiring from the 46th track to the 40th track is performed toward the inner circumference.

In CBLK 2, since there is no change in buffer capacity, writing may be performed at any time. Here, however, CBLK 2 is shown as CBLK in which data is lastly written. At the end of writing up to the 40th track, the residual buffer capacity is 0. Thus, writing in the land tracks is completed. Subsequently, in the same manner as described above, writing in groove tracks is performed in the order of CBLK 0→CBLK 4→CBLK 1→CBLK 3→CBLK 2.

Figure 75:
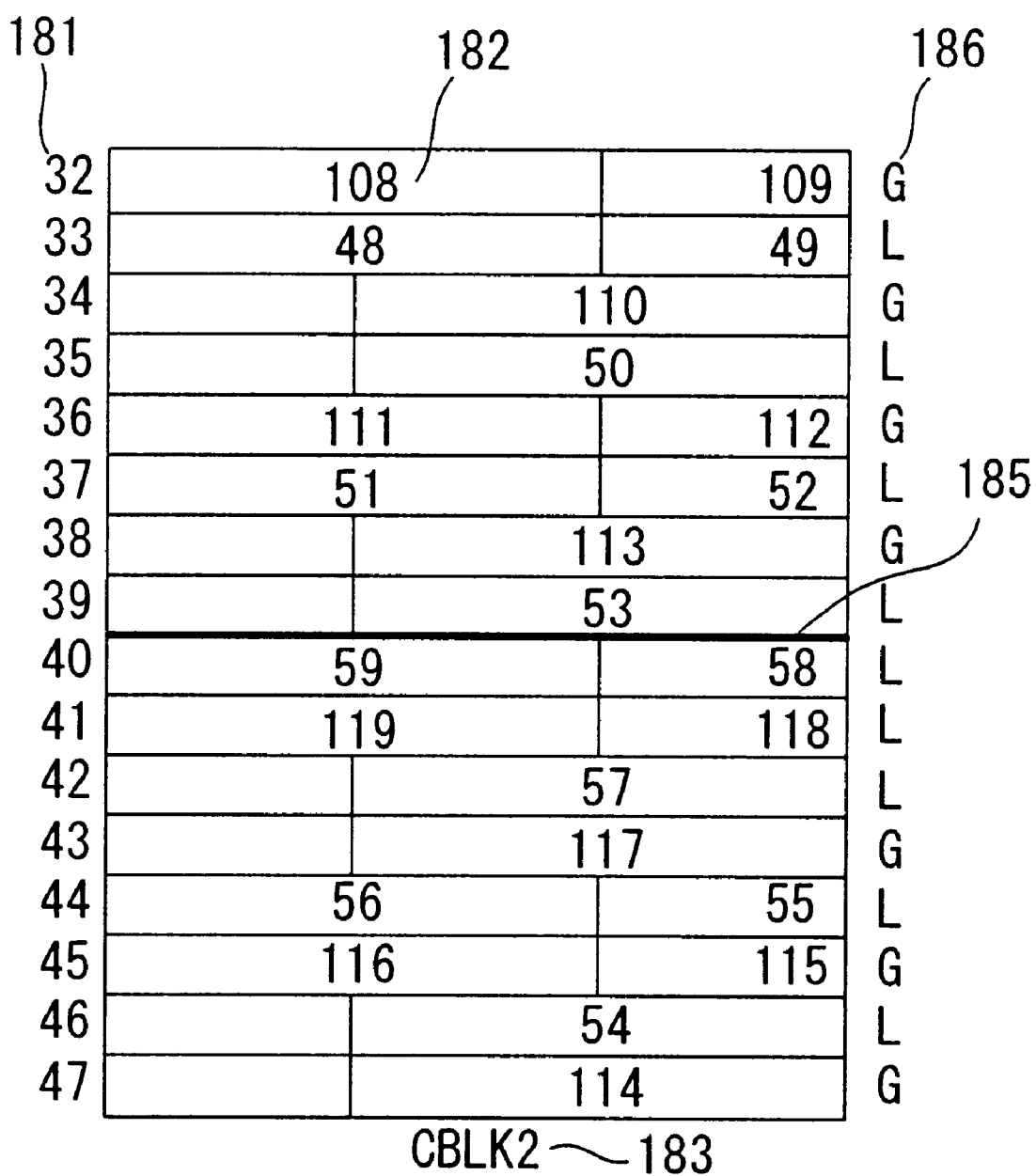
FIG. 75 is a constitutional diagram showing a track configuration following to the tracks shown in FIG. 74.

As shown in FIGS. 74 to 76, for the above land/groove writing, the land and the groove may be switched one CBLK by one CBLK. Here, data is written in the order of CBLK 0 (land) CBLK 4 (groove)→CBLK 1 (land)→CBLK 3 (groove)→CBLK 2 (land)→CBLK 0 (groove)→CBLK 4 (land)→CBLK 1 (groove)→CBLK 3 (land)→CBLK 2 (groove) The land/groove may be created as desired. Further, the land and the groove may be reversed.

In the twelfth preferred embodiment, writing of data may be started from CBLK 4. In this case, data of 4 frames is first written in the buffer, and writing is then started. The order of writing is CBLK 4 (land)→CBLK 0 (land)→CBLK 3 (land)→CBLK 1 (land)→CBLK 2 (land)→CBLK 4 (groove)→CBLK 0 (groove)→CBLK 3 (groove)→CBLK 1 (groove)→CBLK 2 (groove).

Alternatively, data may be written in the order of CBLK 4 (land)→CBLK 0 (groove)→CBLK 3 (land)→CBLK 1 (groove)→CBLK 2 (land)→CBLK 4 (groove)→CBLK 0 (land)→CBLK 3 (groove)→CBLK 1 (land)→CBLK 2 (groove). The land/groove may be created as desired. Further, the land and the groove may be reversed. The method for reducing the necessary buffer capacity may be applied. The order of writing is quite the same as that in the twelfth preferred embodiment (FIGS. 70 to 72 and FIGS. 74 to 76).

In each of the above preferred embodiments, only one number of revolutions of the disk is indicated. The number of revolutions may be larger than that indicated in each of the preferred embodiment.

For example, in the first preferred embodiment, the number of revolutions is 20.8 rps which permits data of 11.5/8 frames per track to be written. Alternatively, the number of revolutions may be 21.8 rps which permits data of 11/8 frames per track to be written, 26.6 rps which permits data of 9/8 frames per track to be written, or other values. This is true of the other preferred embodiments. The larger than number of revolutions of the disk, the smaller the necessary buffer capacity.

The order of CBLK selected may be other than that described in the above preferred embodiments. Writing may be performed in any order so far as an underflow or an overflow does not occur in the buffer.

Further, each of the preferred embodiments, track jumping is performed in borders among the CBLKs many times. Further, in FIGS. 17 to 19, 22 to 24, 49 to 51, 53 to 55, 56 to 58, and 60 to 62, track jumping is performed more frequently. When track jumping is performed in this way, a method may be used wherein a gap region for track jumping, where neither writing of data therein nor reading of data therefrom is performed, is previously provided.

Figure 8:
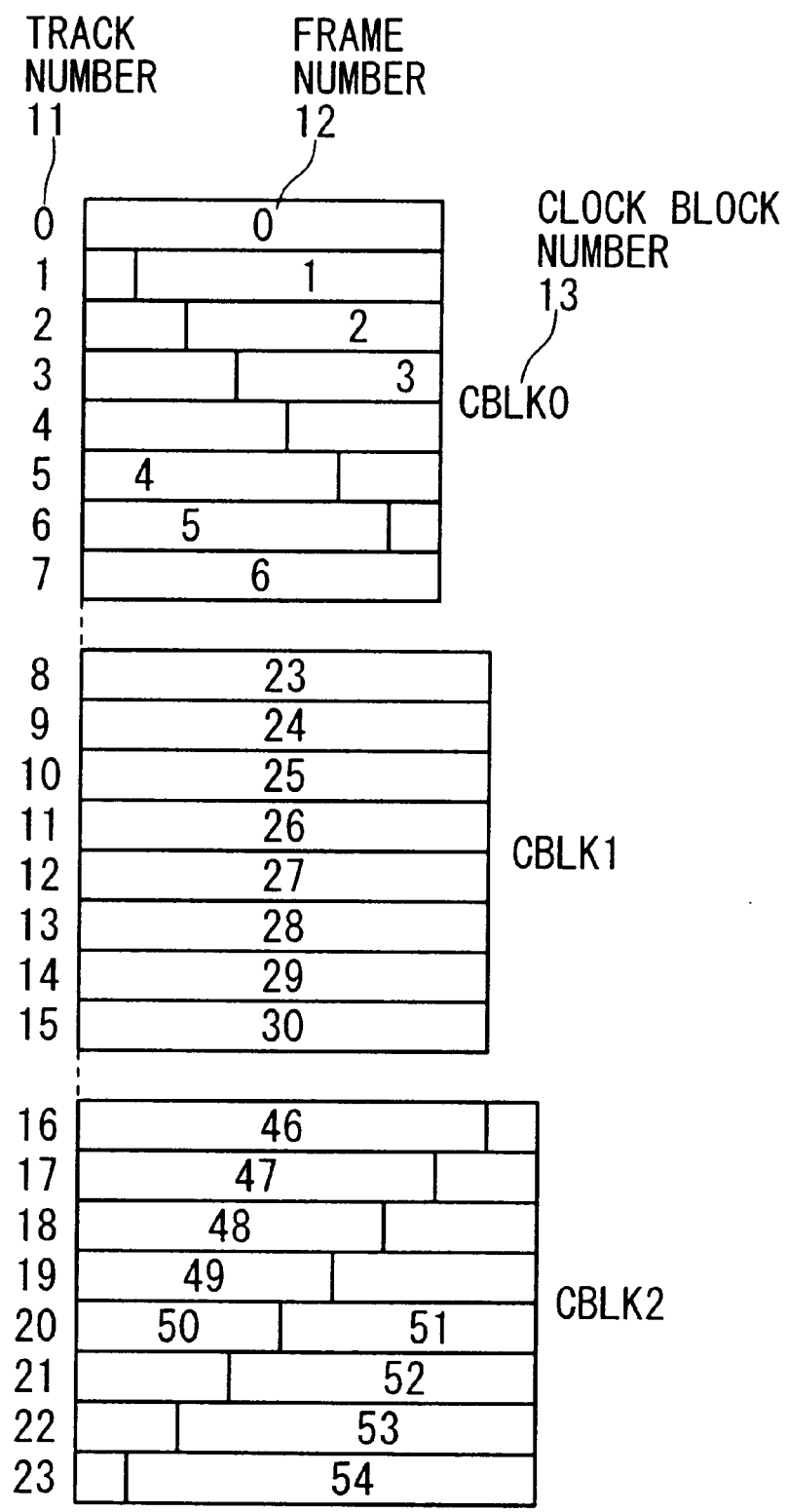
FIG. 8 is a constitutional diagram showing a track configuration, on the side of the innermost radius, based on which writing of information is started from the innermost and the outermost radii according to a first embodiment of the invention.
Figure 9:
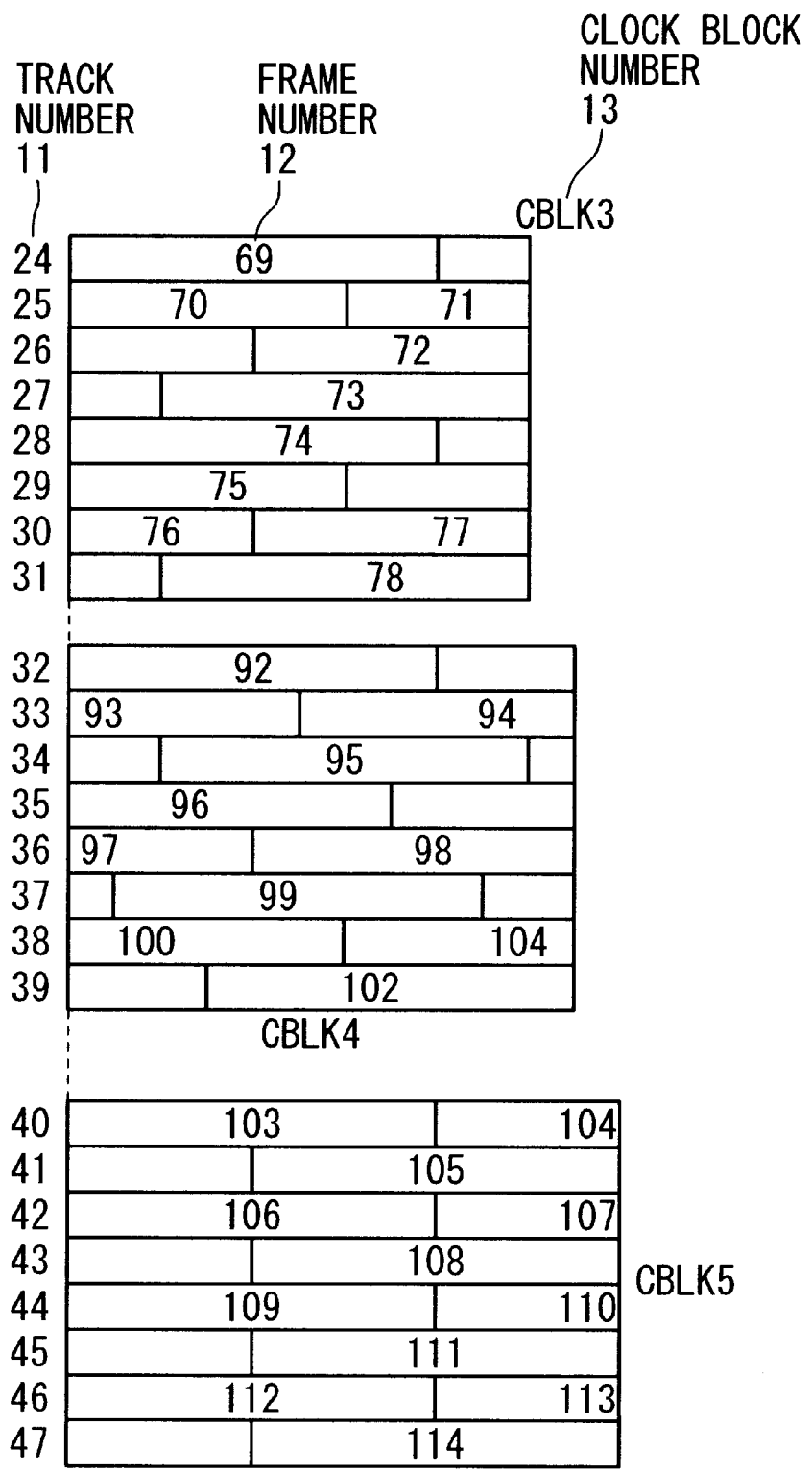
FIG. 9 is a constitutional diagram showing a track configuration following to the tracks shown in FIG. 8.

Further, for example, in FIGS. 8 to 10, after writing in CBLK 0, the optical head should be jumped to CBLK 9, that is, the front of the 72nd track. In order to distinguish the front of CBLK even in the case of a fresh disk, a CBLK front mark, a CBLK number or the like may be previously provided on the disk.

The necessary buffer capacity and the capacity of the buffer used for first storing data at the time of writing/reading described in the preferred embodiments are the necessary minimum value. In actual media, the buffer capacity and the capacity of buffer for storing data at the time of writing/reading should be larger than those described above from the viewpoint of jitter and the like in the disk medium.

In the above preferred embodiments, writing at a constant low number of revolutions of the disk and wiring at a constant write wavelength can be simultaneously realized when the apparatus for writing information into an optical disk and reading it therefrom, the optical disk having a plurality of recording regions, equally divided in a track direction, for continuously writing data in such a manner that data of A frames per track is written in the 0th region as the innermost circumstance region, data of (A+B) frames per track is written in the 1st region, data of (A+nB) frames per track is written in the nth region, and data of (A+PB) frame per track is written in the Pth region as the outermost circumference region, comprises: a disk control circuit for rotating the disk at any desired constant number of revolutions which permits data of A to (A+PB) frames per track to be written; an optical head; a data input circuit for processing input data received from the outside; a buffer circuit for absorbing the difference between the input rate of data and the write rate of data; a write-data process circuit which selects storing region number for storing data so as to prevent an overflow and an underflow in the buffer and, in addition, outputs the write data into the disk; and a write-control circuit for controlling the above procedure.

According to the invention having the above constitution, in the step of writing/reading, data to be read or written is temporarily stored according to the difference between the rate of date input into or output from a higher rank device and the write or read rate of data determined for each of the plurality of storing regions. This can absorb the difference in storing capacity of the optical disk upon one revolution of the disk between the inner circumference side and the outer circumference side. Further, upon an instruction, from the higher rank device, for writing or reading of data exceeding the capacity of the above one storing region, the storing region selection means successively selects the storing region for writing data therein or reading data therefrom according to the write/read rate of data determined for each of the plurality of the storing regions. Therefore, novel excellent method and apparatus for writing information into an optical disk and reading it therefrom can be provided wherein writing/reading can be performed while most efficiently utilizing the buffer by successively selecting storing regions different from one another in write/read rate of data.

The invention has been described in detail with particular reference to preferred embodiments, but it will be understood that variations and modifications can be effected within the scope of the present invention as set forth in the appended claims.

What is claimed is:

1. A method for writing information into an optical disk and reading it therefrom, said method comprising the steps of:

rotating an optical disk for writing data transmitted from a higher rank device at a constant rate (disk driving step);

producing a variable clock which varies a write or read clock for each of a plurality of storing regions defined from the inner circumference side toward the outer circumference side of the disk driven at a constant rate (variable clock production step); and writing or reading data according to the clock produced for each storing region in the variable clock production step (write/read step), wherein the write/read step comprises temporarily storing data, to be written or read, according to a difference between the rate of data input into or output from the higher rank device and the data write/read rate determined for each of the plurality of storing regions (buffer step).

2. The method according to claim 1, wherein the write/read step comprises, upon receipt of an instruction, from the higher rank device, for writing or reading data in a capacity exceeding the capacity of the one storing region, successively selecting storing regions for writing or reading data according to the data-write or data-read rate determined for each of the plurality of storing regions.

3. An apparatus for writing information into an optical disk and reading it therefrom, comprising:

variable clock production means which varies a write or read clock for each of a plurality of storing regions defined from the inner circumference side toward the outer circumference side of an optical disk;

disk control means for rotating the optical disk at a predetermined constant rate; and buffer means for absorbing a difference between the data write/read rate determined for each of the plurality of storing regions and the rate of data input into or output from the higher rank device.

4. The apparatus according to claim 3, which further comprises storing region selection means which, upon receipt of an instruction, from the higher rank device, for writing or reading data in a capacity exceeding the capacity of the one storing region, successively selects storing regions for writing or reading data according to the data-write or data-read rate determined for each of the plurality of storing regions.

5. The apparatus according to claim 3, wherein switching sites for the plurality of storing regions of the optical disk are on a substantially one line in the radial direction of the optical disk.

6. An apparatus for writing information into an optical disk, the optical disk having a plurality of storing regions, equally divided in a track direction, for continuously writing data in such a manner that data of A frames per track is written in the 0th region as the innermost circumstance region, data of (A+B) frames per track is written in the 1st region, data of (A+nB) frames per track is written in the nth region, and data of (A+PB) frame per track is written in the Pth region as the outermost circumference region, said apparatus comprising:

an optical head for writing information into the optical disk or reading it therefrom;

a disk control circuit for rotating the disk at a predetermined number of revolutions which permits data of A to (A+PB) frames per track to be written;

a data input circuit for processing input data received from a higher rank device;

a buffer circuit for absorbing the difference between the input rate of data received from the higher rank device and the write rate of data written by the optical head; and a write-data process circuit which selects storing regions for storing data so as to prevent an overflow and an underflow in the buffer circuit and, in addition, outputs the write data into the optical disk.

7. The apparatus according to claim 6, wherein the disk control circuit comprises means for rotating the disk at a number of revolutions which permits data of not less than (A+PB/2) frames per track to be written, and the write-data process circuit comprises means which, when the number of divided regions is an even number with P being an odd number, successively selects storing regions in the order of the 0th region, the Pth region, the 1st region, the (P−1)th region, ((P−1)/2)th region, and ((P+1)/2)th region.

8. The apparatus according to claim 6, wherein the disk control circuit comprises means for rotating the disk at a number of revolutions which permits data of not less than (A+PB/2) frames per track to be written, and the write-data process circuit comprises means which, when the number of divided regions is an odd number with P being an even number, successively selects storing regions in the order of the 0th region, the Pth region, the 1st region, the (P−1) th region, ((P−2)/2) th region, and (P+2)/2)th region.

9. The apparatus according to claim 6, wherein the write-data process circuit comprises means which starts writing data into the optical disk after the start of storing of data, received from the higher rank device, in the buffer circuit and storing, in the buffer circuit, of data in a quantity corresponding to write-data rate in the storing region for storing the data.

10. The apparatus according to claim 9, wherein the write-data process circuit comprises means which, when the number of storing regions is an even number with P being an odd number, starts writing from the 0th region toward the ((P−1)/2)th region (hereinafter referred to as "group 0") or from ((P+1)/2)th region toward the Pth region (hereinafter referred to as "group 1"), and means which, at the end of writing in one region, when the residual buffer capacity is in a decreased state from the initial value, writing in the group 0 is carried out continuously from the end point of previous writing, while when the residual buffer capacity is in an increased state from the initial value, writing in the group 1 is carried out continuously from the end point of previous writing.

11. The apparatus according to claim 10, wherein the write-data process circuit comprises means which, for the group 1, in each storing region, first writes data in the outermost circumference track, performs backward jumping by two tracks to write data in the 2nd track as counted from the outermost circumference toward the inner circumference, and, thereafter, in this way, performs backward jumping by two tracks for each one track recording to write data in each track, and finally writes data in the innermost circumference.

12. The apparatus according to claim 9, wherein the write-data process circuit comprises means which, when the number of storing regions is an odd number with P being an even number, starts writing from the 0th region toward the ((P−2)/2)th region (hereinafter referred to as "group 0") or from ((P+2)/2)th region toward the Pth region (hereinafter referred to as "group 1"), and means which, at the end of writing in one region, when the residual buffer capacity is in a decreased state from the initial value, writing in the group 0 is carried out continuously from the end point of previous writing, while when the residual buffer capacity is in an increased state from the initial value, writing in the group 1 is carried out continuously from the end point of previous writing.

13. The apparatus according to claim 9, wherein the write-data process circuit comprises: means for determining a permissible buffer range in the buffer circuit and means which, in continuous writing in a next region after writing in the group 0, then the capacity of data to be written does not exceed the permissible range, the data is continuously written in the next region in the group 0, while when the capacity data to be written exceeds the permissible buffer range, jumping to the group 1 is per formed followed by writing from the end point of the previous writing; and means which, in continuous writing in a next region after writing in the group 1, when the capacity of data to be written does not exceed the permissible range, the data is continuously written in the next region in the group 1, while when the capacity data to be written exceeds the permissible buffer range, jumping to the group 0 is performed followed by writing from the end point of the previous writing.

14. An apparatus for writing information into an optical disk, the optical disk having a plurality of storing regions, equally divided in a track direction, for continuously writing data in such a manner that data of A frames per track is written in the 0th region as the innermost circumstance region, data of (A+B) frames per track is written in the 1st region, data of (A+nB) frames per track is written in the nth region, and data of (A+PB) frames per track is written in the Pth region as the outermost circumference region, said apparatus comprising:

an optical head for writing information into the optical disk or reading it therefrom;

a disk control circuit for rotating the disk at a predetermined constant number of revolutions which permits data of (A+PB/2) frames or more per track to be written;

a data input circuit for processing input data received from a higher rank device;

a buffer circuit for absorbing the difference between the input rate of data received from the higher rank device and the write rate of data written by the optical head; and a write-data process circuit which selects storing regions for storing data so as to prevent an overflow and an underflow in the buffer circuit immediately after the start of writing of input data received from the higher rank device and after that and, in addition, outputs the write data into the optical disk, the write-data process circuit comprising:

means which, when the number of storing regions is an even number with P being an odd number, starts writing from the region P as the outermost circumference toward the ((P+1)/2)th region as the innermost circumference (hereinafter referred to as "group 2") or from ((P−1)/2)th region as the outermost circumference toward the 0th region as the innermost circumference (hereinafter referred to as "group 3"), while performing backward jumping by two tracks per track, and, at the end of writing in one region, when the residual buffer capacity is in an increased state from the initial value, writing in the group 2 is carried out continuously from the end point of previous writing, while when the residual buffer capacity is in an decreased state from the initial value, writing in the group 3 is carried out continuously from the end point of previous writing;

means which, when the number of divided storing regions is an odd number with P being an even number, starts writing from the region P as the outermost circumference toward the ((P+2)/2)th region as the innermost circumference (hereinafter referred to as "group 2") or from ((P−2)/2)th region as the outermost circumference toward the 0th region as the innermost circumference (hereinafter referred to as "group 3"), while performing backward jumping by two tracks per track, and, at the end of writing in one region, when the residual buffer capacity is in an increased state from the initial value, writing in the group 2 is carried out continuously from the end point of previous writing, while when the residual buffer capacity is in a decreased state from the initial value, writing in the group 3 is carried out continuously from the end point of previous writing; and means which writes data in the (P/2)th region at any time.

15. The apparatus according to claim 14, wherein the write-data process circuit comprises: means for determining a permissible buffer range in the buffer circuit and means which, in continuous writing in a next region after writing in the group 2, when the capacity of data to be written does not exceed the permissible range, the data is continuously written in the next region in the group 2, while when the capacity data to be written exceeds the permissible buffer range, jumping to the group 3 is performed followed by writing from the end point of the previous writing; and means which, in continuous writing in a next region after writing in the group 3, when the capacity of data to be written does not exceed the permissible range, the data is continuously written in the next region in the group 3, while when the capacity data to be written exceeds the permissible buffer range, jumping to the group 2 is performed followed by writing from the end point of the previous writing.

16. The apparatus according to claim 14, wherein the write-data process circuit comprises means which, in each storing region between the ((P+1)/2)th region and the Pth region, first writes data in the outermost circumference track by ½ track, performs backward jumping by one track and write data by ½ track, and, thereafter, in this way, performs write data in each track while performing backward jumping by one track per ½ track, and finally writes data by ½ track in the innermost circumference.

17. The apparatus according to claim 14, wherein the write-data process circuit comprises means which, in all the regions, first writes data in the outermost circumference track by ½ track, performs backward jumping by one track and write data by ½ track, and, thereafter, in this way, performs write data in each track while performing backward jumping by one track per ½ track, and finally writes data in the innermost circumference.

18. An apparatus for writing information into an optical disk, comprising:
- a disk control circuit for rotating an optical disk at a predetermined constant number of revolutions which can write data of (A+PB/2) frames or more per track, the direction of the spiral being reversed in the center of the disk;
- a data input circuit for processing input data received from a higher rank device;
- a buffer circuit for absorbing a difference between the input rate of data received from the higher rank device and the write rate of data written by an optical head; and
- a write-data process circuit which selects storing regions for storing data so as to prevent an overflow and an underflow in the buffer circuit immediately after the initiation of writing of input data received from the higher rank device and after that and, in addition, outputs the write data into the optical disk, the write-data process circuit comprising:
means which, when the number of storing regions is an even number with P being an odd number, writes data from the ((P−1)/2)th region as the outermost circumference toward the 0th region as the innermost circumference region, or from the ((P+1)/2)th region as the innermost circumference region toward the Pth region as the outermost circumference region, and means which, when writing in one region has been completed, depending upon the residual buffer capacity, carries out writing from the ((P−1)/2)th region as the outermost circumference region toward the 0th region as the innermost circumference region continuously from the end point of previous writing, or from the ((P+1)/2) region as the innermost circumference region toward the Pth region as the outermost circumference region continuously from the end point of previous writing; and, in addition, means which, when the number of storing regions is an odd number with P being an even number, writes data from the ((P−2)/2)th region as the outermost circumference region toward the 0th region as the innermost circumference region, or from the ((P+2)/2) th region as the innermost region toward the Pth region as the outermost circumference region, and means which, when writing in one region has been completed, depending upon the residual buffer capacity, carries out writing from the ((P−2)/2) th region as the outermost circumference region toward the 0th region as the innermost circumference region continuously from the end point of previous writing, or from the ((P+2)/2) region as the innermost circumference region toward the Pth region as the outermost circumference region continuously from the end point of previous writing, and writes data in the (P/2)th region at any time.

19. An apparatus for writing information into an optical disk, comprising:
- a disk control circuit for rotating an optical disk at a predetermined constant number of revolutions which can write data of (A+PB/2) frames or more per track, the direction of the spiral being reversed in the center of the disk;
- a data input circuit for processing input data received from a higher rank device;
- a buffer circuit for absorbing a difference between the input rate of data received from the higher rank device and the write rate of data written by an optical head; and
- a write-data process circuit which selects storing regions for storing data so as to prevent an overflow and an underflow in the buffer circuit immediately after the initiation of writing of input data received from the higher rank device and after that and, in addition, outputs the write data into the optical disk, the write-data process circuit comprising:
means which, when the number of storing regions is an even number with P being an odd number, writes data from the 0th region as the innermost circumference region toward the ((P−1)/2)th region as the outermost circumference region, or from the Pth region as the outermost circumference region toward the ((P+1)/2)th region as the innermost circumference region, and means which, when writing in one region has been completed, depending upon the residual buffer capacity, writes data from the 0th region as the innermost circumference region toward the ((P−1)/2)th region as the outermost circumference region continuously from the end point of previous writing, or from the Pth region as the outermost circumference region toward the ((P+1)/2)th region as the innermost region continuously from the end point of previous writing; and, in addition, means which, when the number of divided storing regions is an odd number with P being an even number, writes data from the 0th region as the innermost circumference region toward the ((P−2)/2)th region as the outermost circumference, or from the Pth region as the outermost circumference region toward the ((P+2)/2) th region as the innermost circumference region, and means which, when writing in one region has been completed, depending upon the residual buffer capacity, writes data from the 0th region as the innermost circumference region toward the ((P−2)/2) th region as the outermost circumference continuously from the end point of previous writing, or from the Pth region as the outermost circumference region toward ((P+2)/2) region as the innermost circumference region continuously from the end point of previous writing, and writes data in the (P/2)th region at any time.

20. An apparatus for writing information into an optical disk, the optical disk land permitting (L) /groove (G) writing and having a plurality of recording regions, equally divided in a track direction, for continuously writing data in such a manner that data of A frames per track is written in the 0th region as the innermost circumstance region, data of (A+B) frames per track is written in the 1st region, data of (A+nB) frames per track is written in the nth region, and data of (A+PB) frame per track is written in the Pth region as the outermost circumference region, said apparatus comprising:
- an optical head for writing information into the optical disk or reading it therefrom;
- a disk control circuit for rotating the disk at a predetermined constant number of revolutions which permits data of A to (A+PB) frames per track to be written;
- a data input circuit for processing input data received from a higher rank device;
- a buffer circuit for absorbing the difference between the input rate of data received from the higher rank device and the write rate of data written by the optical head; and a write-data process circuit which selects storing regions for storing data so as to prevent an overflow and an underflow in the buffer circuit and, in addition, outputs the write data into the optical disk.

21. The apparatus according to claim 20, wherein the write-data process circuit comprises means which, after writing or reading in the land (or groove) in the optical disk has been entirely completed, performs writing or reading in the groove (or land).

22. The apparatus according to claim 20, wherein the write-data process circuit performs writing in the land of the optical disk alternated with writing in the groove every other region with one of the land and the groove being at the head.

23. An apparatus for reading information from an optical disk, the optical disk having a plurality of recording regions, equally divided in a track direction, for continuously writing data in such a manner that data of A frames per track is written in the 0th region as the innermost circumstance region, data of (A+B) frames per track is written in the 1st region, data of (A+nB) frames per track is written in the nth region, and data of (A+PB) frame per track is written in the Pth region as the outermost circumference region, said apparatus comprising:

an optical head for writing information from the optical disk or reading it therefrom;

a disk control circuit for rotating the disk at a predetermined constant number of revolutions which permits data of A to (A+PB) frames per track to be written;

a data input circuit for processing input data received from a higher rank device;

a data output circuit for processing data output into the higher rank device;

a buffer circuit for absorbing the difference between the output rate of data output into the higher rank device and the read rate of data read by the optical head; and a read-data process circuit which selects storing regions for reading data so as to prevent an overflow or an underflow in the buffer and, in addition, read the read data from the optical disk.

24. The apparatus according to claim 23, wherein the read-data process circuit comprises means which rotates the disk at such a number of revolutions that can read data of (A+PB/2) frames or more per track, and, after the initiation of reading, upon storage of data in such a capacity that an overflow and an underflow occurs in a buffer between output data and read data, outputs the data into the higher rank device.

25. The apparatus according to claim 23, wherein the read-data process circuit comprises means which, in the optical disk, after storage of data, in a capacity corresponding to data read rate in a storing region from which reading of data is initiated, in the buffer circuit, outputs the data into the higher rank device.

26. An optical disk medium adapted for information to be written therein or information to be read therefrom by means of an apparatus for writing information into an optical disk or reading it therefrom, the optical disk having a plurality of storing regions divided for each predetermined writing/reading clock from the innermost circumference side to the outermost circumference side, the head portion in the plurality of storing regions having a storing region number associated with the data-write or data-read rate of each of the storing regions.

\* \* \* \* \*